US012691749B2

(12) United States Patent
Wright et al.

(10) Patent No.: US 12,691,749 B2
(45) Date of Patent: Jul. 28, 2026

---

(54) ELECTRIC WORK VEHICLE

(71) Applicant: KUBOTA CORPORATION, Osaka (JP)

(72) Inventors: Ian Wright, Fremont, CA (US); Irfan Nadiadi, Fremont, CA (US); Revanth Bodepudi, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 290 days.

(21) Appl. No.: 18/531,932

(22) Filed: Dec. 7, 2023

(65) Prior Publication Data

US 2025/0135870 A1      May 1, 2025

Related U.S. Application Data

(60) Provisional application No. 63/546,252, filed on Oct. 30, 2023.

(51) Int. Cl.
| | |
|---|---|
| *B60K 11/06* | (2006.01) |
| *B60K 11/04* | (2006.01) |
| *B60K 11/08* | (2006.01) |
| *B60L 50/60* | (2019.01) |
| *B60L 50/64* | (2019.01) |
| *H01M 10/613* | (2014.01) |
| *H01M 10/625* | (2014.01) |

(Continued)

(52) U.S. Cl.
CPC .............. *B60K 11/06* (2013.01); *B60K 11/04* (2013.01); *B60K 11/08* (2013.01); *B60L 50/64* (2019.02); *B60L 50/66* (2019.02); *H01M 10/613* (2015.04); *H01M 10/625* (2015.04); *H01M 10/6569* (2015.04); *H01M 50/249* (2021.01); *B60L 2200/40* (2013.01); *H01M 2220/20* (2013.01)

(58) Field of Classification Search
CPC ......... B60K 11/06; B60K 11/04; B60K 11/08; B60K 1/00; B60K 11/02; B60K 2001/005; B60L 50/64; B60L 50/66; B60L 2200/40; H01M 10/613; H01M 10/625; H01M 10/6569; H01M 50/249; H01M 2220/20
USPC .......................................................... 180/68
See application file for complete search history.

(56) References Cited

U.S. PATENT DOCUMENTS

| | | | |
|---|---|---|---|
| 9,616,736 B2 | 4/2017 | Ito et al. | |
| 2023/0202288 A1 | 6/2023 | Kirchmair et al. | |
| 2024/0190213 A1* | 6/2024 | Shiratori | ................. B60H 1/22 |

FOREIGN PATENT DOCUMENTS

WO      WO-2023188989 A1 *  10/2023   .......... H01M 50/296

OTHER PUBLICATIONS

WO 2023188989—English Translation (Year: 2023).*

(Continued)

*Primary Examiner* — Scott A Reinbold
(74) *Attorney, Agent, or Firm* — Keating & Bennett, LLP

(57) ABSTRACT

An electric work vehicle includes a frame and a battery housing supported by the frame. The battery housing includes a plurality of battery housing sections. The plurality of battery housing sections include a first battery housing section, a second battery housing section, and a third battery housing section. The first battery housing section includes a first battery housing portion and a second battery housing portion, the second battery housing section includes a third battery housing portion and a fourth battery housing portion, and the third battery housing section includes a fifth battery housing portion.

18 Claims, 47 Drawing Sheets

(51) Int. Cl.
    H01M 10/6569    (2014.01)
    H01M 50/249    (2021.01)

(56)              References Cited

OTHER PUBLICATIONS

Nadiadi, "Electric Work Vehicle", U.S. Appl. No. 18/531,934, filed Dec. 7, 2023.
Nadiadi, "Electric Work Vehicle", U.S. Appl. No. 18/531,936, filed Dec. 7, 2023.
Anattasakul et al., "Electric Work Vehicle", U.S. Appl. No. 18/531,942, filed Dec. 7, 2023.
Nadiadi, "Electric Work Vehicle", U.S. Appl. No. 18/531,951, filed Dec. 7, 2023.
Nadiadi, "Electric Work Vehicle", U.S. Appl. No. 18/531,956, filed Dec. 7, 2023.
Nadiadi, "Electric Work Vehicle", U.S. Appl. No. 18/532,174, filed Dec. 7, 2023.
Official Communication issued in corresponding European Patent Application No. 24207944.0, mailed on May 7, 2025, 8 pages.

* cited by examiner

2R

2L

SP3

SP2

SP1

4L

UP

RIGHT

REAR

FRONT

LEFT

DOWN

1

4R

2L

2R

REAR        LEFT

RIGHT       FRONT

1

129

4R

2L

4L

1

2R

2L

UP

RIGHT ← → LEFT

DOWN

REAR ←——→ FRONT 2L            4L

FRONT ⟷ REAR

1

FRONT

REAR

RIGHT ⟷ LEFT 8-2

32

30

26

34

10        8-3

28

8-1

FRONT        RIGHT

LEFT        REAR

FRONT ◄──► REAR

REAR ◄──► FRONT

RIGHT ⟷ LEFT

FRONT ⟷ REAR

REAR ⟷ FRONT

ELECTRIC WORK VEHICLE

BACKGROUND OF THE INVENTION

1. Field of the Invention

The present invention is directed to an electric work vehicle such as an electric tractor.

2. Description of the Related Art

Electric vehicles (EVs) are becoming more prevalent as the industry moves from internal combustion engines towards fully electrically powered motors running on battery systems.

SUMMARY OF THE INVENTION

Preferred embodiments of the present invention provide an electric work vehicle such as an electric tractor.

Preferred embodiments of the present invention provide an electric work vehicle.

An electric work vehicle according to a preferred embodiment of the present invention includes a frame and a battery housing supported by the frame, and the battery housing includes a plurality of battery housing sections.

In a preferred embodiment of the present invention, the plurality of battery housing sections include a first battery housing section, a second battery housing section, and a third battery housing section, the first battery housing section includes a first battery housing portion and a second battery housing portion, the second battery housing section includes a third battery housing portion and a fourth battery housing portion, the third battery housing section includes a fifth battery housing portion, the first battery housing portion and the second battery housing portion are adjacent to each other in a left-right direction of the electric work vehicle, the third battery housing portion and the fourth battery housing portion are adjacent to each other in the left-right direction of the electric work vehicle, and a width of the first battery housing section in the left-right direction of the electric work vehicle is equal or substantially equal to a width of the second battery housing section in the left-right direction of the electric work vehicle.

In a preferred embodiment of the present invention, each of the third battery housing portion and the fourth battery housing portion includes more battery housing module compartments than each of the first battery housing portion and the second battery housing portion.

In a preferred embodiment of the present invention, a rear surface of the second battery housing section intersects a middle portion of the first battery housing section in a front-rear direction of the electric work vehicle.

In a preferred embodiment of the present invention, the second battery housing section includes a gap located between the third battery housing portion and the fourth battery housing portion in the left-right direction of the electric work vehicle.

In a preferred embodiment of the present invention, the gap overlaps the third battery housing section in a plan view.

In a preferred embodiment of the present invention, the gap overlaps the first battery housing section in a plan view.

In a preferred embodiment of the present invention, the gap is located along a centerline of the electric work vehicle that extends in a front-rear direction of the electric work vehicle.

In a preferred embodiment of the present invention, the electric work vehicle further includes an air cooling system including a first evaporator and a second evaporator, and the gap is fluidly connected to the first evaporator and the second evaporator to receive cool air from each of the first evaporator and the second evaporator.

In a preferred embodiment of the present invention, the first evaporator and the second evaporator are located in front of at least a portion of the third battery housing portion and at least a portion of the fourth battery housing portion in a front-rear direction of the electric work vehicle, and the gap is fluidly connected to each of the first evaporator and the second evaporator such that the cool air from each of the first evaporator and the second evaporator flows rearwardly into the gap.

In a preferred embodiment of the present invention, the first evaporator is located on a first side of a centerline of the electric work vehicle that extends in the front-rear direction of the electric work vehicle, and the second evaporator is located on a second side of the centerline opposite to the first side of the centerline.

In a preferred embodiment of the present invention, the second battery housing section includes a first inner wall located between the gap and the third battery housing portion in the left-right direction of the electric work vehicle, and the second battery housing section includes a second inner wall located between the gap and the fourth battery housing portion in the left-right direction of the electric work vehicle.

In a preferred embodiment of the present invention, the third battery housing portion includes a plurality of battery housing module compartments to house a plurality of battery modules, the plurality of battery housing module compartments are arranged in a plurality of rows that extend in a front-rear direction of the electric work vehicle, the plurality of rows include a first row and a second row located below the first row in an up-down direction of the electric work vehicle, and the first inner wall includes a first opening connected to one of the plurality of battery housing module compartments included in the first row, the first inner wall includes a second opening connected to one of the plurality of battery housing module compartments including in the second row, and the first opening is smaller than the second opening.

In a preferred embodiment of the present invention, a rear surface of the third battery housing section is spaced away from a front surface of the first battery housing section in a front-rear direction of the electric work vehicle.

In a preferred embodiment of the present invention, the second battery housing section includes a first stepped portion that defines a first space, and at least a portion of the third battery housing section is located within the first space.

In a preferred embodiment of the present invention, the third battery housing section is located below the second battery housing section in an up-down direction of the electric work vehicle.

In a preferred embodiment of the present invention, a front surface of the third battery housing section is located at a same or substantially same location as a front surface of the second battery housing section in a front-rear direction of the electric work vehicle.

In a preferred embodiment of the present invention, a portion of the second battery housing section is farther rearward than the third battery housing section in the front-rear direction of the electric work vehicle.

In a preferred embodiment of the present invention, the frame includes a front frame that supports the third battery housing section and a front axle of the electric work vehicle, and the front frame is mounted between the third battery housing section and the front axle in an up-down direction of the electric work vehicle.

In a preferred embodiment of the present invention, the electric work vehicle further includes a plurality of ducts and a plurality of blowers. Each of the plurality of blowers is attached to a respective one of the plurality of ducts, each of the battery housing sections includes a plurality of battery housing module compartments to house a plurality of battery modules, each of the plurality of ducts is attached to a respective one of the plurality of battery housing module compartments, the battery housing includes a gap located at a central portion of the battery housing, and the plurality of blowers direct air from the gap in a lateral direction and across the plurality of battery housing module compartments.

According to preferred embodiments of the present disclosure, it is possible to provide an electric work vehicle.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Electric work vehicles according to preferred embodiments of the present invention may be a tractor or other agricultural vehicle, but any desirable type of electric vehicle is applicable to and usable with preferred embodiments of the present invention.

Figure 1A:
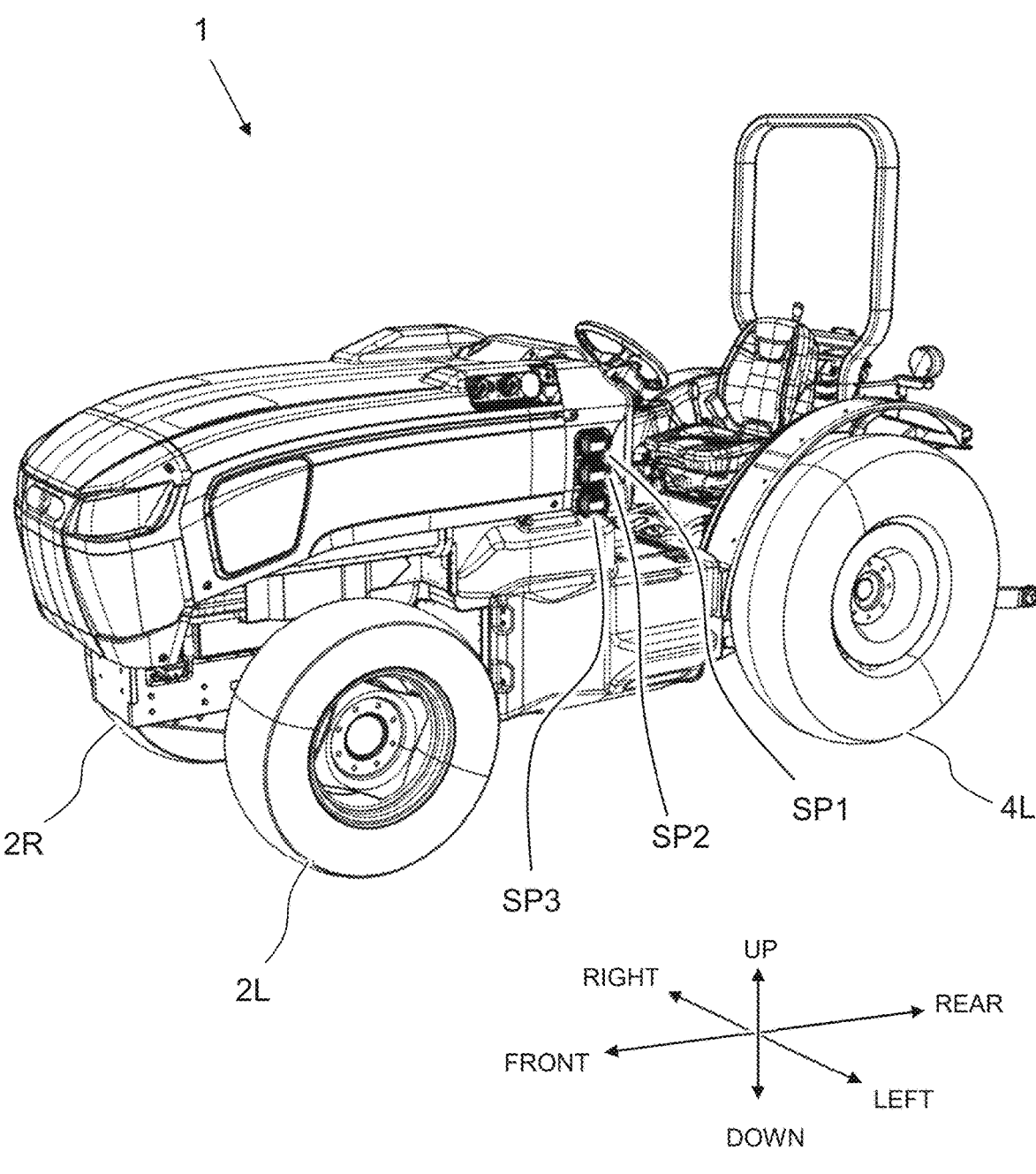
FIG. 1A shows a perspective left-front view of an electric vehicle according to a preferred embodiment of the present invention.
Figure 1B:
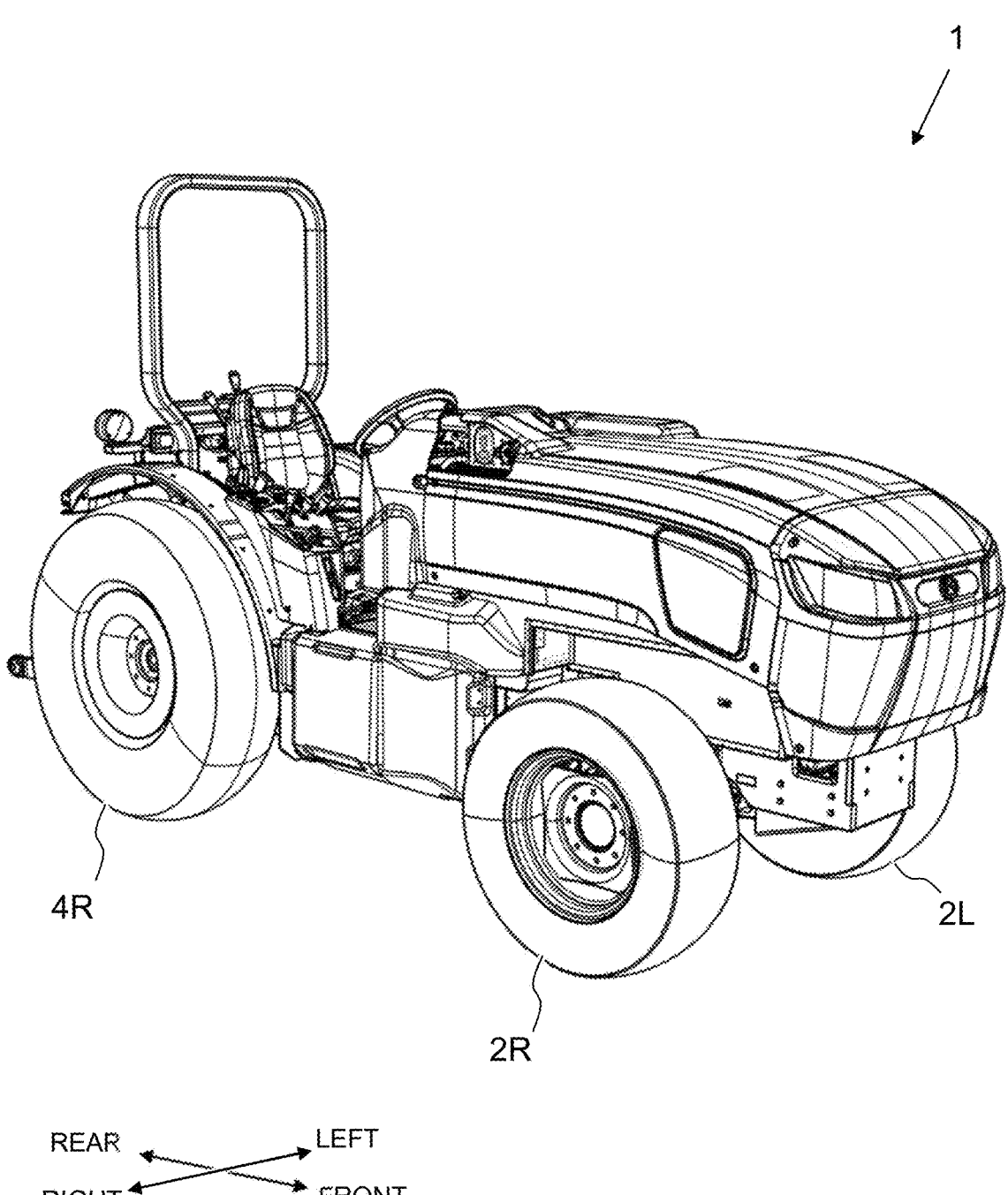
FIG. 1B shows a perspective right-front view of an electric vehicle according to a preferred embodiment of the present invention.
Figure 1C:
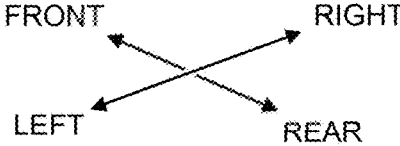
FIG. 1C shows a perspective left-rear view of an electric vehicle according to a preferred embodiment of the present invention.
Figure 1D:
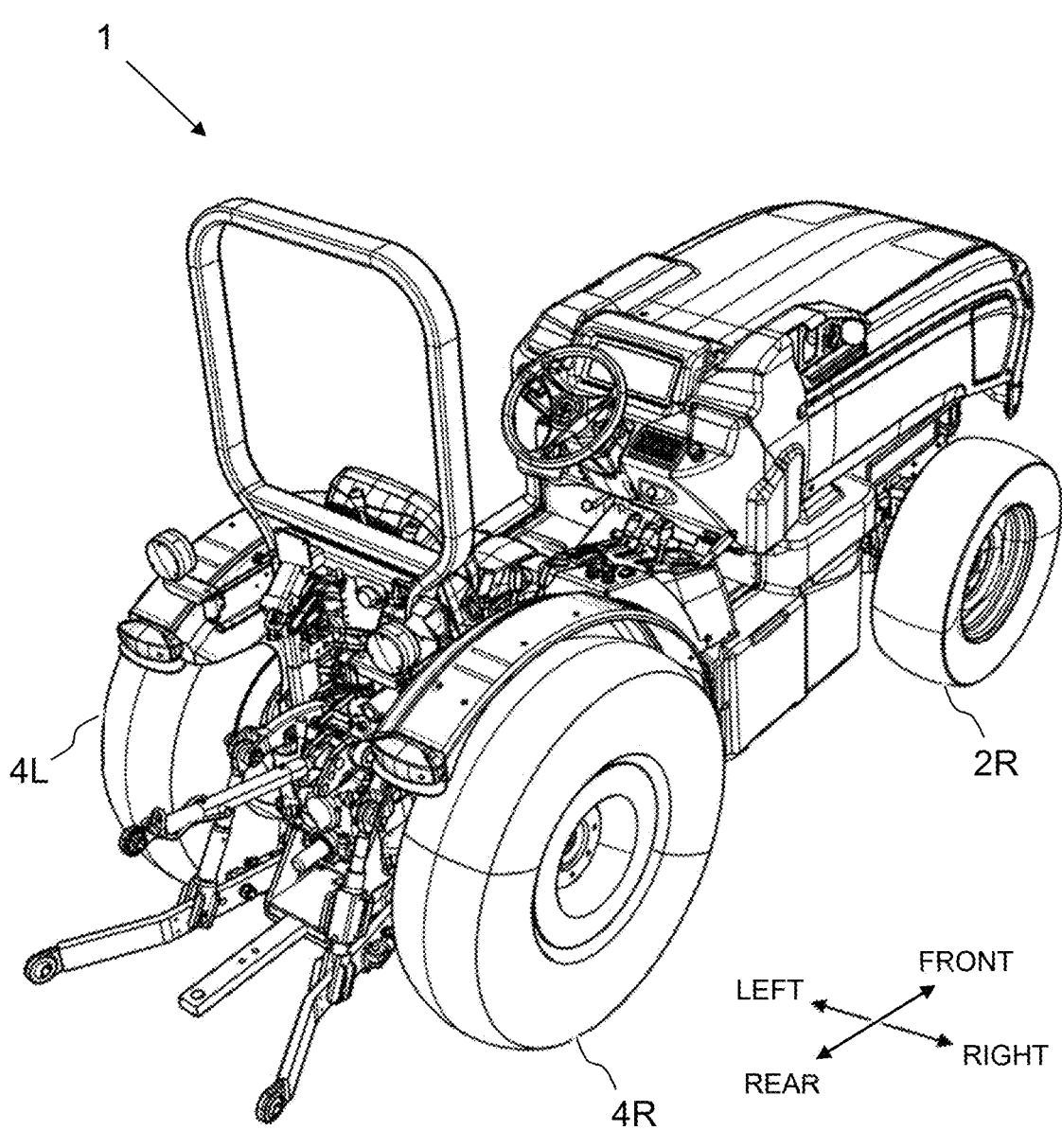
FIG. 1D shows a perspective right-rear view of an electric vehicle according to a preferred embodiment of the present invention.
Figure 1E:
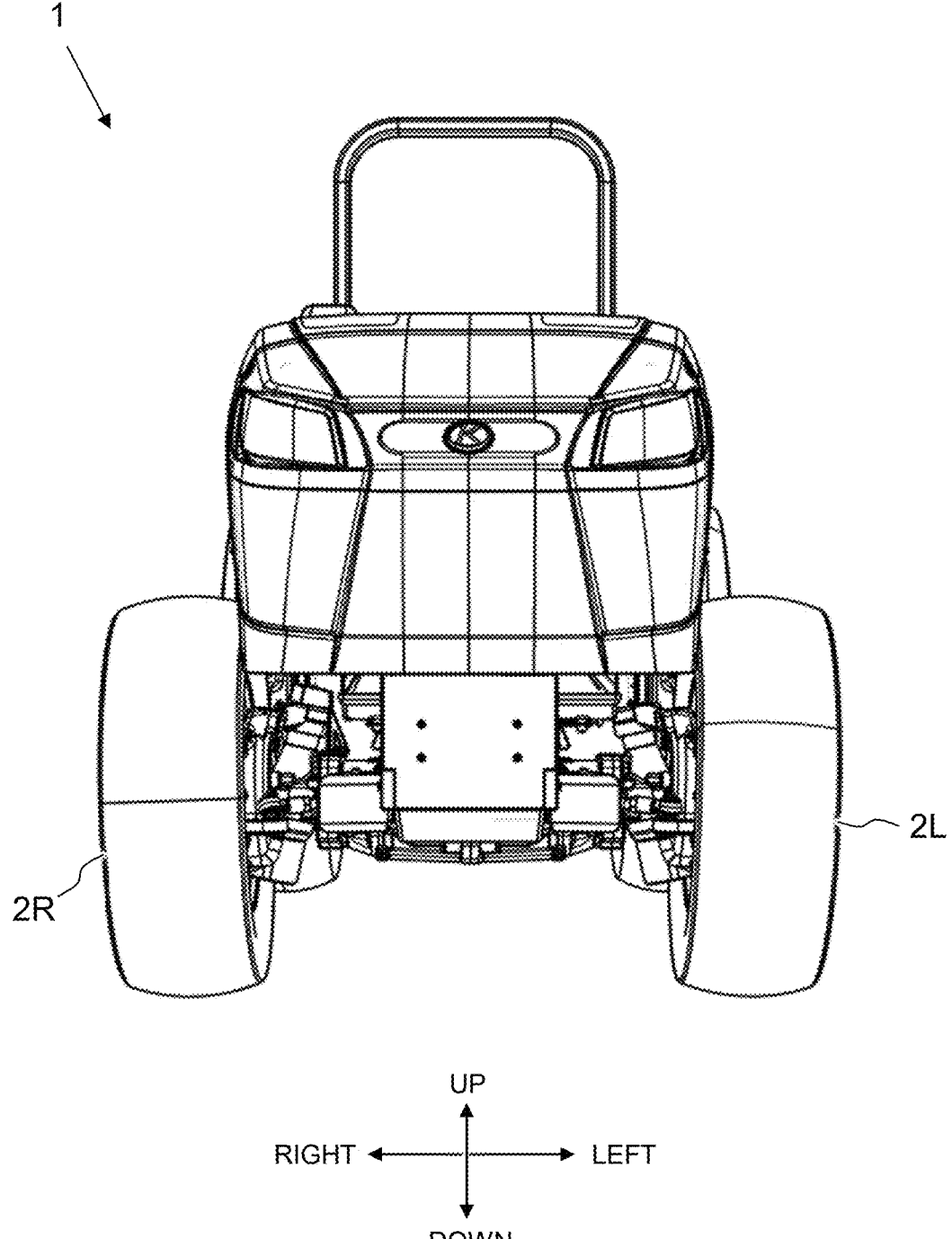
FIG. 1E shows a front view of an electric vehicle according to a preferred embodiment of the present invention.
Figure 1F:
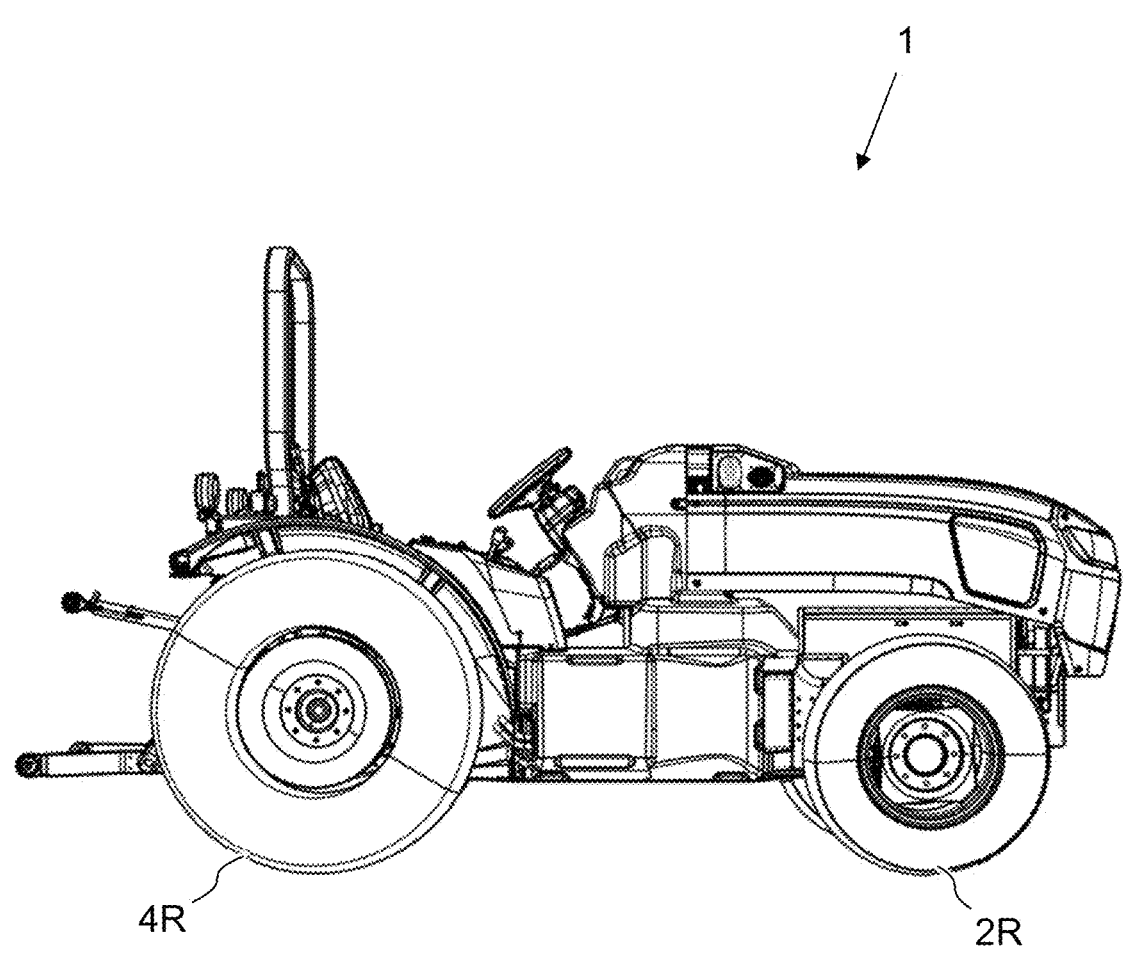
FIG. 1F shows a right side view of an electric vehicle according to a preferred embodiment of the present invention.
Figure 1G:
FIG. 1G shows a left side view of an electric vehicle according to a preferred embodiment of the present invention.
Figure 1G:
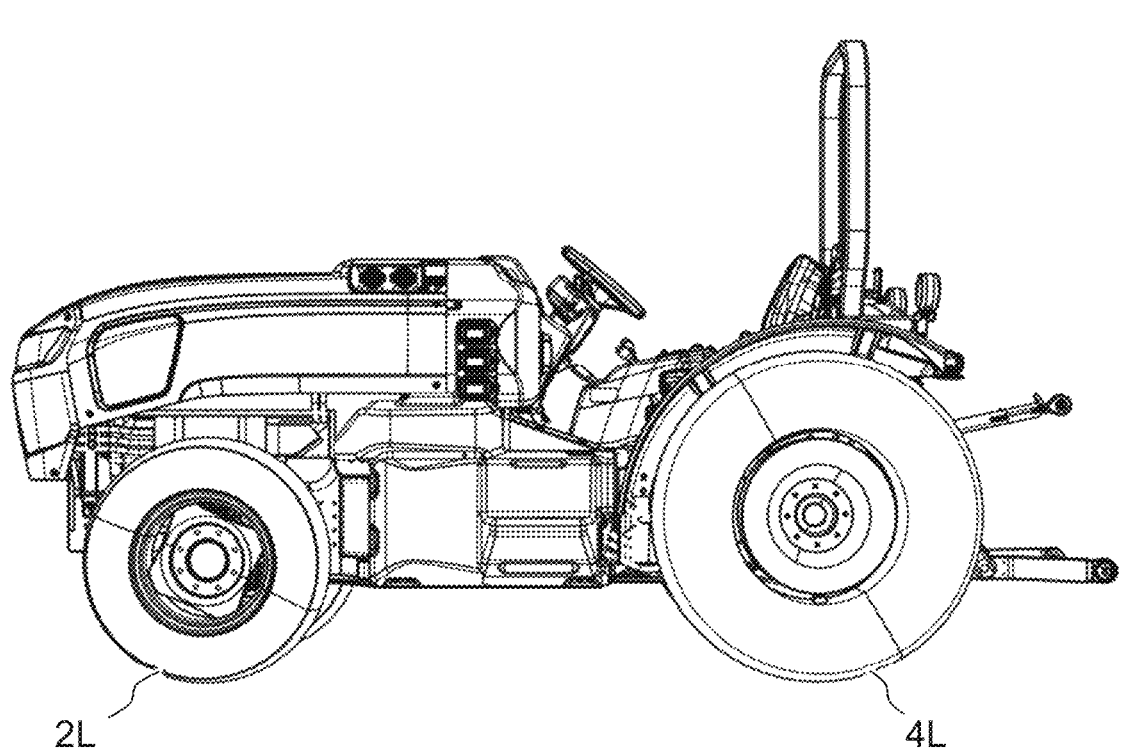
Figure 1H:
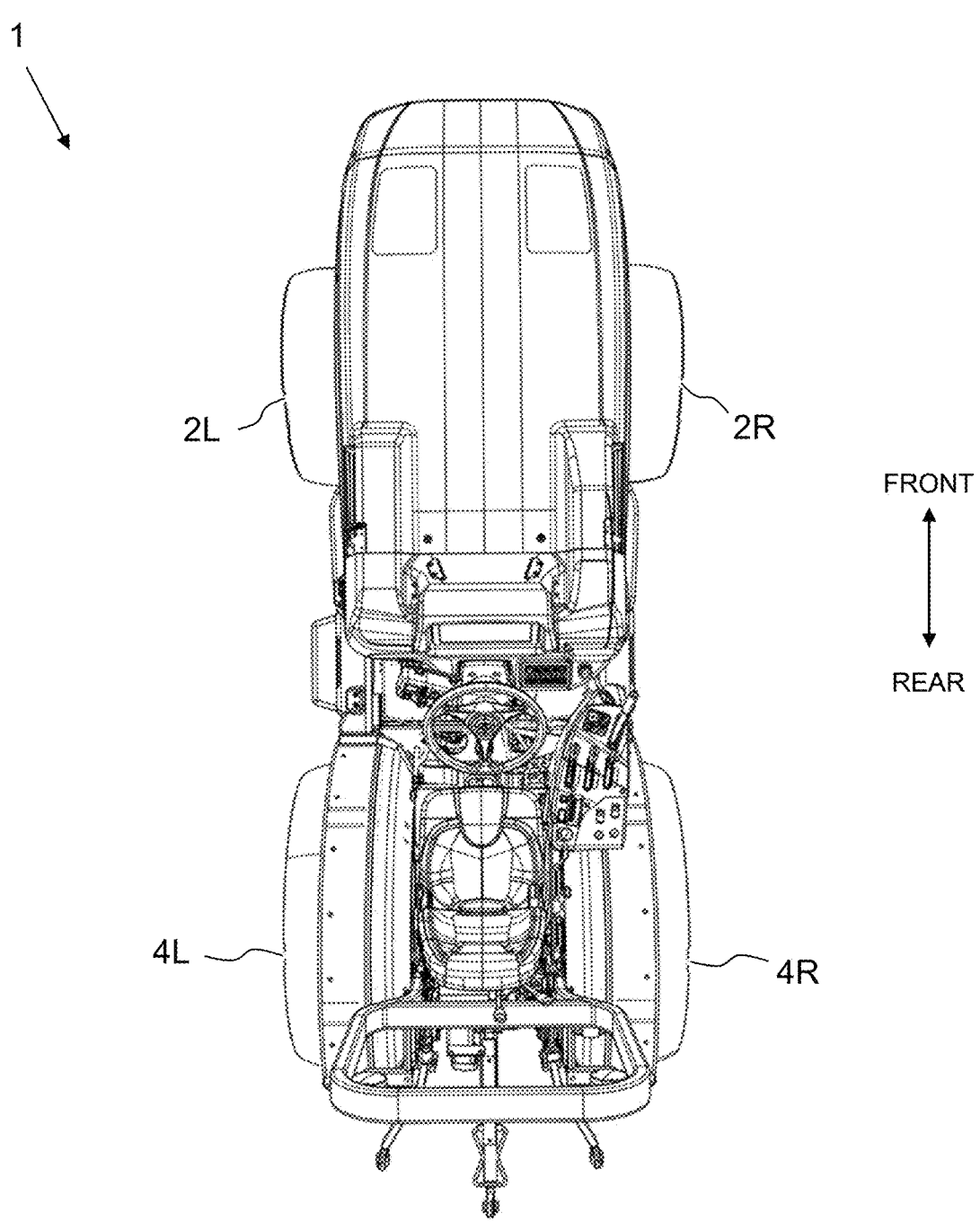
FIG. 1H shows a top view of an electric vehicle according to a preferred embodiment of the present invention.
Figure 1I:
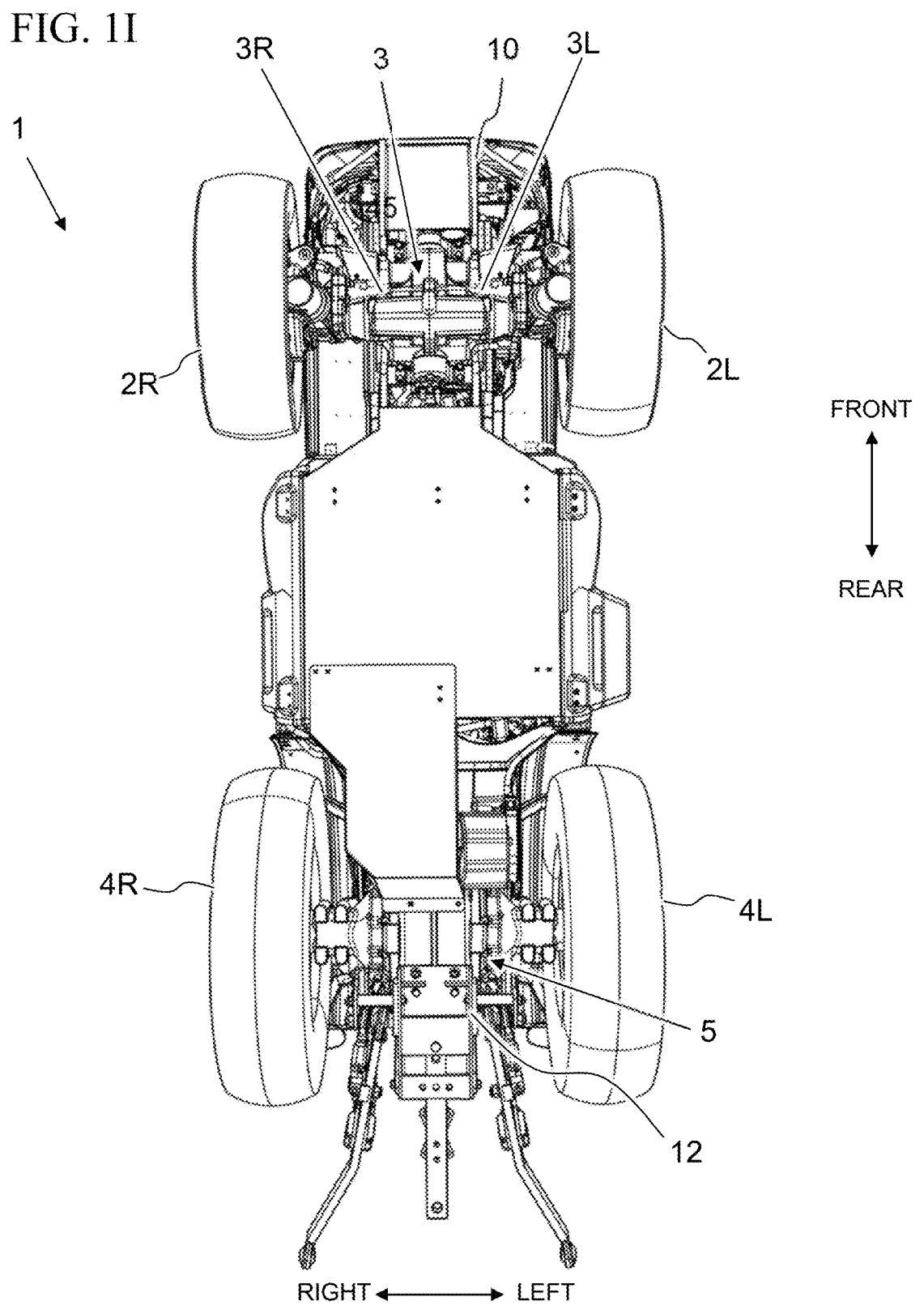
FIG. 1I shows a bottom view of an electric vehicle according to a preferred embodiment of the present invention.

FIG. 1A to 1I show an electric vehicle 1 according to a preferred embodiment of the present invention. FIGS. 1A and 1B show perspective views from left and right front ends of the vehicle 1, respectively. FIG. 1C shows an isometric view from a left rear end of the vehicle 1. FIG. 1D shows an isometric view from a right rear end of the vehicle 1. FIG. 1E shows a front view of the vehicle 1. FIGS. 1F and 1G are side views of the vehicle 1. FIGS. 1H and 1I are top and bottom views of the vehicle 1, respectively.

In a preferred embodiment of the present invention, as shown, for example, in FIGS. 1A-1H, the vehicle 1 includes a left front wheel 2L, a right front wheel 2R, a left rear wheel 4L, and a right rear wheel 4R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels or a wheel provided at a front or rear of the vehicle, etc.), six total wheels by including a pair of center wheels, and the like. In an alternative preferred embodiment, tracks can be used instead of wheels.

Figure 2:
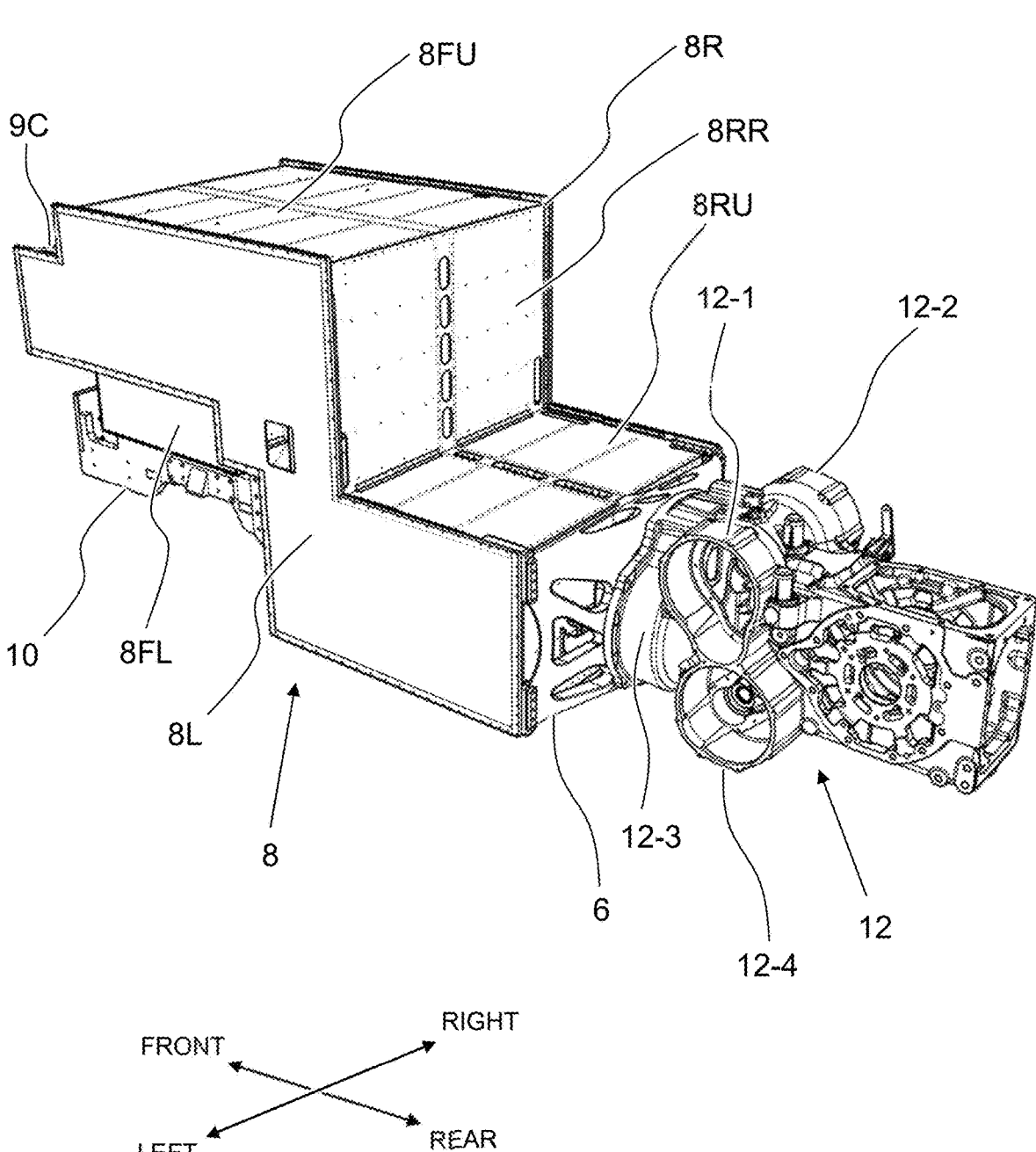
FIG. 2 shows a rear perspective view of an intermediate frame, a battery housing, a front frame, and a rear frame of an electric vehicle according to a preferred embodiment of the present invention.

In a preferred embodiment of the present invention, the vehicle 1 includes an intermediate frame 6, a battery housing 8 attached to a front portion of the intermediate frame 6, a front frame 10 attached to the battery housing 8, and a rear frame 12 attached to a rear portion of the intermediate frame 6, as shown in FIG. 2, for example. In a preferred embodiment, a front axle 3 connected to the left front wheel 2L and a right front wheel 2R is connected to and supports the front frame 10, and a rear axle 5 connected to the left rear wheel 4L and the right rear wheel 4R is connected to and supported by the rear frame 12, as shown in FIG. 1I, for example.

In a preferred embodiment of the present invention, the front axle 3 includes a left axle housing 3L and a right axle housing 3R, as shown in FIG. 1I, for example. The left axle housing 3L houses a first electric motor 14 (a left-front-wheel electric motor) that is connected to a first gearing 15 to drive the left front wheel 2L, and the right axle housing 3R houses a second electric motor 16 (a right-front-wheel electric motor) that is connected to a second gearing 17 to drive the right front wheel 2R. The first electric motor 14, the second electric motor 16, the first gearing 15, and the second gearing 17 are shown, for example, in FIG. 1J in which the left axle housing 3L and the right axle housing 3R have been removed for illustrative purposes.

Figure 1J:
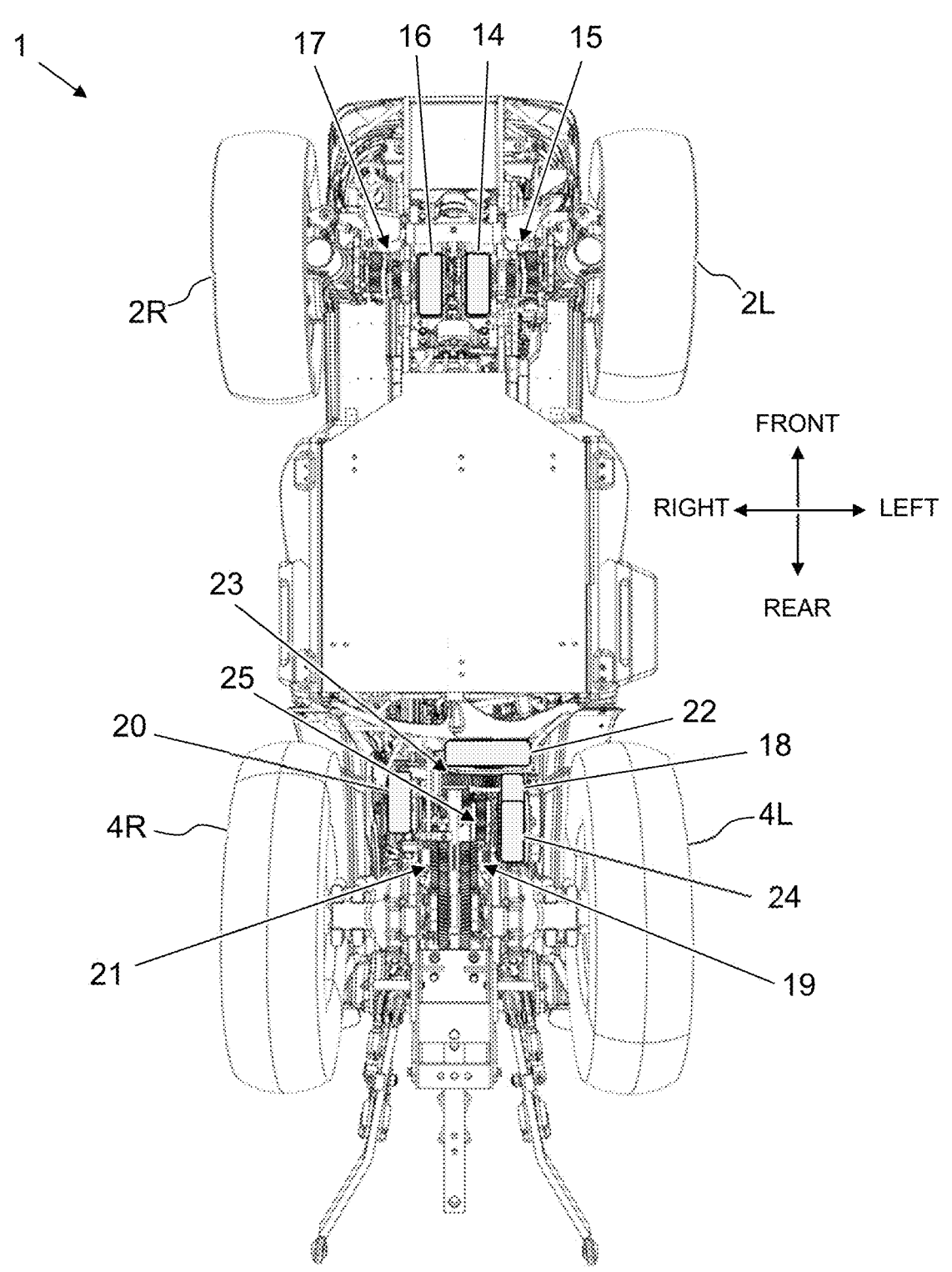
FIG. 1J shows a bottom view of an electric vehicle according to a preferred embodiment of the present invention in which certain elements have been removed for illustrative purposes.

In a preferred embodiment of the present invention, the rear frame 12 includes a first motor housing portion 12-1 to house a third electric motor 18 (a left-rear-wheel electric motor) that is connected to a third gearing 19 to drive the left rear wheel 4L, and a second motor housing portion 12-2 to house a fourth electric motor 20 (a right-rear-wheel electric motor) that is connected to a fourth gearing 21 to drive the right rear wheel 4R. Preferably, the rear frame 12 also includes a third motor housing portion 12-3 to house a fifth electric motor 22 that is connected to a fifth gearing 23 to drive a first electric vehicle component (e.g., a power take-off (PTO)), and a fourth motor housing portion 12-4 to house a sixth electric motor 24 that is connected to a sixth gearing 25 to drive a second electric vehicle component (e.g., a hydraulic system), as shown in FIGS. 1J and 2, for example. The third electric motor 18, the fourth electric motor 20, the fifth electric motor 22, and the sixth electric motor 24 are shown, for example, in FIG. 1J in which elements including the rear frame 12 have been removed for illustrative purposes. In the bottom view of FIG. 1J, the sixth electric motor 24 overlaps the third electric motor 18.

Figure 3:
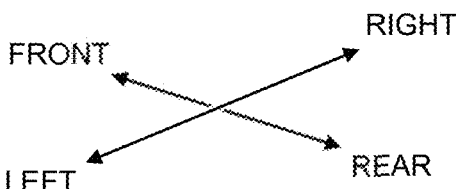
FIG. 3 shows a rear perspective view of a battery housing and a front frame of an electric vehicle according to a preferred embodiment of the present invention.

In a preferred embodiment of the present invention, the battery housing 8 includes a first battery housing portion 26, a second battery housing portion 28, a third battery housing portion 30, a fourth battery housing portion 32, and a fifth battery housing portion 34, each of which is shown in FIG. 3 using dashed lines. In a preferred embodiment, the first battery housing portion 26 can correspond to a right-rear battery housing portion, the second battery housing portion 28 can correspond to a left-rear battery housing portion, the third battery housing portion 30 can correspond to a left-front battery housing portion, the fourth battery housing portion 32 can correspond to a right-front battery housing portion, and the fifth battery housing portion 34 can correspond to a bottom-front battery housing portion.

Figure 4:
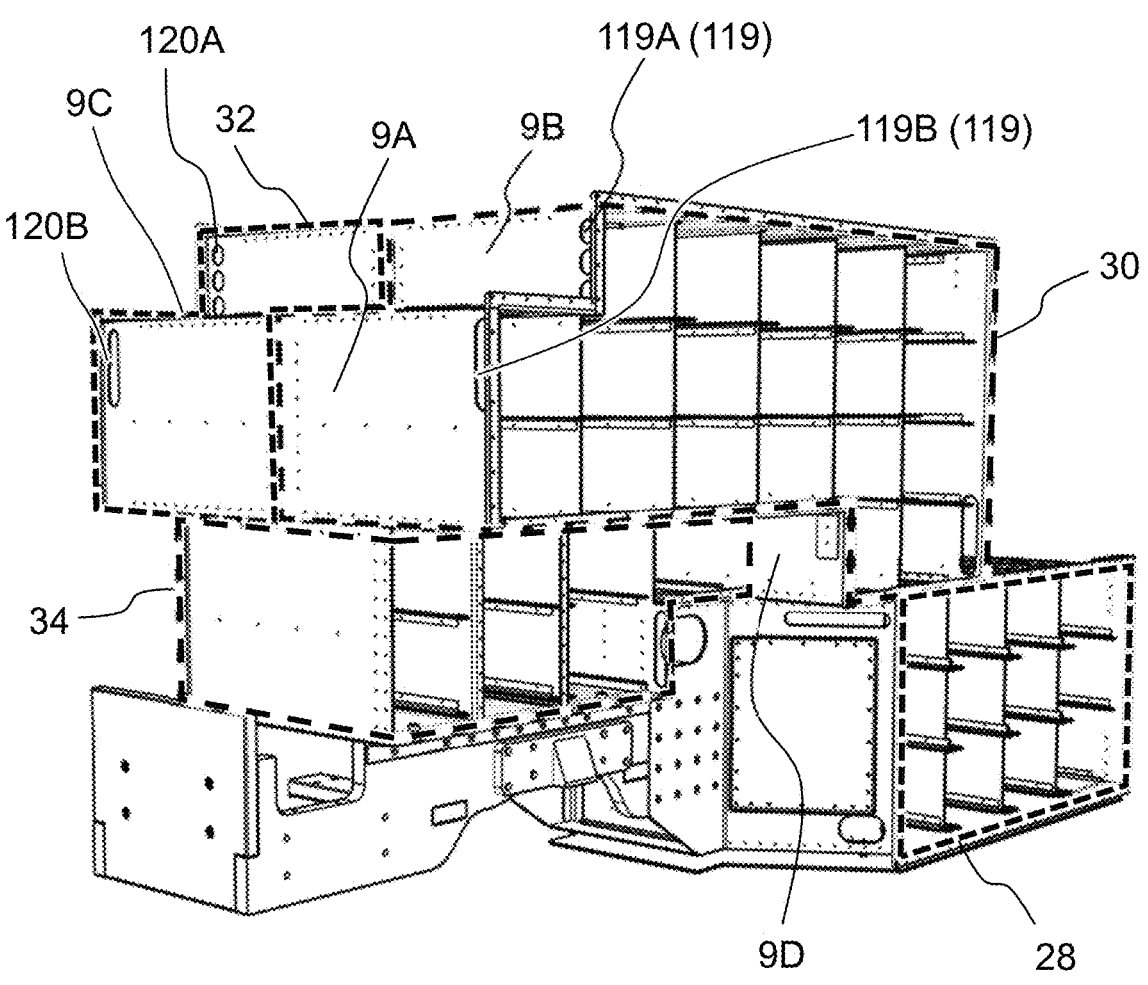
FIG. 4 shows a front perspective view of a battery housing according to a preferred embodiment of the present invention.
Figures 5A, 5B:
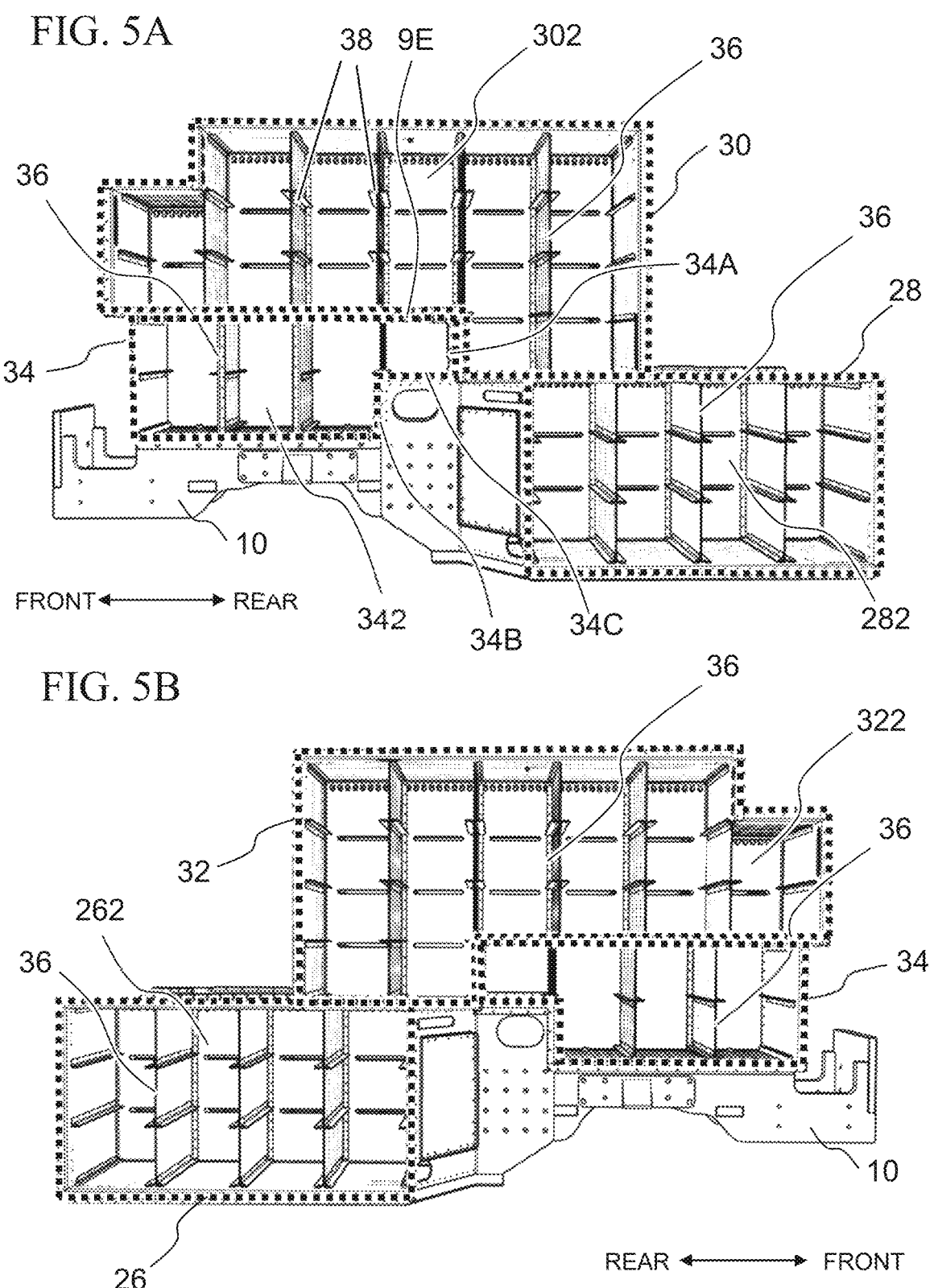
FIG. 5A shows a left side view of a battery housing according to a preferred embodiment of the present invention.
FIG. 5B shows a right side view of a battery housing according to a preferred embodiment of the present invention.

In a preferred embodiment, the first battery housing portion 26 and the second battery housing portion 28 are adjacent to each other in a width direction of the vehicle, and the third battery housing portion 30 and the fourth battery housing portion 32 are adjacent to each other in a width direction of the vehicle. In a preferred embodiment, a width of each of the first battery housing portion 26, the second battery housing portion 28, the third battery housing portion 30, the fourth battery housing portion 32, and the fifth battery housing portion 34 in the width direction of the vehicle is equal or substantially equal. FIGS. 4, 5A, and 5B show the battery housing 8 with the battery housing portion covers removed for illustrative purposes.

In a preferred embodiment, the first battery housing portion 26 and the second battery housing portion 28 are included in a first battery housing section 8-1 (a rear battery housing section), the third battery housing portion 30 and the fourth battery housing portion 32 are included in a second battery housing section 8-2 (a forward-upper battery housing section), and the fifth battery housing portion 34 is included in a third battery housing section 8-3 (a forward-lower battery housing section), as shown in FIG. 3, for example. The first battery housing portion 26 and the second battery housing portion 28 of the first battery housing section 8-1 are adjacent to each other in a left-right direction of the electric vehicle, and the third battery housing portion 30 and the fourth battery housing portion 32 of the second battery housing section 8-2 are adjacent to each other in the left-right direction of the electric vehicle. In a preferred embodiment, a width of the first battery housing section 8-1 in the left-right direction of the electric vehicle is equal or substantially equal to a width of the second battery housing section 8-2 in the left-right direction of the electric vehicle, and a width of the third battery housing section 8-3 is less than the width of the first battery housing section 8-1 and the width of the second battery housing section 8-2. Preferably, a rear surface of the third battery housing section 8-3 is spaced away from a front surface of the first battery housing section 8-1. In a preferred embodiment, a rear surface of the second battery housing section 8-2 intersects a middle portion of the first battery housing section 8-1 in a front-rear direction of the electric vehicle, for example, in a top view and a side view.

Figure 17:
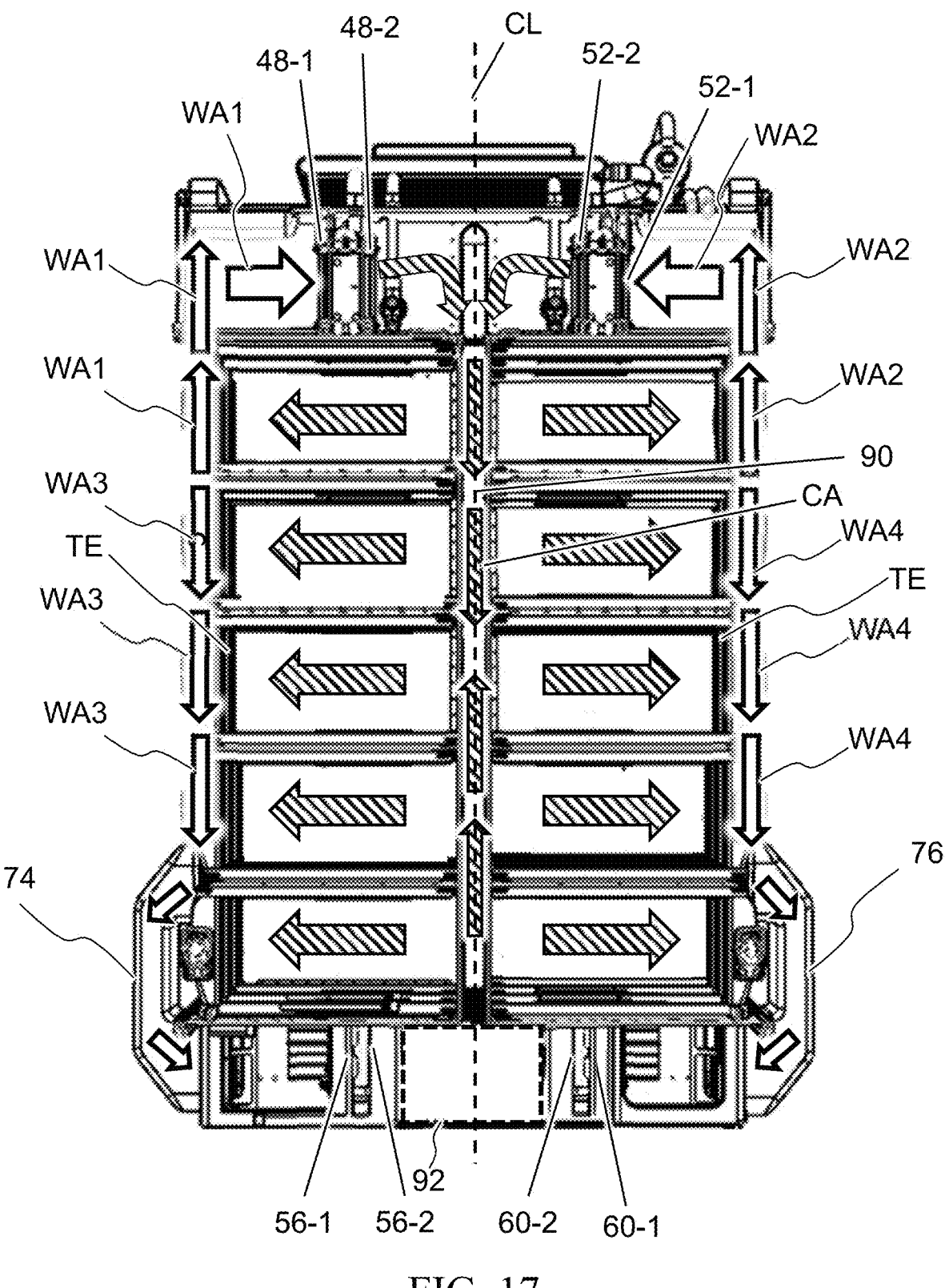
FIG. 17 is a sectional plan view along plane P17 in FIG. 16 that shows components included in an air cooling system included in an electric vehicle according to a preferred embodiment of the present invention.

In a preferred embodiment of the present invention, the second battery housing section 8-2 includes a gap 90 located between the third battery housing portion 30 and the fourth battery housing portion 32 in the left-right direction of the electric vehicle, as shown in FIG. 17, for example. The gap 90 overlaps the first battery housing section 8-1 and the third battery housing section 8-3 in a plan view and is located along a centerline CL of the electric vehicle that extends in a front-rear direction of the electric vehicle.

As shown in FIGS. 4, 5A, and 5B, each of the first battery housing portion 26, the second battery housing portion 28, the third battery housing portion 30, the fourth battery housing portion 32, and the fifth battery housing portion 34 includes a plurality of battery housing module compartments, which are each are able to receive and house a battery module. In a preferred embodiment, each of the third battery housing portion 30 and the fourth battery housing portion 32 includes more battery housing module compartments than each of the first battery housing portion 26 and the second battery housing portion 28. Preferably, the fifth battery housing portion 34 includes less battery housing module compartments than each of the first battery housing portion 26 and the second battery housing portion 28.

Figure 29A:
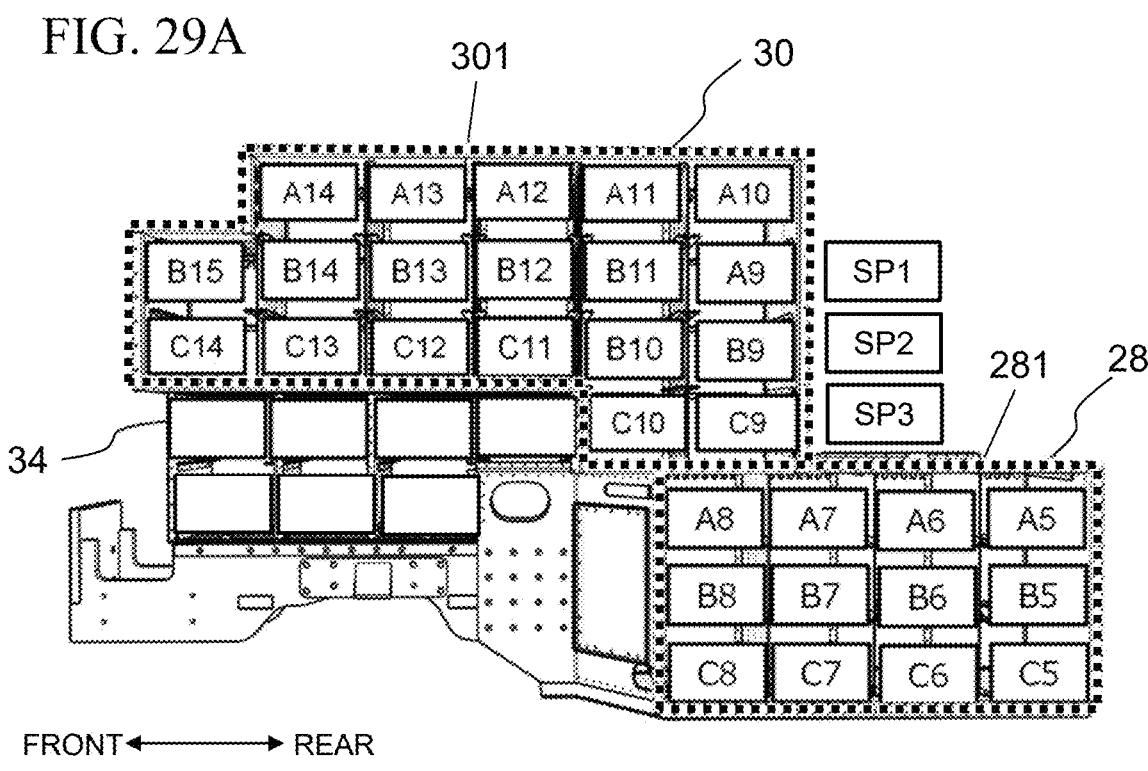
FIG. 29A is a schematic left side view of an electric vehicle according to a preferred embodiment of the present invention.
Figure 29B:
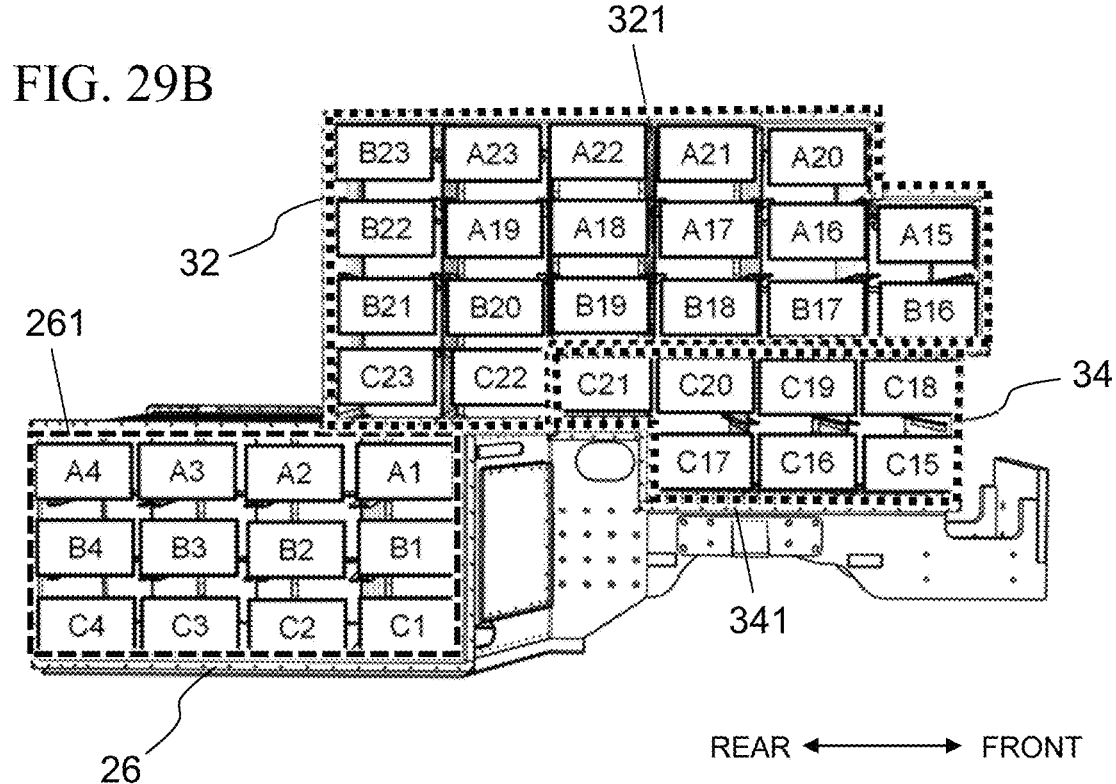
FIG. 29B is a schematic right side view of an electric vehicle according to a preferred embodiment of the present invention.

In a preferred embodiment of the present invention, the electric work vehicle 1 includes the first battery housing portion 26 to house a plurality of first battery modules 261, the second battery housing portion 28 to house a plurality of second battery modules 281, the third battery housing portion 30 to house a plurality of third battery modules 301, the fourth battery housing portion 32 to house a plurality of fourth battery modules 321, and the fifth battery housing portion 34 to house a plurality of fifth battery modules 341, as shown in FIGS. 29A and 29B, for example. In a preferred embodiment, the first battery housing portion 26, the second battery housing portion 28, the third battery housing portion 30, the fourth battery housing portion 32, and the fifth battery housing portion 34 can be supported by the front frame 10. As shown in FIGS. 5A and 5B in which certain structural features have been removed for illustrative purposes, the first battery housing portion 26 can include a plurality of openings 262 respectively connected to the plurality of battery housing module compartments that each receive a separate one of the plurality of first battery modules 261, the second battery housing portion 28 can include a plurality of openings 282 respectively connected to the plurality of battery housing module compartments that each receive a separate one of the plurality of second battery modules 281, the third battery housing portion 30 can include a plurality of openings 302 respectively connected to the plurality of battery housing module compartments that each receive a separate one of the plurality of third battery modules 301, the fourth battery housing portion 32 can include a plurality of openings 322 respectively connected to the plurality of battery housing module compartments that each receive a separate one of the plurality of fourth battery modules 321, and the fifth battery housing portion 34 can include a plurality of openings 342 respectively connected to the plurality of battery housing module compartments that each receive a separate one of the plurality of fifth battery modules 341.

In a preferred embodiment, each of the first battery modules 261, the second battery modules 281, the third battery modules 301, the fourth battery modules 321, and the fifth battery modules 341 can be provided in rows and columns. As an example, the first battery modules 261 can include three rows and four columns of the first battery modules 261 such that there are twelve (12) first battery modules 261 housed in the first battery housing portion 26, and the second battery modules 281 can include three rows and four columns of the second battery modules 281 such that there are twelve (12) second battery modules 281 housed in the second battery housing portion 28. In a preferred embodiment, the third battery modules 301 can include one row (e.g., a bottommost row) of two third battery modules 301, two rows (e.g., middle rows) of six third battery modules 301, and one row (e.g., a topmost row) of five third battery modules 301 such that there are nineteen (19) third battery modules 301 housed in the third battery housing portion 30. Similarly, in a preferred embodiment, the fourth battery modules 321 can include one row (e.g., a bottommost row) of two fourth battery modules 321, two rows (e.g., middle rows) of six fourth battery modules 321, and one row (e.g., a topmost row) of five fourth battery modules 321 such that there are nineteen (19) fourth battery modules 321 housed in the fourth battery housing portion 32. In a preferred embodiment, the fifth battery modules 341 can include one row (e.g., a bottommost row) of three fifth battery modules 341 and one row (e.g., a topmost row) of four fifth battery modules 341 such that there are seven (7) fifth battery modules 341 housed in the fifth battery housing portion 34.

Figure 23:
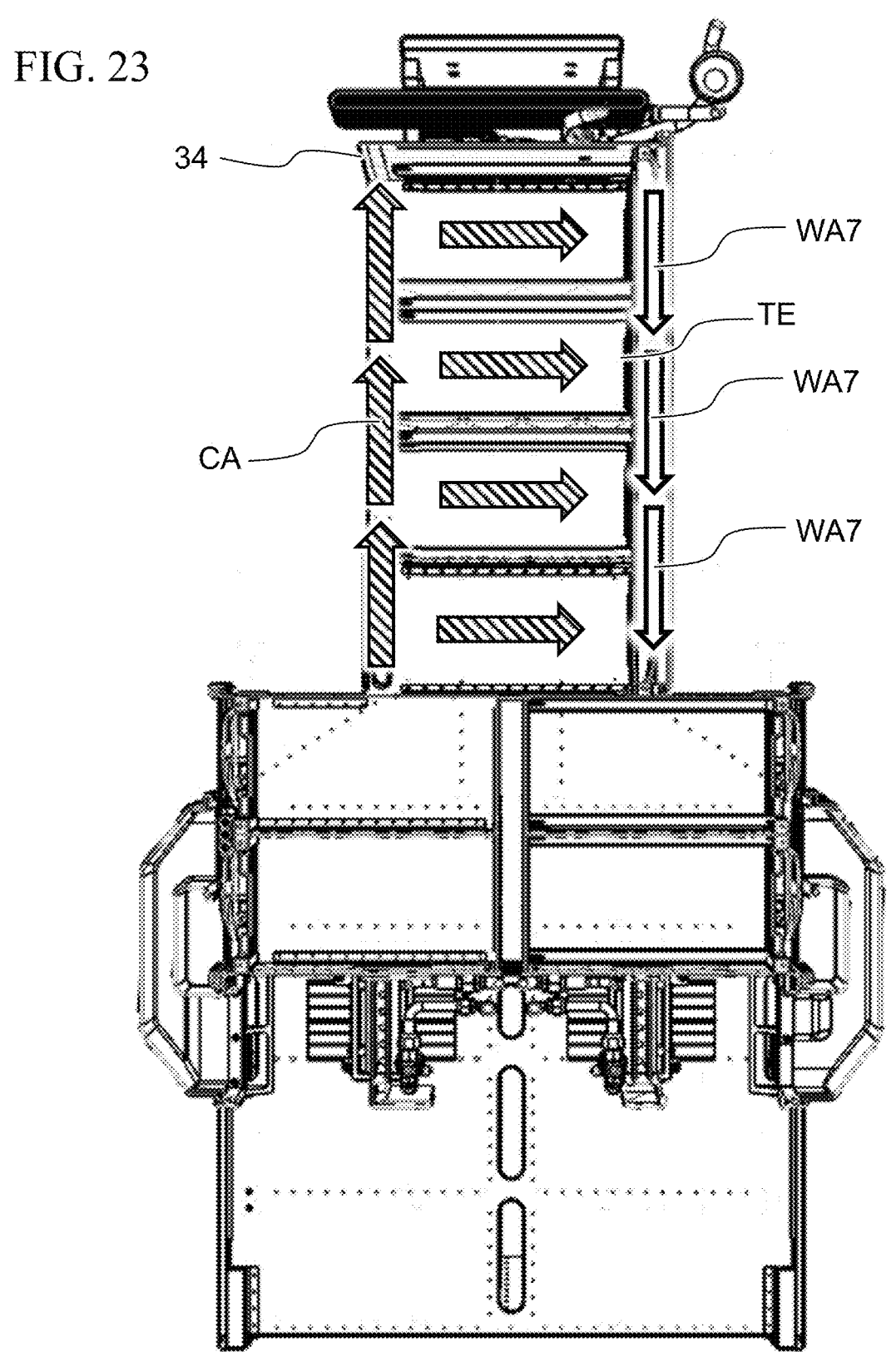
FIG. 23 is a sectional plan view along plane P23 in FIG. 16 that shows components included in an air cooling system included in an electric vehicle according to a preferred embodiment of the present invention.

In a preferred embodiment, the plurality of openings 262 of the first battery housing portion 26, the plurality of openings 282 of the second battery housing portion 28, the plurality of openings 302 of the third battery housing portion 30, the plurality of openings 322 of the fourth battery housing portion 32, and the plurality of openings 342 of the fifth battery housing portion 34 face a width/side (left-right) direction of the electric vehicle 1. The plurality of first battery modules 261 can be aligned, or substantially aligned, in rows and columns in both a vertical direction of the vehicle and the front-rear direction of the vehicle to provide compact storage of the plurality of first battery modules 261 and reduce a space required by the first battery housing portion 26. Similarly, the plurality of second battery modules 281, the plurality of third battery modules 301, the plurality of fourth battery modules 321, and the plurality of fifth battery modules 341 can be aligned, or substantially aligned, in rows and columns in both a vertical direction of the vehicle and the front-rear direction of the vehicle to provide compact storage of the battery modules and reduce a space required by each of the second battery housing portion 28, the third battery housing portion 30, the fourth battery housing portion 32, and the fifth battery housing portion 34. In a preferred embodiment, the terminal ends TE of each of the plurality of first battery modules 261, the plurality of second battery modules 281, the plurality of third battery modules 301, the plurality of fourth battery modules 321, and the plurality of fifth battery modules 341 can face a width/side (left-right) direction of the vehicle 1 when housed in the respective first battery housing portion 26, second battery housing portion 28, third battery housing portion 30, fourth battery housing portion 32, and fifth battery housing portion 34, as shown in FIGS. 17 and 23, for example.

In a preferred embodiment, the third battery housing section 8-3 is attached to a bottom surface of the second battery housing section 8-2, and the second battery housing section 8-2 and the third battery housing section 8-3 can be arranged in a "T" shape, as shown in FIGS. 3 and 4, for example. In other words, the second battery housing section 8-2 can have a width that is greater than a width of the third battery housing section 8-3 in a width/side (left-right) direction of the vehicle, such that the second battery housing section 8-2 extends beyond the third battery housing section 8-3 in the width/side (left-right) direction of the vehicle. The structure of the second battery housing section 8-2 overhanging/extending farther than the third battery housing section 8-3 in the width direction of the vehicle can provide a space for the left front wheel 2L and the right front wheel 2R to operate and turn. FIGS. 4, 5A, and 5B show perspective and side views of the battery housing 8 with the battery modules removed for clarity.

Figure 26:
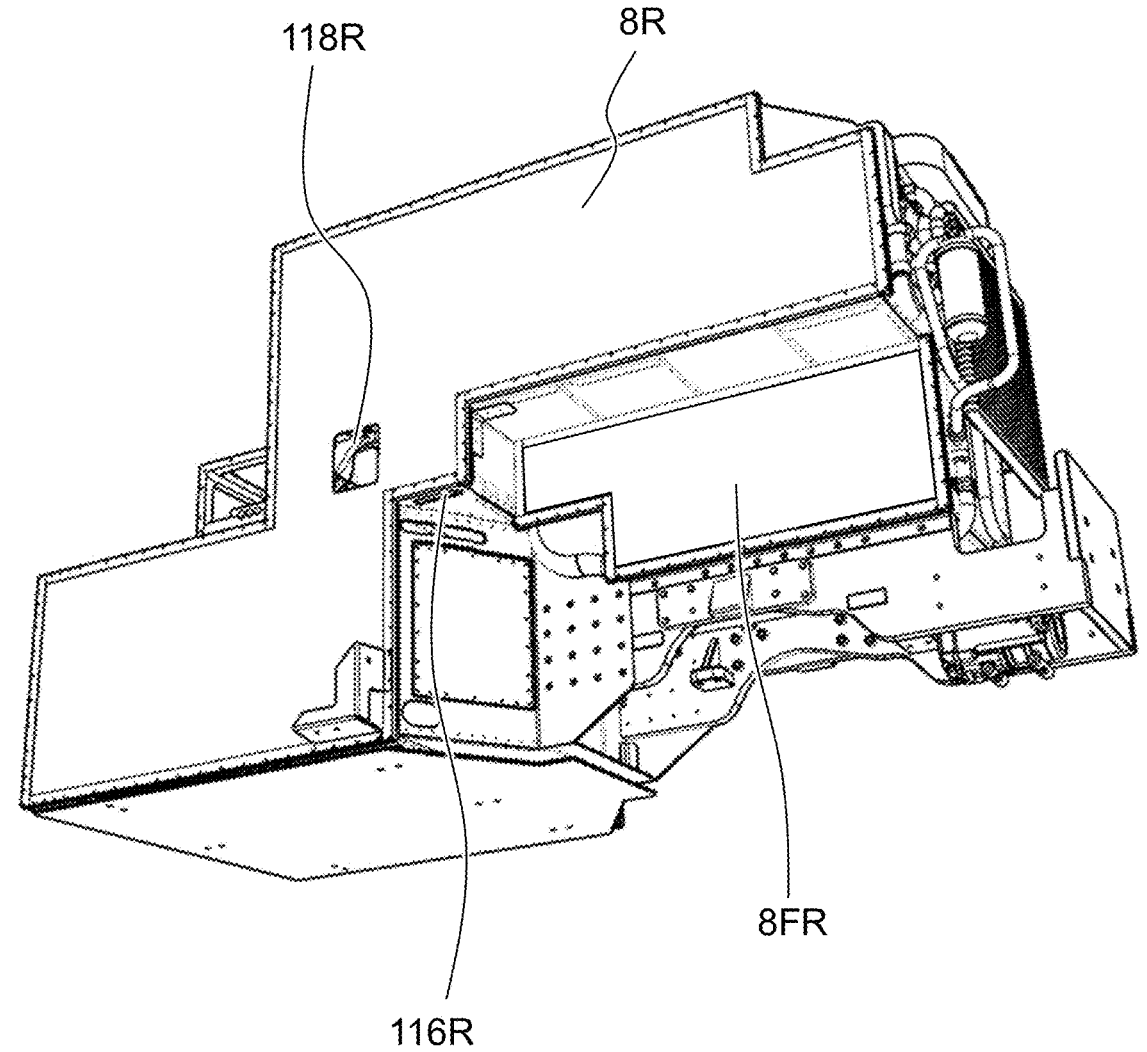
FIG. 26 is a bottom perspective view of an electric vehicle according to a preferred embodiment of the present invention.

As shown, for example, in FIGS. 2 and 26, the battery housing 8 preferably includes a first side cover 8L (a left side cover) which covers a portion of a first side of the battery housing 8, a second side cover 8R (a right side cover) which covers a portion of a second side of the battery housing 8, a third side cover 8FL (a left-front side cover) which covers a first side of the fifth battery housing portion 34, a fourth side cover 8FR (a right-front side cover) which covers a second side of the fifth battery housing portion 34, a front-upper cover 8FU which covers a front upper side of the battery housing 8, a rear cover 8RR which covers an upper rear side of the battery housing, and a rear-upper cover 8RU which covers a rear upper side of the battery housing 8. As shown in FIGS. 5A and 5B, each of the first battery housing portion 26, the second battery housing portion 28, the third battery housing portion 30, the fourth battery housing portion 32, and the fifth battery housing portion 34 includes cross walls 36 that delineate the vertical columns in which the battery modules are arrayed and mounting bars 38 that support the battery modules.

As shown, for example, in FIGS. 2 and 4, the battery housing 8 includes a first front surface 9A and a second front surface 9B offset rearwardly and upwardly from the first front surface 9A to define a recess/step 9C located between the first front surface 9A and the second front surface 9B. For example, the first front surface 9A covers a first front portion of the third battery housing portion 30 and a first front portion of the fourth battery housing portion 32, and a second front surface 9B covers a second front portion of the third battery housing portion 30 and a second front portion of the fourth battery housing portion 32.

In a preferred embodiment, as shown in FIG. 5A, for example, the fifth battery housing portion 34 includes a first rear surface 34A and a second rear surface 34B offset forwardly and downwardly from the first rear surface 34A to define a recess/step 34C located between the first rear surface 34A and the second rear surface 34B.

Figure 25:
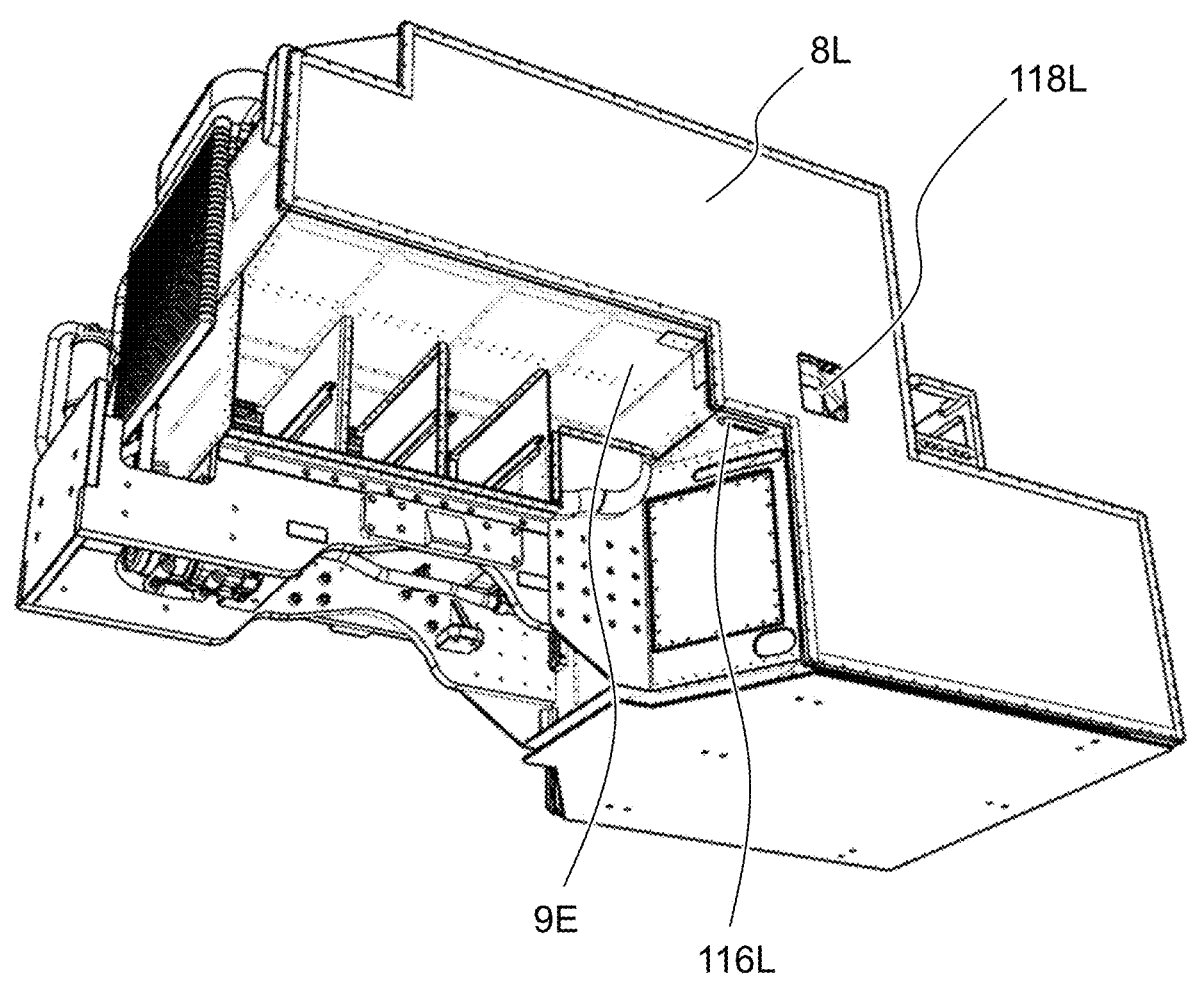
FIG. 25 is a bottom perspective view of an electric vehicle according to a preferred embodiment of the present invention.

In a preferred embodiment, the battery housing 8 can also include a third front surface 9D offset rearwardly and downwardly from the first front surface 9A to define a recess/step 9E located between the first front surface 9A and the third front surface 9C, as shown in FIGS. 4 and 25, for example. For example, the third front surface 9D covers a third front portion of the third battery housing portion 30 and a third front portion of the fourth battery housing portion 32.

In a preferred embodiment of the present invention, the first battery modules 261, the second battery modules 281, the third battery modules 301, the fourth battery modules 321, and the fifth battery modules 341 can be lithium titanium oxide (LTO) battery modules. The battery modules including the first battery modules 261, the second battery modules 281, the third battery modules 301, the fourth battery modules 321, and the fifth battery modules 341 can be sealed within their corresponding housings (the first battery housing portion 26, the second battery housing portion 28, the third battery housing portion 30, the fourth battery housing portion 32, and the fifth battery housing portion 34) and each of the first battery modules 261, the second battery modules 281, the third battery modules 301, the fourth battery modules 321, and the fifth battery modules 341 can be removed and replaced upon failure.

As other examples, the first battery modules 261, the second battery modules 281, the third battery modules 301, the fourth battery modules 321, and the fifth battery modules 341 can be lithium ferrophosphate (LFP) battery modules or nickel manganese cobalt (NMC) battery modules, for example. LFP battery modules or NMC battery modules can be provided as smaller and/or lighter battery modules than LTO battery modules, for example.

In a preferred embodiment, communication among the first battery modules 261, the second battery modules 281, the third battery modules 301, the fourth battery modules 321, and the fifth battery modules 341 can be provided by a battery management unit (BMU) 136 or the like over a controller area network (CAN) bus. The BMU, or a plurality of BMUs, can be provided in or on one or more of the first battery housing portion 26, the second battery housing portion 28, the third battery housing portion 30, the fourth battery housing portion 32, and the fifth battery housing portion 34, or can be provided at other location(s) in or on the electric vehicle 1. The vehicle 1 can also include a battery management system (BMS) that aggregates information from each of the battery housing portions. The BMS can be implemented by a supervisory control unit (SCU) that can be connected to a PDU. The BMS can control charging and discharging of the battery modules, and preferably maintain each of the first battery modules 261, the second battery modules 281, the third battery modules 301, the fourth battery modules 321, and the fifth battery modules 341 in a state of charge between about 20% and about 80%, for example, to reduce battery module degradation. The state of charge can be maintained on a cell level within each battery module, a battery module level, a battery housing portion level.

Figure 6:
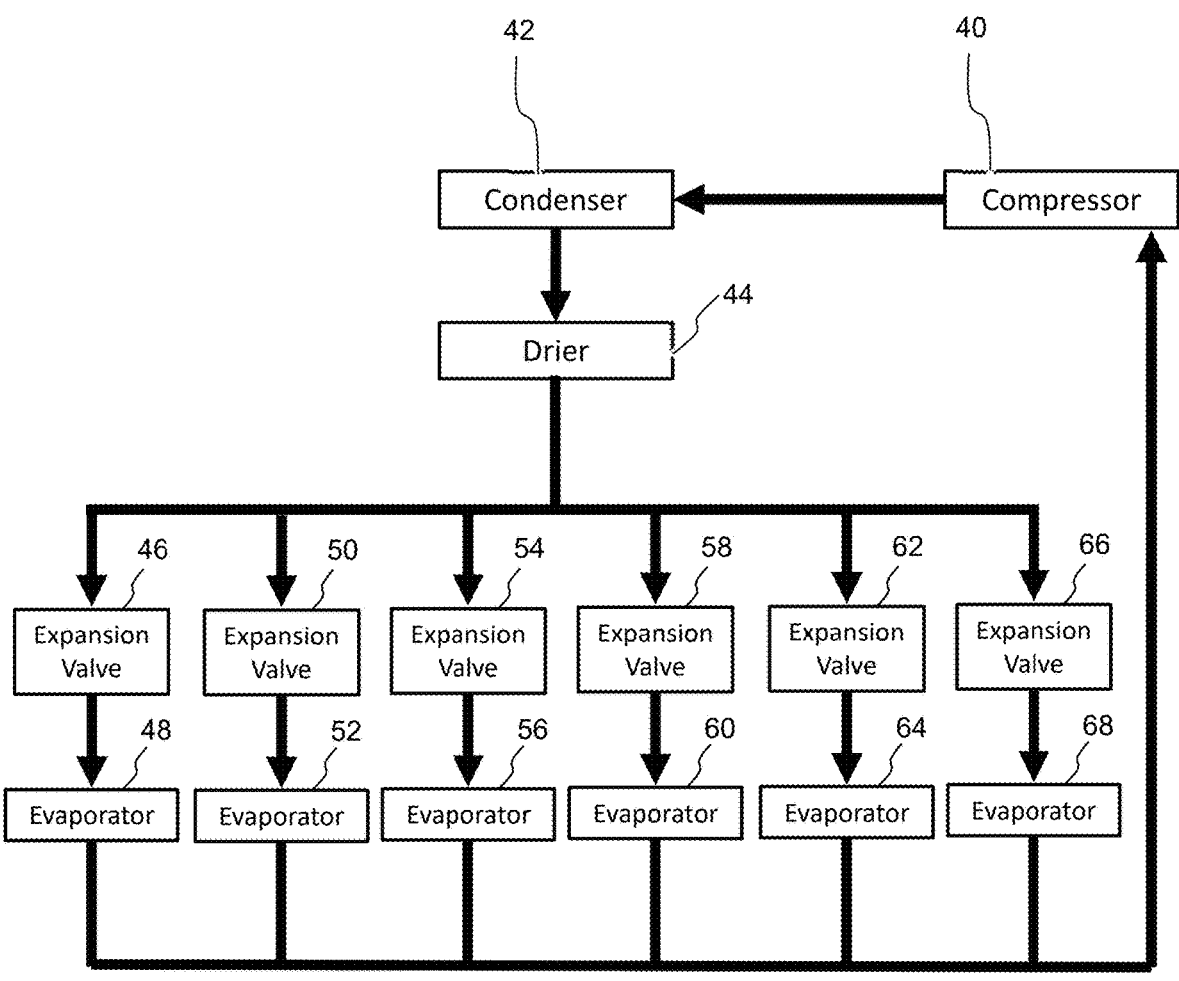
FIG. 6 is a schematic that shows a flow of refrigerant through portions of an air cooling system according to a preferred embodiment of the present invention.

In a preferred embodiment of the present invention, the electric vehicle 1 includes an air cooling system that is structured to cool the first battery modules 261, the second battery modules 281, the third battery modules 301, the fourth battery modules 321, and the fifth battery modules 341. FIG. 6 is a schematic that shows a flow of refrigerant through portions of the air cooling system. For example, FIG. 6 shows a flow of refrigerant through an AC compressor 40, a condenser 42, a drier 44, a first expansion valve 46, a first evaporator/evaporator coil 48, a second expansion valve 50, a second evaporator/evaporator coil 52, a third expansion valve 54, a third evaporator/evaporator coil 56, a fourth expansion valve 58, a fourth evaporator/evaporator coil 60, a fifth expansion valve 62, a fifth evaporator/evaporator coil 64, a sixth expansion valve 66, and a sixth evaporator/evaporator coil 68. In a preferred embodiment, the AC compressor 40 can include an integrated motor and compressor which is powered by one or more of the first battery modules 261, the second battery modules 281, the third battery modules 301, the fourth battery modules 321, and the fifth battery modules 341. The AC compressor 40 is operable to increase the pressure of the refrigerant R and sends hot, high pressure refrigerant R (gas) to the condenser 42. The condenser 42 reduces the temperature of the refrigerant R but maintains the refrigerant R at high pressure. The reduced-temperature, high pressure refrigerant R (liquid) is sent from the condenser 42 to the drier 44, in which water/moisture is removed from the refrigerant R, before the refrigerant R (liquid) is sent to each of the first expansion valve 46, the second expansion valve 50, the third expansion valve 54, the fourth expansion valve 58, the fifth expansion valve 62, the sixth expansion valve 64. The first expansion valve 46, the second expansion valve 50, the third expansion valve 54, the fourth expansion valve 58, the fifth expansion valve 62, the sixth expansion valve 64 reduce the pressure of the refrigerant R, which reduces the temperature of the refrigerant R. The cold refrigerant R (liquid) from the first expansion valve 46 is sent to the first evaporator coil 48 to cool the first evaporator coil 48, the cold refrigerant R (liquid) from the second expansion valve 50 is sent to the second evaporator coil 52 to cool the second evaporator coil 52, the cold refrigerant R (liquid) from the third expansion valve 54 is sent to the third evaporator coil 56 to cool the third evaporator coil 56, the cold refrigerant R (liquid) from the fourth expansion valve 58 is sent to the fourth evaporator coil 60 to cool the fourth evaporator coil 60, the cold refrigerant R (liquid) from the fifth expansion valve 62 is sent to the fifth evaporator coil 64 to cool the fifth evaporator coil 64, and the cold refrigerant R (liquid) from the sixth expansion valve 66 is sent to the sixth evaporator coil 68 to cool the sixth evaporator coil 68. After the refrigerant R respectively passes through the first evaporator coil 48, the second evaporator coil 52, the third evaporator coil 56, the fourth evaporator coil 60, the fifth evaporator coil 64, and the sixth evaporator coil 68, the low temperature, low pressure refrigerant R (gas) is sent back to the compressor 40.

Figure 8:
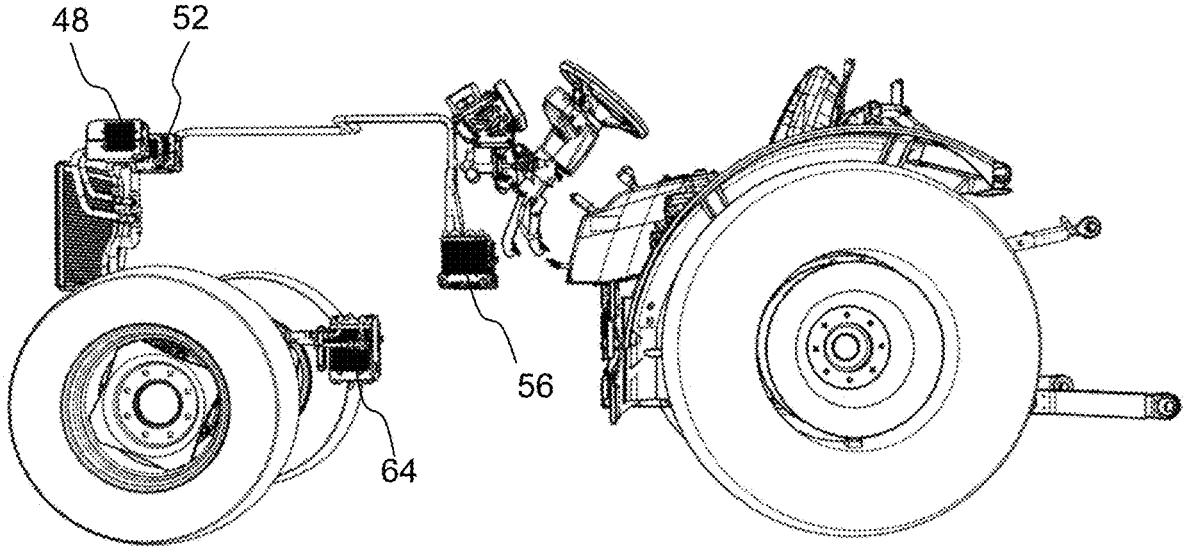
FIG. 8 is a left side view that shows components included in an air cooling system included in an electric vehicle according to a preferred embodiment of the present invention.
Figure 9:
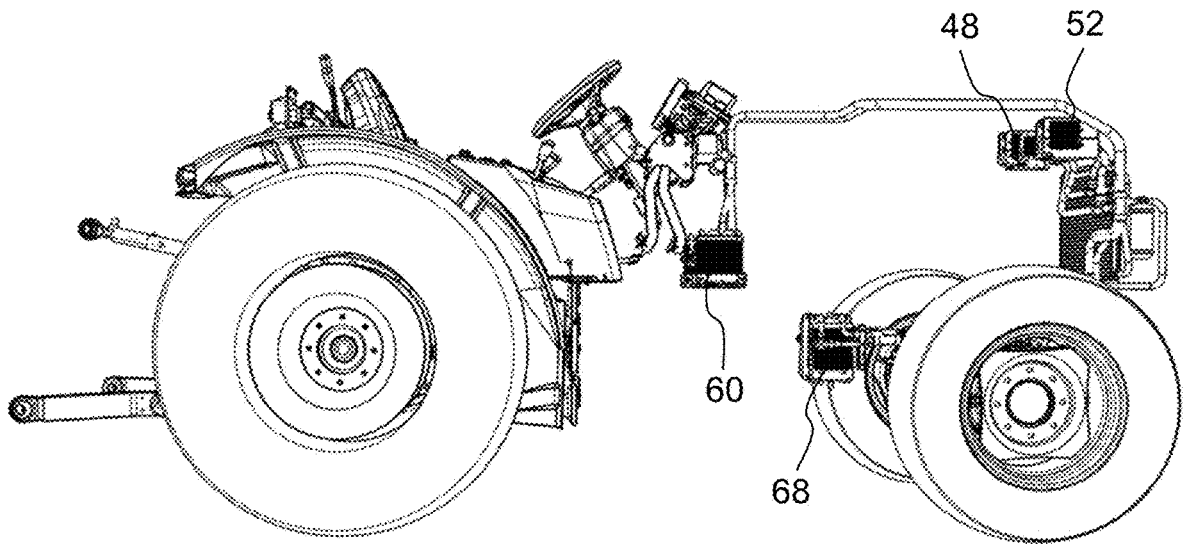
FIG. 9 is a right side view that shows components included in an air cooling system included in an electric vehicle according to a preferred embodiment of the present invention.
Figure 10:
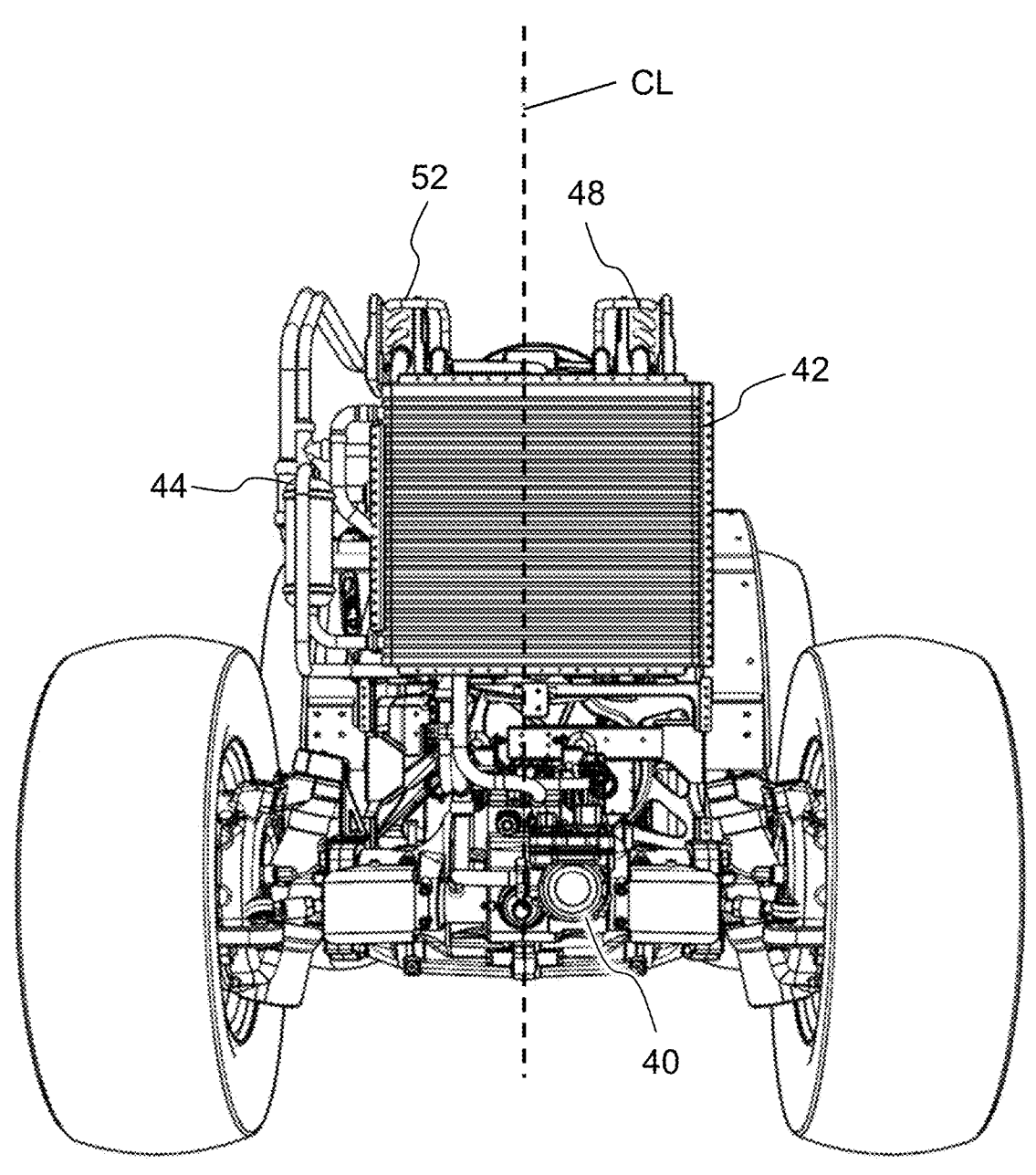
FIG. 10 is a front view that shows components included in an air cooling system included in an electric vehicle according to a preferred embodiment of the present invention.
Figure 11:
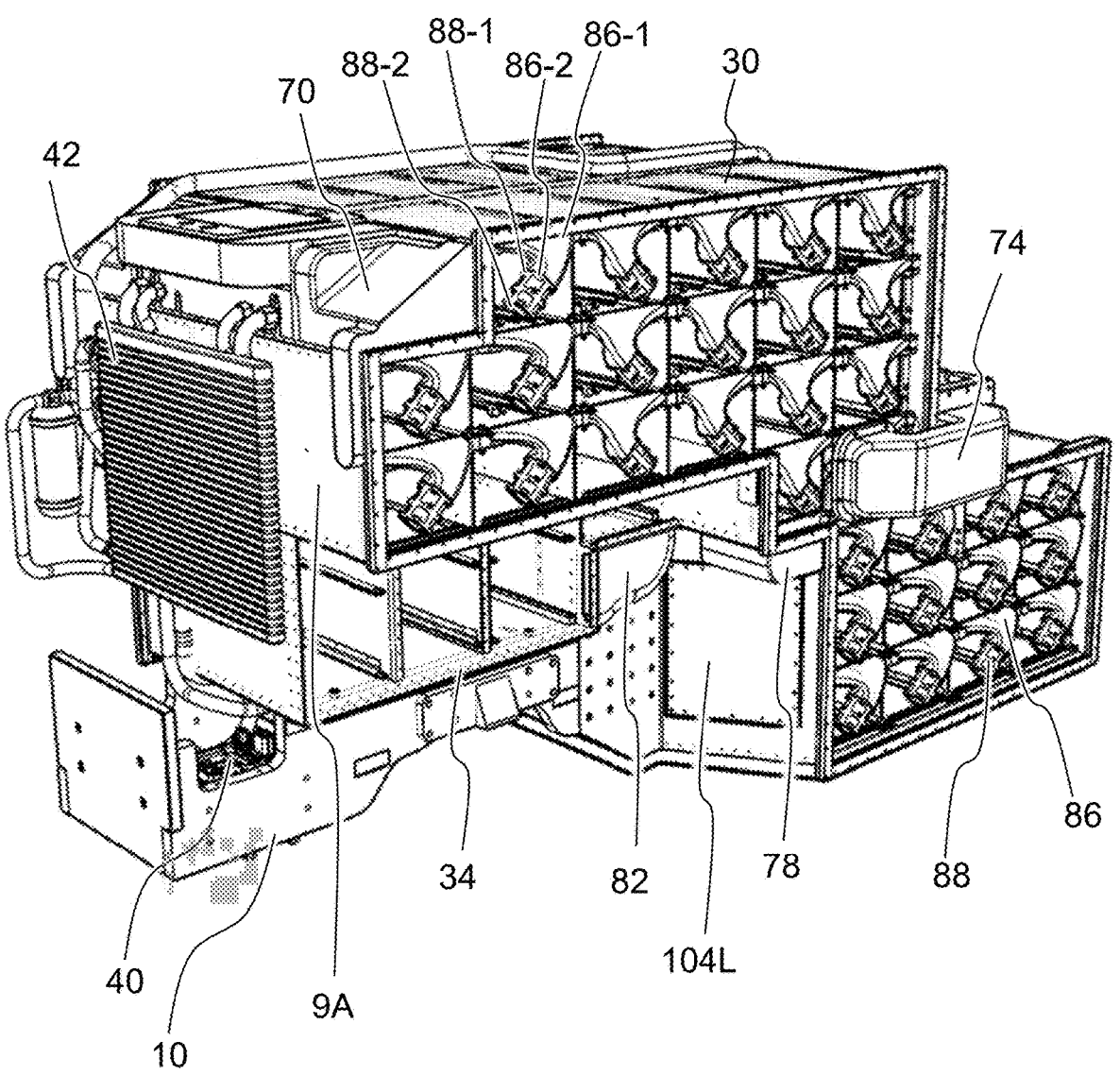
FIG. 11 is a front perspective view that shows components included in an air cooling system included in an electric vehicle according to a preferred embodiment of the present invention.

As shown, for example, in FIGS. 7-10 in which certain structural features have been removed for illustrative purposes, in a preferred embodiment, the AC compressor 40 is located forward of the front axle 3 in front-rear direction of the electric vehicle 1. The AC compressor 40 can be supported by the front axle 3 and/or the front frame 10, which are supported by the battery housing 8. For example, the AC compressor 40 can be mounted to the front frame 10 and located between side walls of the front frame 10 in a left-right direction of the electric vehicle, as shown in FIG. 11, for example. In a preferred embodiment, at least a portion of the AC compressor 40 is located forward of the first evaporator 48 and the second evaporator 52 in the front-rear direction of the electric vehicle. In a preferred embodiment, the AC compressor 40 can be located on a first side (e.g., a left side) of a center line CL of the electric vehicle that extends in the front-rear direction of the electric vehicle, as shown in FIG. 10, for example.

Figure 7:
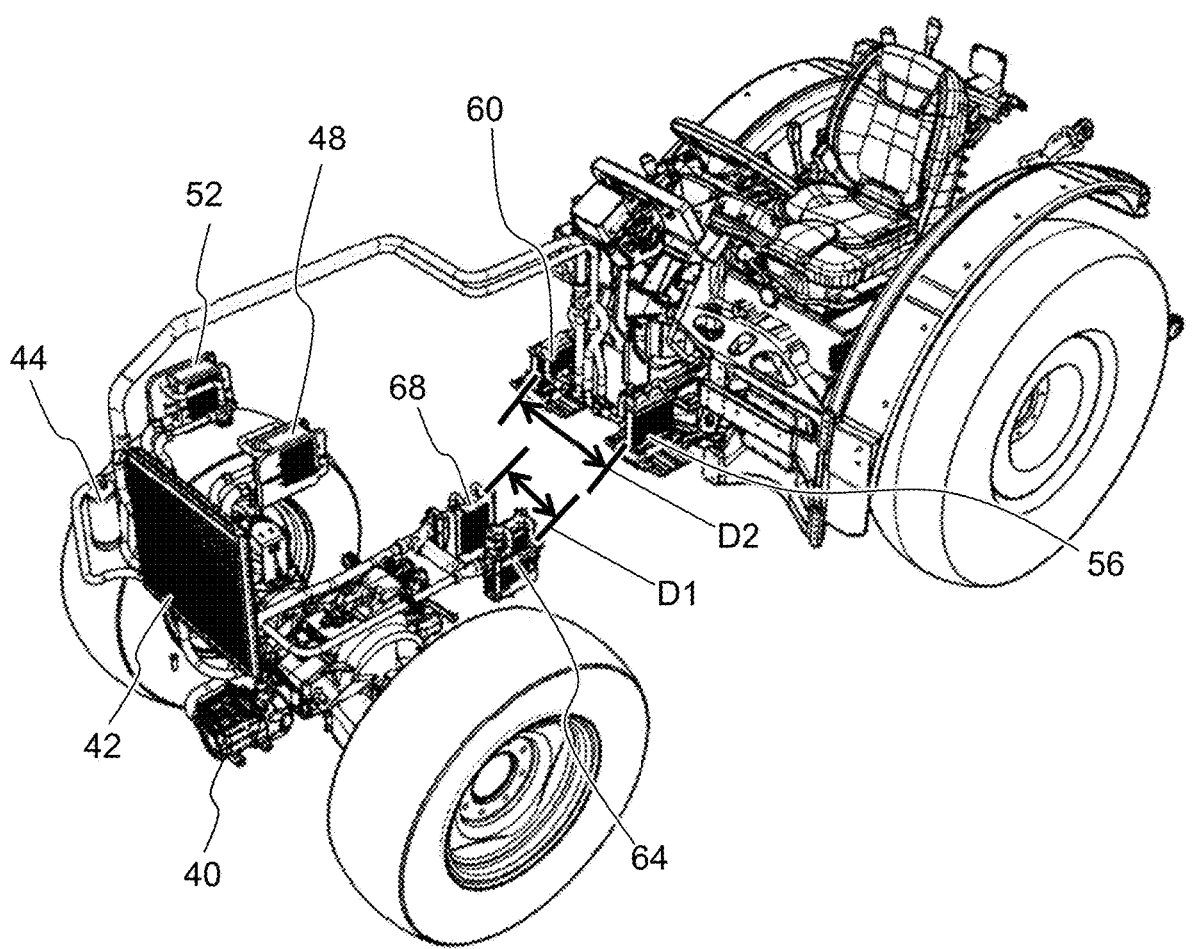
FIG. 7 is a front perspective view that shows components included in an air cooling system included in an electric vehicle according to a preferred embodiment of the present invention.

In a preferred embodiment, the condenser 42 can be mounted to the first front surface 9A, as shown in FIG. 11, for example. The condenser 42 can be located above the AC compressor 40 in an up-down direction of the electric vehicle 1, and a fluid connection between the AC compressor 40 and the condenser 42 can extend in an up-down direction of the electric vehicle 1. In a preferred embodiment, a majority of the condenser 42 can be located on a first side (e.g., a left side) of the center line CL of the electric vehicle, as shown in FIG. 10, for example. In a preferred embodiment, at least a portion of the condenser 42 is located between the AC compressor 40 and the first evaporator 48 in the front-rear direction of the electric vehicle, as shown in FIG. 7, for example.

In a preferred embodiment of the present invention, the drier 44 can be located on a first side (e.g., a right side) of the condenser 42 in a left-right direction of the electric vehicle 1, and the drier 44 is fluidly connected to the condenser 42. In a preferred embodiment, the first evaporator 48 and the second evaporator 52 are located rearward of the drier 44 in the front-rear direction of the electric vehicle. In a preferred embodiment, the drier 44 is located on a side (e.g., a right side) of the centerline CL of the electric vehicle that is opposite to the side (e.g., a left side) of the center line CL on which a majority of the condenser 42 is located, as shown in FIG. 10, for example.

As shown, for example, in FIGS. 7-10, the first evaporator coil 48 and the second evaporator coil 52 are located forward of the front axle 3 in the front-rear direction of the electric vehicle 1. In a preferred embodiment, the first evaporator coil 48 and the second evaporator coil 52 are located within the recess/step 9C, and forward of the second front surface 9B, as shown in FIGS. 2 and 4, for example. The third evaporator coil 56 and the fourth evaporator coil 60 are located between the front axle 3 and the rear axle 5 in the front-rear direction of the electric vehicle 1. The fifth evaporator coil 64 and the sixth evaporator coil 68 are located between the front axle 3 and the rear axle 5 in the front-rear direction of the electric vehicle 1 and forward of the third evaporator coil 56 and the fourth evaporator coil 60 in the front-rear direction of the electric vehicle 1.

As shown, for example, in FIGS. 11-16 in which certain structural features have been removed for illustrative purposes, in a preferred embodiment, the air cooling system includes a first duct 70 (e.g., a forward-left duct), a second duct 72 (e.g., a forward-right duct), a third duct 74 (e.g., a rear-left-side duct), a fourth duct 76 (e.g., a rear-right-side duct), a fifth duct 78 (e.g., an intermediate left-side duct), a sixth duct 80 (e.g., an intermediate right-side duct), a seventh duct 82 (e.g., forward-left-side duct), and an eighth duct 84 (e.g., forward-right-side duct).

In a preferred embodiment of the present invention, the first duct 70 (e.g., the forward-left duct) is connected to a front surface of the third battery housing portion 30, the second duct 72 (e.g., the forward-right duct) is connected to a front surface of the fourth battery housing portion 32, the third duct 74 (e.g., the rear-left-side duct) is connected to a left side of the third battery housing portion 30, the fourth duct 76 (e.g., the rear-right-side duct) is connected to a right side of the fourth battery housing portion 32, the fifth duct 78 (e.g., the intermediate left-side duct) is connected to a bottom surface of the third battery housing portion 30, the sixth duct 80 (e.g., the intermediate right-side duct) is connected to a bottom surface of the fourth battery housing portion 32, the seventh duct 82 (e.g., the forward-left-side duct) is connected to a bottom surface and a rear surface of the fifth battery housing portion 34 on a left side of the electric vehicle, and the eighth duct 84 (e.g., the forward-right-side duct) is connected to a bottom surface and a rear surface of the fifth battery housing portion 34 on a right side of the electric vehicle.

Next, a flow of air through the air cooling system according to a preferred embodiment of the present disclosure will be described. In a preferred embodiment, a lateral duct 86 and a lateral blower 88 are attached to each of the battery housing module compartments included in the first battery housing portion 26, the second battery housing portion 28, the third battery housing portion 30, the fourth battery housing portion 32, and the fifth battery housing portion 34, as shown in FIGS. 11-14, for example. In a preferred embodiment, each of the lateral blowers 88 includes a blower motor and fan. In a preferred embodiment, each of the lateral ducts 86 includes a first end 86-1 connected to a respective battery housing module compartment and a second end 86-2 which is opposite to the first end 86-1 and is connected to the lateral blower 88, and each of the lateral blowers 88 includes a first end 88-1 attached to the second end of the lateral duct 86 and a second end 88-2 which is opposite to the first end 88-1 and is a free end from which air is directed out of the lateral blower 88. In other words, in a preferred embodiment, the lateral blower 88 directs air in a direction from the first end 88-1 of the lateral blower 88 to the second end 88-2 of the lateral blower 88.

Figure 24A:
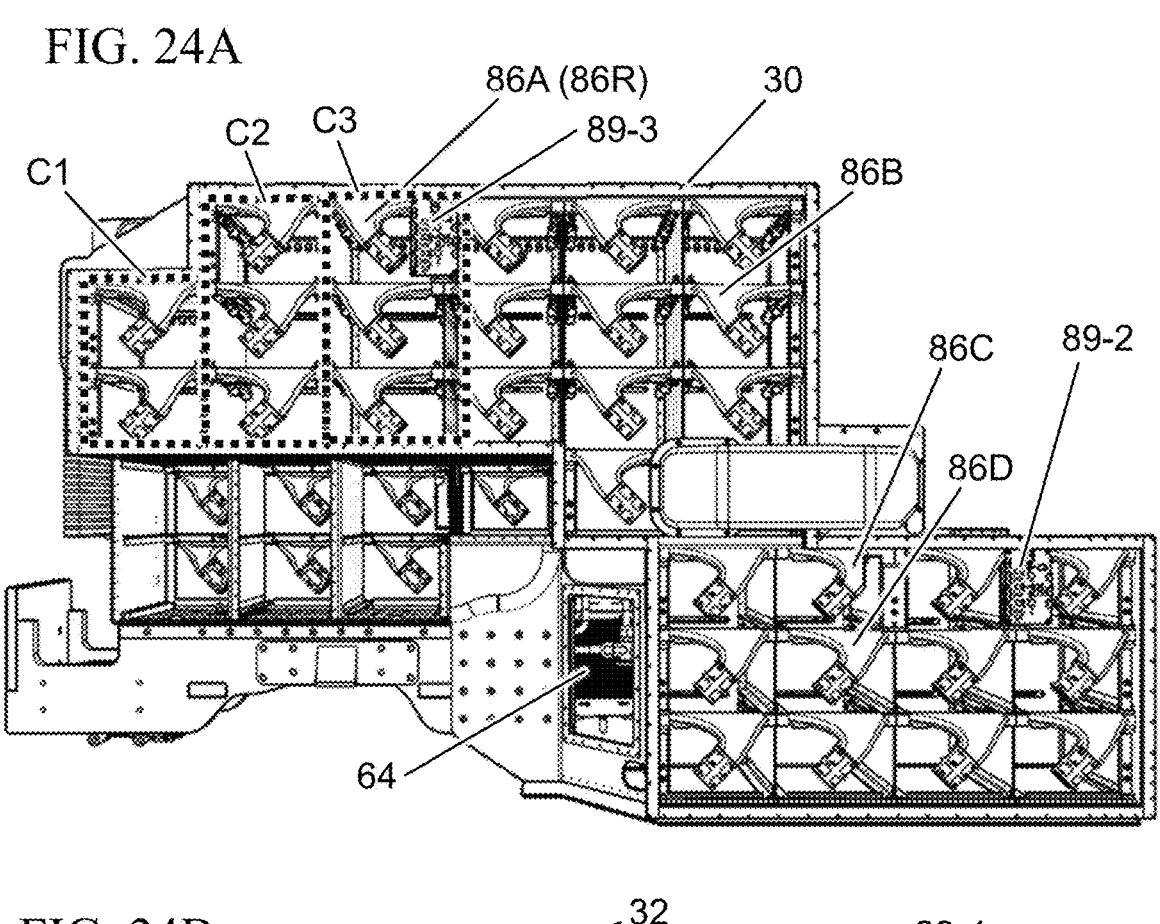
FIG. 24A is a left side view that shows components included in an air cooling system included in an electric vehicle according to a preferred embodiment of the present invention.

In a preferred embodiment of the present invention, one or more of the lateral ducts 86 may be a different size and/or shape from another one of the lateral ducts 86. For example, in a preferred embodiment shown in FIGS. 24A and 24B, the lateral ducts 86A attached to a certain row (e.g., a top row) of the battery housing module compartments of a particular battery housing portion can be shorter in length (e.g., in front-rear direction of the electric vehicle) than the lateral ducts 86B attached to another row of battery housing module compartments of the particular battery housing portion. For example, as shown in FIG. 24A, the lateral ducts 86A attached to a top row of the battery housing module compartments of the third battery housing portion 30 can be shorter in length in a front-rear direction of the electric vehicle than the lateral ducts 86B attached to another row (e.g., a lower row) of the battery housing module compartments of the third battery housing portion 30. In other words, one of the plurality of lateral ducts 86A attached to a first row of battery housing module compartments can be a different size and/or shape than another one of the plurality of ducts 86B attached to a second row of the battery housing module compartments that is spaced apart from the first row of battery housing module compartments in an up-down direction of the electric vehicle. In a preferred embodiment, the lateral ducts 86A being shorter in length than the lateral ducts 86B attached to another row can created space in which an electronic component, such as the controller 89-3 discussed in more detail below, can be located. For example, as shown in FIG. 24A, the controller 89-3 can be attached to the top row of the battery housing module compartments of the third battery housing portion 30 and located adjacent to the lateral duct 86A. Similarly, as shown in FIG. 24A, the lateral duct 86C attached to a top row of the battery housing module compartments of the second battery housing portion 28 can be shorter in length in a front-rear direction of the electric vehicle than the lateral ducts 86D attached to another row (e.g., a lower row) of the battery housing module compartments of the second battery housing portion 28. In other words, one of the plurality of lateral ducts 86C attached to a first row of battery housing module compartments can be a different size and/or shape than another one of the plurality of ducts 86D attached to a second row of the battery housing module compartments that is spaced apart from the first row of battery housing module compartments in an up-down direction of the electric vehicle. In a preferred embodiment, the lateral duct 86C being shorter in length than the lateral ducts 86D attached to another row can created space in which an electronic component, such as the controller 89-2 discussed in more detail below, can be located. For example, as shown in FIG. 24A, the controller 89-2 can be attached to the top row of the battery housing module compartments of the second battery housing portion 28.

Figure 15:
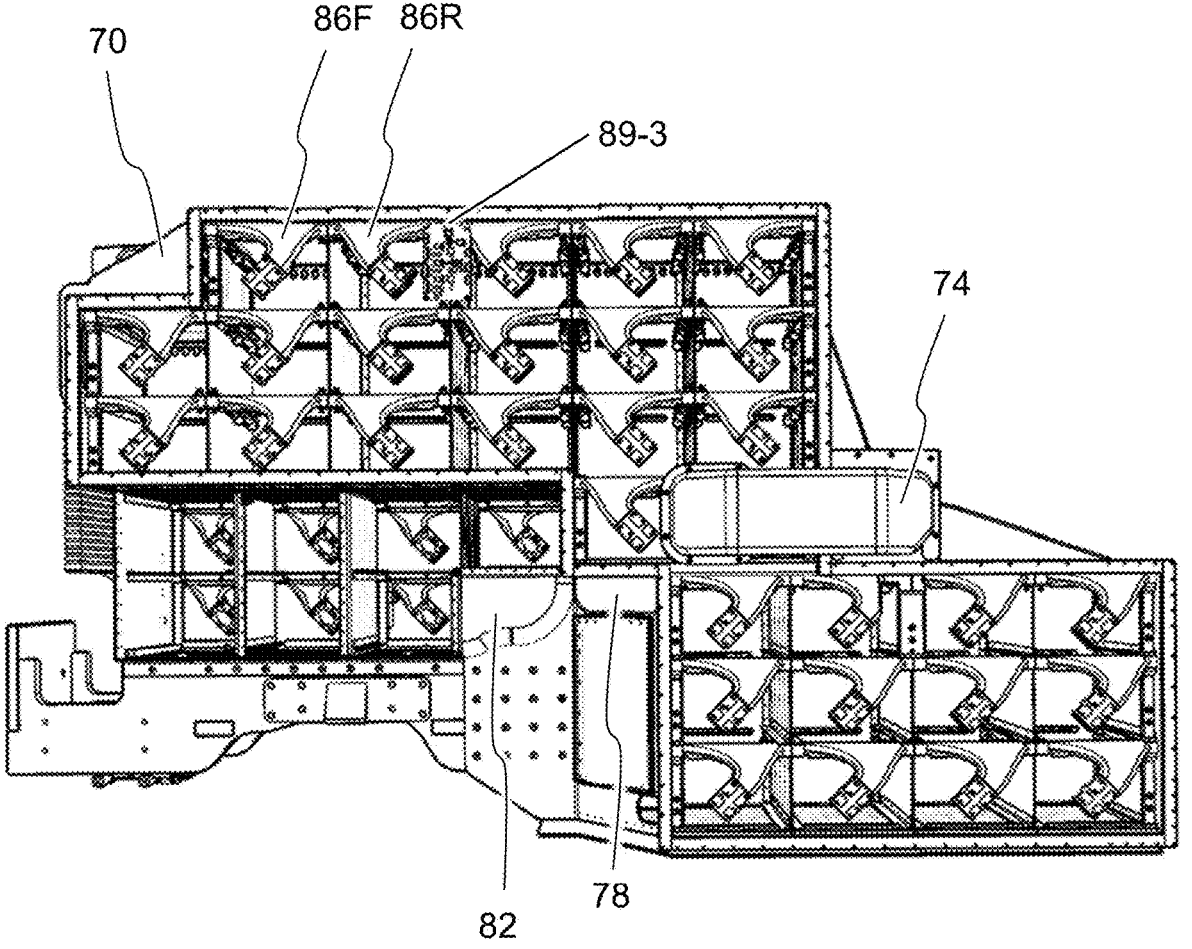
FIG. 15 is a left side view that shows components included in an air cooling system included in an electric vehicle according to a preferred embodiment of the present invention.

In a preferred embodiment, one or more of the lateral ducts 86 (e.g., a first portion of the lateral ducts 86 attached to one of the battery housing portions) includes a second end 86-2 face a first direction (e.g., a forward direction) and one or more of the lateral ducts 86 (e.g., a second portion of the lateral ducts 86 attached to the one of the battery housing portions) includes a second end 86-2 face a second direction (e.g., a rearward direction). For example, as shown in FIG. 15, for example, one or more of the lateral ducts 86F attached to the third battery housing portion 30 has a second end 86-2 face a first direction (a forward direction) and one or more of the lateral ducts 86R attached to the same third battery housing portion 30 have a second end 86-2 face a second direction (e.g., a rearward direction).

In a preferred embodiment of the present invention, each of the lateral ducts 86 attached to a certain column of battery housing module compartments of a particular battery housing portion can include a second end 86-2 that faces a same direction. For example, as shown in FIG. 24A, each of the lateral ducts 86 attached to a forwardmost column C1 of battery housing module compartments of the third battery housing portion 30 (the forwardmost column of two battery housing module compartments that extend in the up-down direction) can include a second end 86-2 that faces a same direction (a forward direction). Similarly, each of the lateral ducts 86 attached to a second forwardmost column C2 of battery housing module compartments of the third battery housing portion 30 (the second forwardmost column of three battery housing module compartments that extend in the up-down direction) can include a second end 86-2 that faces a same direction (a forward direction). Each of the lateral ducts 86 attached to the third forwardmost column C3 of battery housing module compartments of the third battery housing portion 30 (the third forwardmost column of three battery housing module compartments that extend in the up-down direction) can include a second end 86-2 that faces a same direction (a rearward direction). Similarly, each of the lateral ducts 86 attached to the other columns of battery housing module compartments of the third battery housing portion 30 (the columns of battery housing module compartments that extend in the up-down direction) can include a second end 86-2 that faces a same direction (a rearward direction).

In a preferred embodiment, for each of the first battery housing portion 26, the second battery housing portion 28, the third battery housing portion 30, the fourth battery housing portion 32, and the fifth battery housing portion 34, the lateral ducts 86 and the lateral blowers 88 are attached to a same side of the plurality of battery housing module compartments as the terminal ends TE of the plurality of battery modules housed in the plurality of battery housing module compartments of the respective battery housing portions, as shown in a combination of FIGS. 15-17 and 23, for example.

In a preferred embodiment, the lateral ducts 86 and the lateral blowers 88 connected to the battery housing module compartments of the first battery housing portion 26 and the fourth battery housing portion 32 are covered by (located to an inside of) the second side cover 8R, and the lateral ducts 86 and the lateral blowers 88 connected to the battery housing module compartments of the second battery housing portion 28 and the third battery housing portion 30 are covered by (located to an inside of) the first side cover 8L. The lateral ducts 86 and the lateral blowers 88 connected to the battery housing module compartments of the fifth battery housing portion 34 are covered by (located to an inside of) the fourth side cover 8FR, shown in FIG. 26, for example.

In a preferred embodiment, a space between the battery housing module compartments of the first battery housing portion 26 and the second side cover 8R can define a first chamber, a space between the battery housing module compartments of the second battery housing portion 28 and the first side cover 8L can define a second chamber, a space between the battery housing module compartments of the third battery housing portion 30 and the first side cover 8L can define a third chamber, a space between the battery housing module compartments of the fourth battery housing portion 32 and the second side cover 8R can define a fourth chamber, and a space between the battery housing module compartments of the fifth battery housing portion 34 and the fourth side cover 8FR can define a fifth chamber. As discussed in more detail below, each of the first chamber, the second chamber, the third chamber, the fourth chamber, and the fifth chamber includes one or more output openings that are fluidly connected to one or more of the evaporators.

Figure 24B:
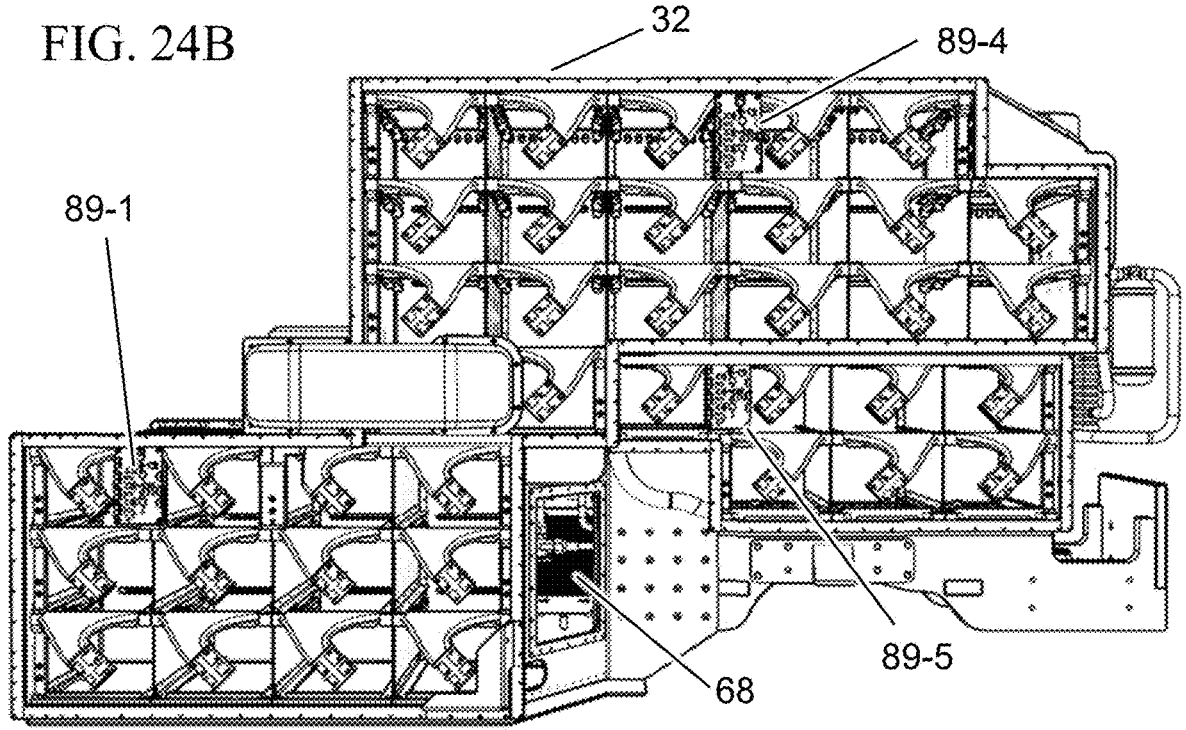
FIG. 24B is a right side view that shows components included in an air cooling system included in an electric vehicle according to a preferred embodiment of the present invention.

In a preferred embodiment of the present invention, the lateral ducts 86 and the lateral blowers 88 attached to each of the battery housing module compartments included in the first battery housing portion 26, the second battery housing portion 28, the third battery housing portion 30, the fourth battery housing portion 32, and the fifth battery housing portion 34 control and direct the flow of air through the air cooling system. In a preferred embodiment of the present invention, the electric vehicle includes a controller 89-1 that is configured or programmed to control the lateral blowers 88 attached to the battery housing module compartments included in the first battery housing portion 26, a controller 89-2 that is configured or programmed to control the lateral blowers 88 attached to the battery housing module compartments included in the second battery housing portion 28, a controller 89-3 that is configured or programmed to control the lateral blowers 88 attached to the battery housing module compartments included in the third battery housing portion 30, a controller 89-4 that is configured or programmed to control the lateral blowers 88 attached to the battery housing module compartments included in the fourth battery housing portion 32, and a controller 89-5 that is configured or programmed to control the lateral blowers 88 attached to the battery housing module compartments included in the fifth battery housing portion 34, as shown in FIGS. 24A and 24B, for example. For example, the controllers 89-1 through 89-5 can be configured or programmed to control when to start and stop the rotation of the motor and the fan of the lateral blowers 88 attached to the respective battery housing portions. In a preferred embodiment, the controllers 89-1 through 89-5 can be configured or programmed to independently control groups of lateral blowers 88 attached to each of the respective battery housing portions (e.g., independently control the motors included in the groups the lateral blowers 88 attached to each of the respective battery housing portions) and/or independently control each individual one of the plurality of the lateral blowers 88. In a preferred embodiment, the controllers 89-1 through 89-5 can be configured or programmed to control the lateral blowers 88 based on a temperature of one or more of the plurality of battery modules and/or whether or not one or more of the plurality of battery modules is being charged, for example. The electric vehicle can include a controller that can be configured or programmed to perform the functions of each of controllers 89-1 through 89-5.

In a preferred embodiment of the present invention, each of the first evaporator coil 48, the second evaporator coil 52, the third evaporator coil 56, the fourth evaporator coil 60, the fifth evaporator coil 64, and the sixth evaporator coil 68 cools air circulating through the air cooling system. For example, as discussed in more detail below, each of the first evaporator coil 48, the second evaporator coil 52, the third evaporator coil 56, the fourth evaporator coil 60, the fifth evaporator coil 64, and the sixth evaporator coil 68 includes a first side at which warmed air enters the evaporator coil and a second side at which cool air exits the evaporator coil after having passed through the evaporator coil.

Figure 18:
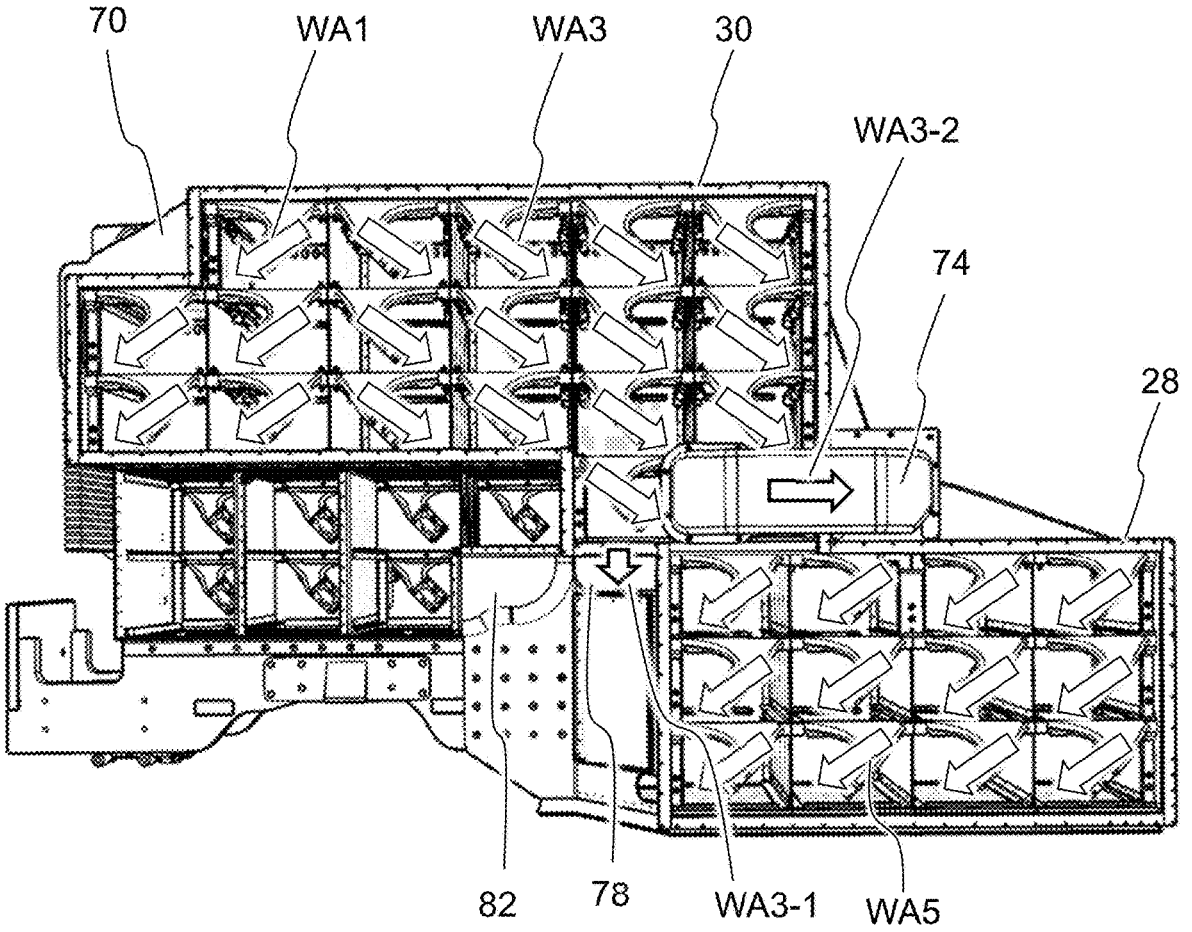
FIG. 18 is a left side view that shows components included in an air cooling system included in an electric vehicle according to a preferred embodiment of the present invention.
Figure 19:
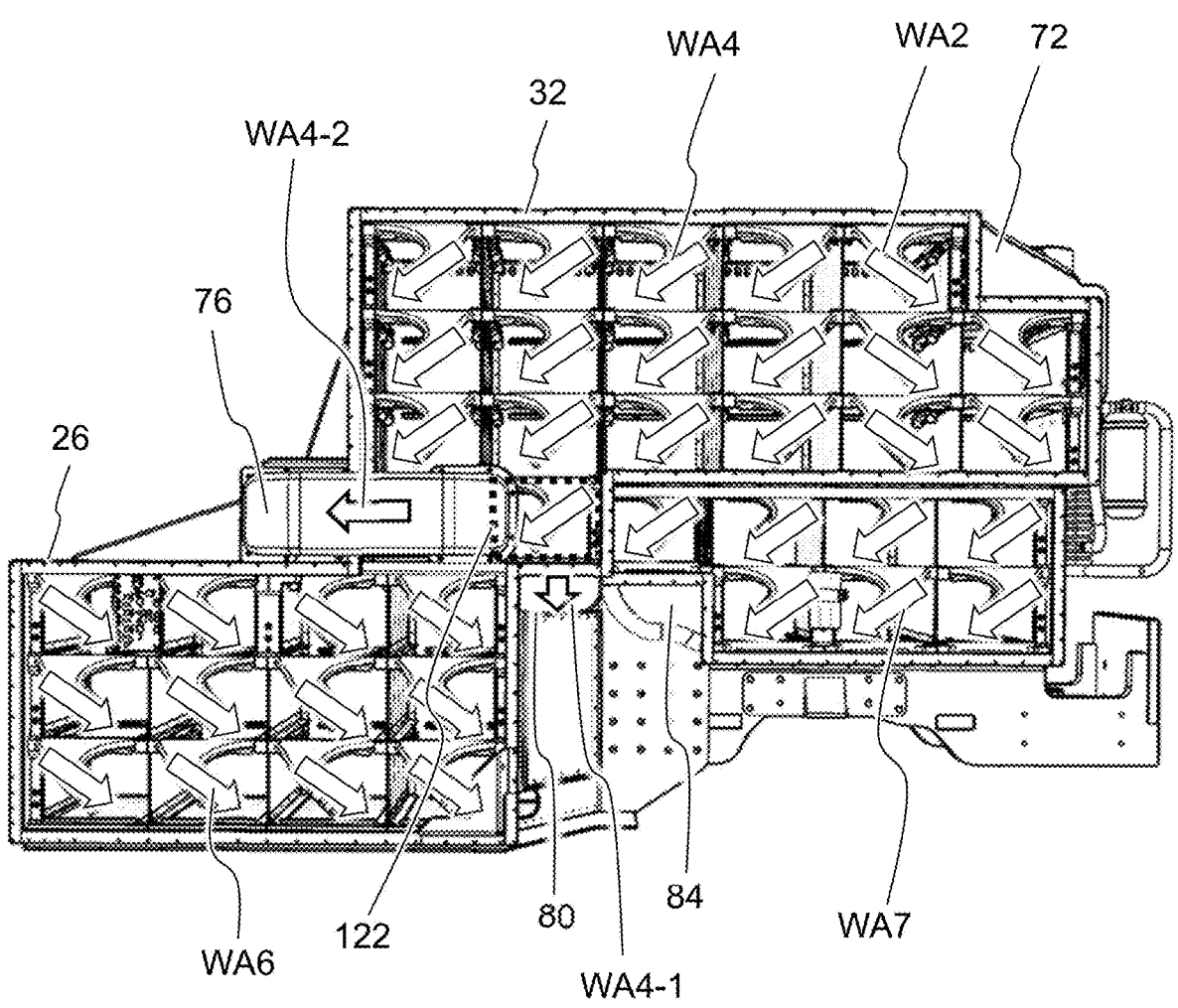
FIG. 19 is a right side view that shows components included in an air cooling system included in an electric vehicle according to a preferred embodiment of the present invention.

In a preferred embodiment, the cool air that exits the second side 48-2 of the first evaporator coil 48 and the cool air that exits the second side 52-2 of the second evaporator coil 52 are drawn into/flow into the gap 90 located between the third battery housing portion 30 and the fourth battery housing portion 32. The cool air that is drawn into/flows into the gap 90 flows through the gap 90 in a front-direction and an up-down direction of the electric vehicle, and then flows in lateral directions (width directions of the electric vehicle) across the third battery modules 301 housed in the battery housing module compartments of the third battery housing portion 30 and across the fourth battery modules 321 housed in the battery housing module compartments of the fourth battery housing portion 32. For example, FIG. 17 shows a plan view of an example of the air flow through the third battery housing portion 30 and the fourth battery housing portion 32 in which the hatch-patterned arrows show a flow of cool air CA and the solid arrows show a flow of warm air WA. FIG. 18 shows a left side view of an example of the air flow through the third battery housing portion 30, and FIG. 19 shows a right side view of an example of the air flow through the fourth battery housing portion 32.

In a preferred embodiment, the lateral ducts 86 and the lateral blowers 88 attached to the third battery housing portion 30 draw a portion of the cool air from the gap 90 across the third battery modules 301 housed in the third battery housing portion 30, and the lateral ducts 86 and the laterals blowers 88 attached to the fourth battery housing 32 draw a portion of the cool air from the gap 90 across the fourth battery modules 321 housed in the fourth battery housing portion 32.

As shown in FIG. 17, a portion of the cool air CA from the gap 90 flows in a first lateral direction (a leftward direction) across the third battery modules 301 housed in the third battery housing portion 30 before reaching the lateral ducts 86 and the lateral blowers 88 attached to the third battery housing portion 30 as warm air (warm air that has been used to cool the third battery modules 301 housed in the third battery housing portion 30). In a preferred embodiment, the cool air CA that flows in the first lateral direction flows across top and/or bottom surfaces of the third battery modules 301 housed in the third battery housing portion 30. The warm air that reaches the lateral ducts 86 and the lateral blowers 88 attached to the third battery housing portion 30 is then directed in or more directions by the lateral blowers 88. For example, as shown in FIG. 18, one or more lateral ducts 86 and lateral blowers 88 attached to a front portion of the third battery housing portion 30 direct warm air WA1 in a forward and/or downward direction and towards the first duct 70. The warm air directed towards the first duct 70 flows through one or more output holes 119 and into the first duct 70 to return to the first evaporator 48 (i.e., to the first side 48-1 of the first evaporator 48), as shown in FIG. 17, for example. The one or more output holes 119, shown in FIG. 4, for example, fluidly connect the third battery housing portion 30 and the first duct 70 and can include a plurality of first holes 119A and a second hole 119B that is larger than the first holes 119A.

As shown in FIG. 17, a portion of the cool air CA from the gap 90 flows in a second lateral direction (a rightward direction) across the fourth battery modules 321 housed in the fourth battery housing portion 32 before reaching the lateral ducts 86 and the lateral blowers 88 attached to the fourth battery housing portion 32 as warm air (warm air that has been used to cool the fourth battery modules 321 housed in the fourth battery housing portion 32). In a preferred embodiment, the cool air CA that flows in the second lateral direction flows across top and/or bottom surfaces of the fourth battery modules 321 housed in the fourth battery housing portion 32. The warm air that reaches the lateral ducts 86 and the lateral blowers 88 attached to the fourth battery housing portion 30 is then directed in or more directions by the lateral blowers 88. For example, as shown in FIG. 19, one or more lateral ducts 86 and lateral blowers 88 attached to a front portion of the fourth battery housing portion 32 direct warm air WA2 in a forward and/or downward direction and towards the second duct 72. The warm air directed towards the second duct 72 flows through one or more output holes 120 and into the second duct 72 to return to the second evaporator 52 (i.e., to the first side 52-1 of the second evaporator 52), as shown in FIG. 17, for example. The one or more output holes 120, shown in FIG. 4, for example, fluidly connect the fourth battery housing portion 32 and the second duct 72 and can include a plurality of first holes 120A and a second hole 120B that is larger than the first holes 120A.

As shown in FIG. 18, one or more lateral ducts 86 and lateral blowers 88 attached to a rear portion of the third battery housing portion 30 direct warm air WA3 in a rearward and/or downward direction and towards the third duct 74 and the fifth duct 78. As shown in FIG. 19, one or more lateral ducts 86 and lateral blowers 88 attached to a rear portion of the fourth battery housing portion 32 direct warm air WA4 in a rearward and/or downward direction and towards the fourth duct 76 and the sixth duct 80.

Figure 13:
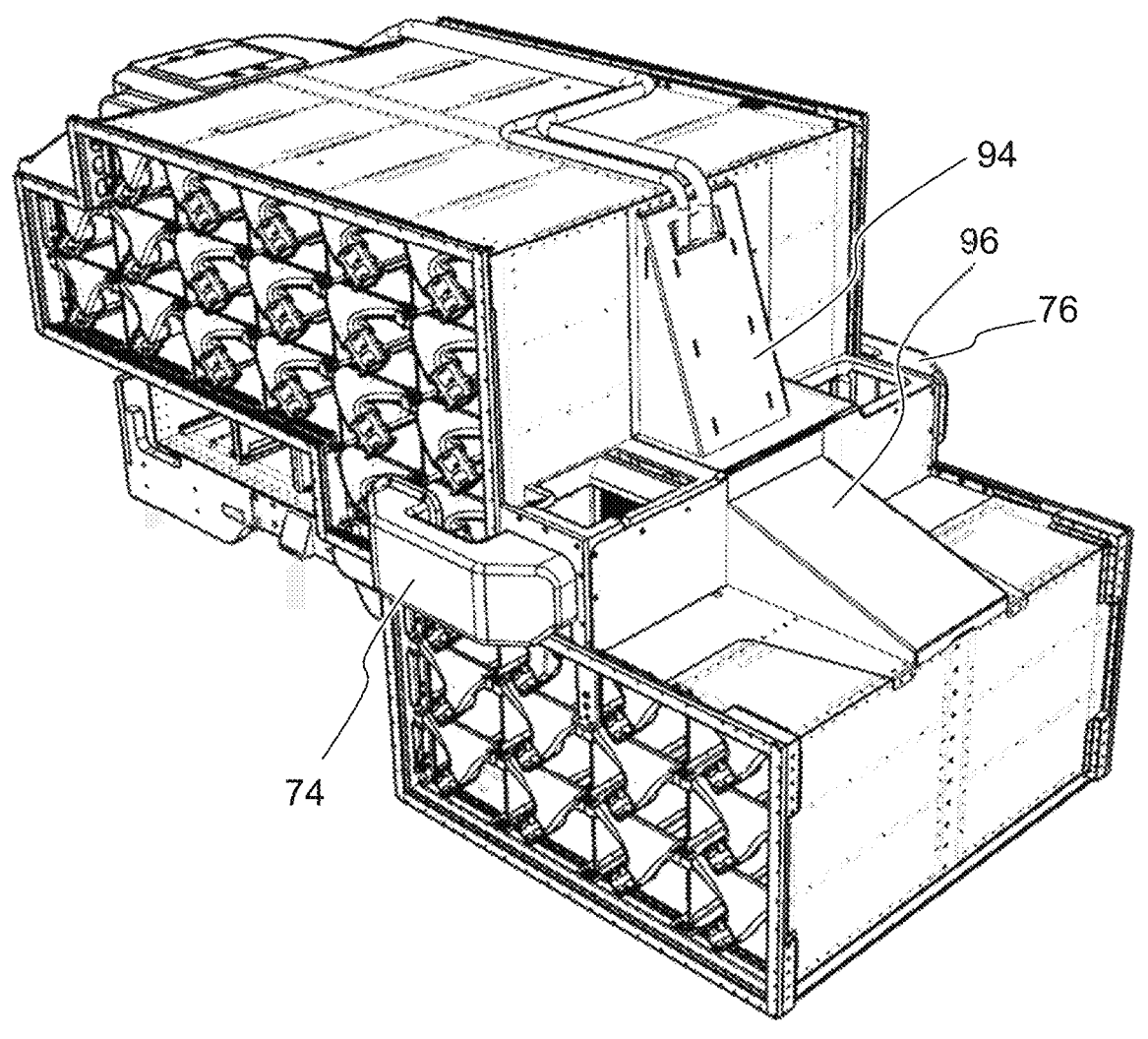
FIG. 13 is a rear perspective view that shows components included in an air cooling system included in an electric vehicle according to a preferred embodiment of the present invention.
Figure 14:
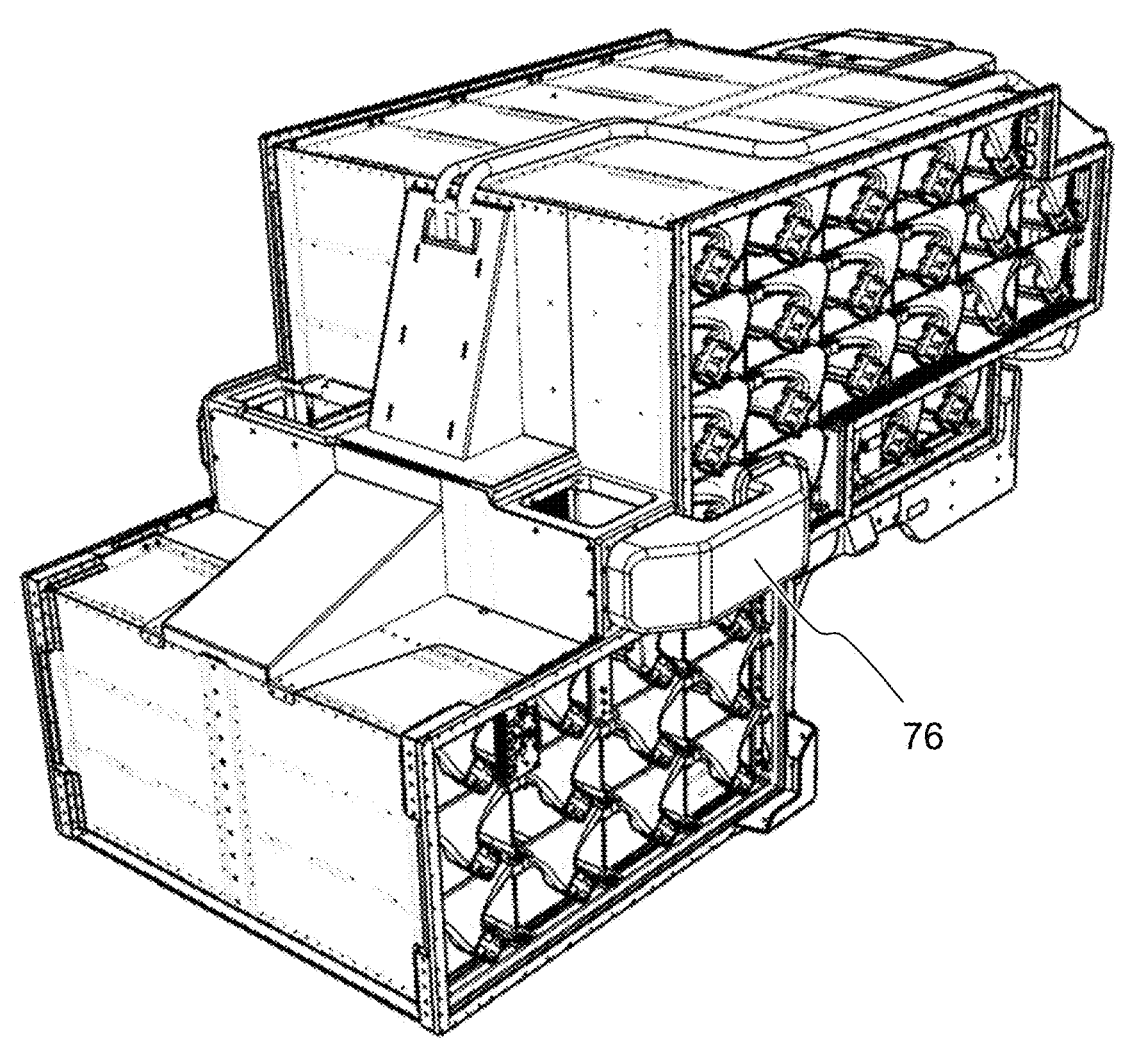
FIG. 14 is a rear perspective view that shows components included in an air cooling system included in an electric vehicle according to a preferred embodiment of the present invention.
Figure 20:
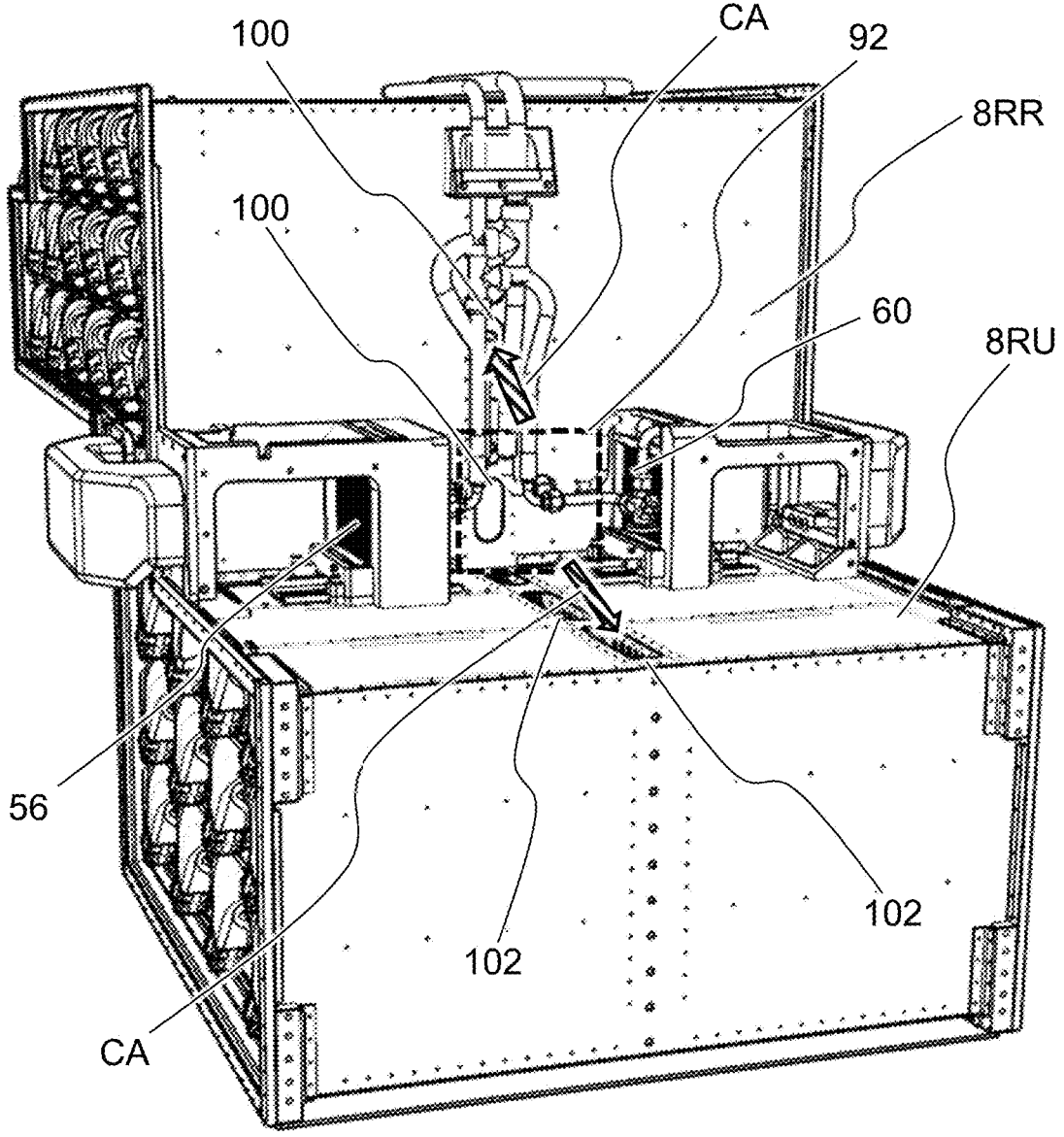
FIG. 20 is a rear perspective view that shows components included in an air cooling system included in an electric vehicle according to a preferred embodiment of the present invention.

In a preferred embodiment, the warm air directed towards the third duct 74 flows through the third duct 74 and towards the first side 56-1 of the third evaporator 56, as shown in FIGS. 17 and 20, for example. The warm air enters the third evaporator 56 at the first side 56-1 and exits the third evaporator 56 at the second side 56-2 as cool air. In a preferred embodiment, the cool air that exits the second side 56-2 of the third evaporator 56 as cool air flows into a rear cool air storage area 92, as shown in FIG. 20, for example. The rear cool air storage area 92 is, for example, a space defined by the second side 56-2 of the third evaporator 56, the second side 60-2 of the fourth evaporator 60, the rear cover 8RR, the rear-upper cover 8RU, a ninth duct 94, and a tenth duct 96, as shown in FIGS. 13 and 20, for example. The ninth duct 94 and the tenth duct 96 are not shown in FIG. 20 to better illustrate the rear cool air storage area 92.

In a preferred embodiment, the warm air directed towards the fourth duct 76 flows through the fourth duct 76 and towards the first side 60-1 of the fourth evaporator 60, as shown in FIGS. 17 and 20, for example. The warm air enters the fourth evaporator 60 at the first side 60-1 and exits the fourth evaporator 60 at the second side 60-2 as cool air. In a preferred embodiment, the cool air that exits the second side 60-2 of the fourth evaporator 60 as cool air flows into the rear cool air storage area 92, as shown in FIG. 20, for example.

In a preferred embodiment of the present invention, the cool air that flows into the rear cool air storage area 92 from the second side 56-2 of the third evaporator 56 and the second side 60-2 of the fourth evaporator 60 flows from the rear cool air storage area 92 into the gap 90 located between the third battery housing portion 30 and the fourth battery housing portion 32 and into a gap 98 located between the first battery housing portion 26 and the second battery housing portion 28. More specifically, as shown in FIG. 20, for example, a portion of the cool air from the rear cool air storage area 92 flows/is drawn through one or more holes 100 in the rear cover 8RR and into the gap 90 located between the third battery housing portion 30 and the fourth battery housing portion 32, and a portion of the cool air from the rear cool air storage area 92 flows/is drawn through one or more holes 102 in the rear-upper cover 8RU and into the gap 98 located between the first battery housing portion 26 and the second battery housing portion 28.

Figure 21:
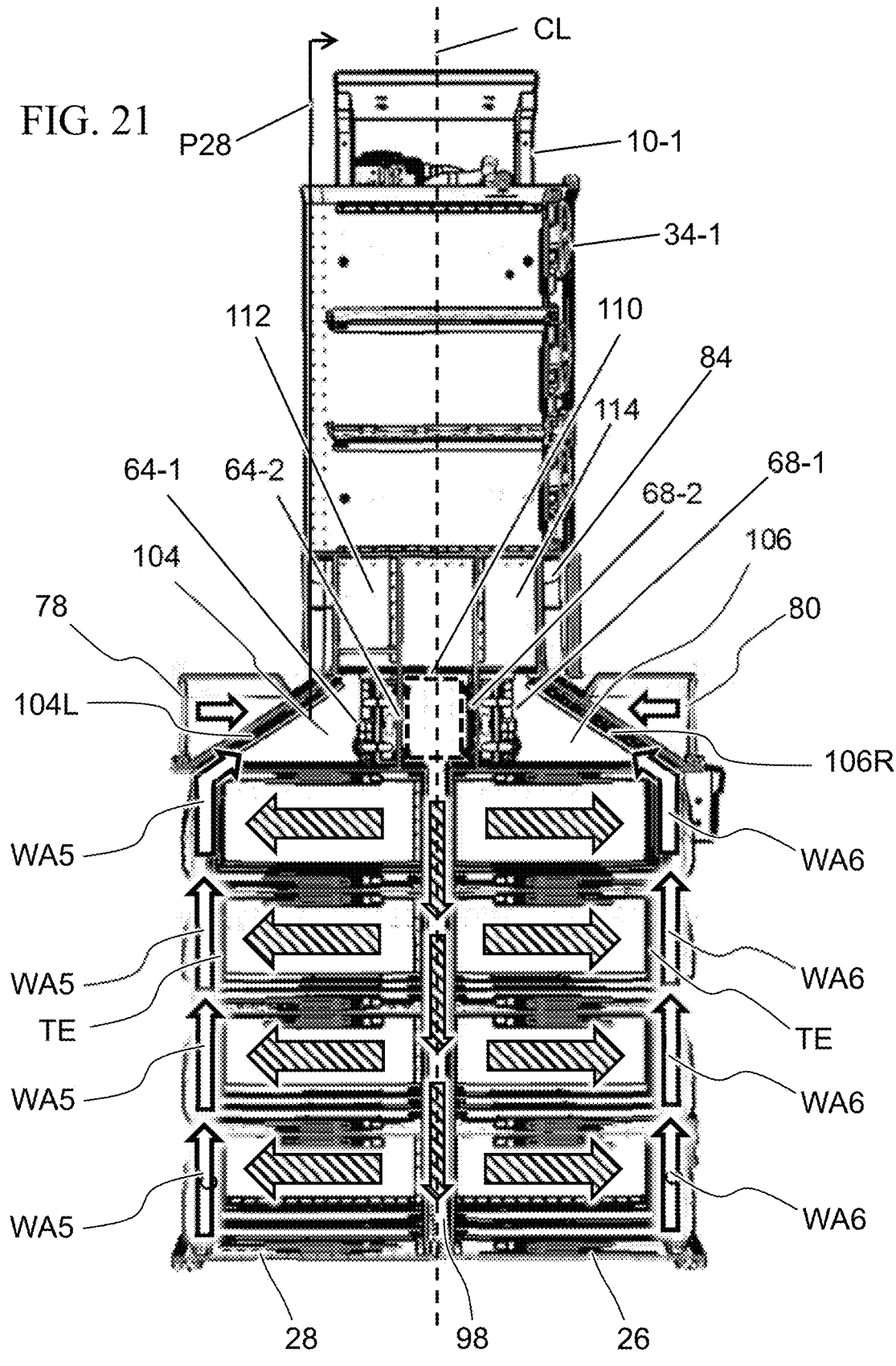
FIG. 21 is a sectional plan view along plane P21 in FIG. 16 that shows components included in an air cooling system included in an electric vehicle according to a preferred embodiment of the present invention.
Figure 22:
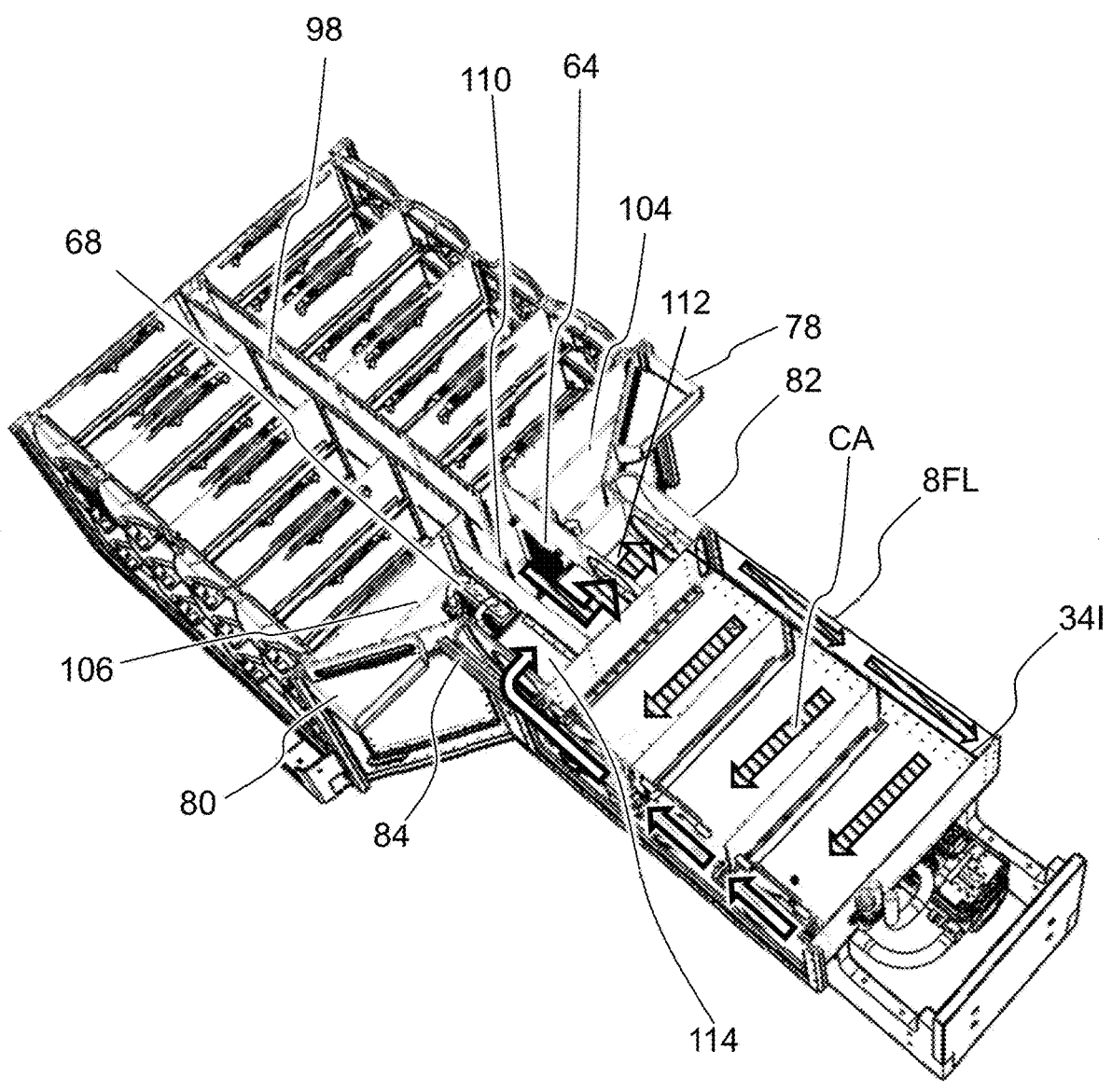
FIG. 22 is a sectional perspective view along plane P22 in FIG. 16 that shows components included in an air cooling system included in an electric vehicle according to a preferred embodiment of the present invention.

In a preferred embodiment, the warm air directed towards the fifth duct 78 flows down into the fifth duct 78 before being redirected by the fifth duct 78 to flow in an inwards direction towards a hot air storage area 104 (a left-side hot air storage area) and the first side 64-1 of the fifth evaporator 64, as shown in FIGS. 21 and 22, for example. The warm air flows through the hot air storage area 104, enters the first side 64-1 of the fifth evaporator 64, and exits the second side 64-2 of the fifth evaporator 64 as cool air. In a preferred embodiment, the cool air that exits the second side 64-2 of the fifth evaporator flows into an intermediate cool air storage area 110, as shown in FIGS. 21 and 22, for example. The intermediate cool air storage area 110 is, for example, a space defined between the fifth evaporator 64 and the sixth evaporator 68, as shown in FIGS. 21 and 22, for example.

In a preferred embodiment, the warm air directed towards the sixth duct 80 flows down into the sixth duct 80 before being redirected by the sixth duct 80 to flow in an inwards direction towards a hot air storage area 106 (a right-side hot air storage area) and the first side 68-1 of the sixth evaporator 68, as shown in FIGS. 21 and 22, for example. The warm air flows through the hot air storage area 106, enters the first side 68-1 of the sixth evaporator 68, and exits the second side 68-2 of the sixth evaporator 68 as cool air. In a preferred embodiment, the cool air that exits the second side 68-2 of the sixth evaporator 68 flows into the intermediate cool air storage area 110, as shown in FIGS. 21 and 22, for example.

In a preferred embodiment of the present invention, the cool air that flows into the intermediate cool air storage area 110 from the second side 64-2 of the fifth evaporator 64 and the second side 68-2 of the sixth evaporator 68 flows from the intermediate cool air storage area 110 rearwardly into the gap 98 located between the first battery housing portion 26 and the second battery housing portion 28, upwardly into the gap 90 located between the third battery housing portion 30 and the fourth battery housing portion 32, and forwardly towards a cool air input passage 112 of the fifth battery housing portion 34. More specifically, as shown in FIGS. 21 and 22, for example, a portion of the cool air from the intermediate cool air storage area 110 flows/is drawn rearwardly into the gap 98 located between the first battery housing portion 26 and the second battery housing portion 28, a portion of the cool air from the intermediate cool air storage area 110 flows/is drawn upwardly into the gap 90 located between the third battery housing portion 30 and the fourth battery housing portion 32, and a portion of the cool air from the intermediate cool air storage area 110 flows/is drawn forwardly towards a cool air input passage 112 of the fifth battery housing portion.

FIG. 21 shows a plan view of an example of the air flow through the first battery housing portion 26 and the second battery housing portion 28 in which the hatch-patterned arrows show a flow of cool air CA and the solid arrows show a flow of warm air WA. In a preferred embodiment, the lateral ducts 86 and the lateral blowers 88 attached to the first battery housing portion 26 draw a portion of the cool air from the gap 98 across the first battery modules 261 housed in the first battery housing portion 26, and the lateral ducts 86 and the laterals blowers 88 attached to the second battery housing portion 28 draw a portion of the cool air from the gap 98 across the second battery modules 281 housed in second battery housing portion 28.

As shown in FIG. 21, a portion of the cool air CA from the gap 98 flows in a first lateral direction (a leftward direction) across the second battery modules 281 housed in the second battery housing portion 28 before reaching the lateral ducts 86 and the lateral blowers 88 attached to the second battery housing portion 28 as warm air (warm air that has been used to cool the second battery modules 281 housed in the second battery housing portion 28). In a preferred embodiment, the cool air CA that flows in the first lateral direction flows across top and/or bottom surfaces of the second battery modules 281 housed in the second battery housing portion 28. The warm air that reaches the lateral ducts 86 and the lateral blowers 88 attached to the second battery housing portion 28 is then directed in or more directions by the lateral blowers 88. For example, as shown in FIG. 18, one or more lateral ducts 86 and lateral blowers 88 attached to the second battery housing portion 28 direct warm air WA5 in a forward and/or downward direction and towards the hot air storage area 104, which is fluidly connected to an inside of the second battery housing portion 28 via an opening in a left side of a front surface of the second battery housing portion 28. The warm air directed towards the hot air storage area 104 flows through the opening in the left side of the front surface of the second battery housing portion 28 and into the hot air storage area 104 before returning to the first side 64-1 of the fifth evaporator 64, as shown in FIG. 21, for example.

As shown in FIG. 21, a portion of the cool air CA from the gap 98 flows in a second lateral direction (a rightward direction) across the first battery modules 261 housed in the first battery housing portion 26 before reaching the lateral ducts 86 and the lateral blowers 88 attached to the first battery housing portion 26 as warm air (warm air that has been used to cool the first battery modules 261 housed in the first battery housing portion 26). In a preferred embodiment, the cool air CA that flows in the second lateral direction flows across top and/or bottom surfaces of the first battery modules 261 housed in the first battery housing portion 26. The warm air that reaches the lateral ducts 86 and the lateral blowers 88 attached to the first battery housing portion 28 is then directed in or more directions by the lateral blowers 88. For example, as shown in FIG. 19, one or more lateral ducts 86 and lateral blowers 88 attached to the first battery housing portion 28 direct warm air WA6 in a forward and/or downward direction and towards the hot air storage area 106, which is fluidly connected to an inside of the first battery housing portion 26 via an opening in a right side of a front surface of the first battery housing portion 26. The warm air directed towards the hot air storage area 106 flows through the opening in the right side of the front surface of the first battery housing portion 26 and into the hot air storage area 106 before returning to the first side 68-1 of the sixth evaporator 68, as shown in FIG. 21, for example.

As discussed above and as shown in FIG. 22, for example, a portion of the cool air from the intermediate cool air storage area 110 flows/is drawn forwardly towards a cool air input passage 112 of the fifth battery housing portion 34. The cool air that flows towards the cool air input passage 112 of the fifth battery housing portion, flows through the cool air input passage 112 of the fifth battery housing portion and into the seventh duct 82. The seventh duct 82 receives the flow of cool air from a lateral direction and redirects the flow of cool air in a forward direction along the third side cover 8FL which covers the first side of the fifth battery housing portion 34.

FIGS. 22 and 23 show an example of the air flow through the fifth battery housing portion 34 in which the hatch-patterned arrows show a flow of cool air CA and the solid arrows show a flow of warm air WA. In a preferred embodiment, the lateral ducts 86 and the lateral blowers 88 attached to the fifth battery housing portion 34 draw the cool air from the first side (e.g., a left side) of the fifth battery housing portion 34 across the fifth battery modules 341 housed in the fifth battery housing portion 34. As shown in FIG. 23, the cool air CA flows in a lateral direction (a rightward direction) across the fifth battery modules 341 housed in the fifth battery housing portion 341 before reaching the lateral ducts 86 and the lateral blowers 88 attached to the fifth battery housing portion 34 as warm air (warm air that has been used to cool the fifth battery modules 341 housed in the fifth battery housing portion 34). In a preferred embodiment, the cool air CA that flows in the lateral direction flows across top and/or bottom surfaces of the fifth battery modules 341 housed in the fifth battery housing portion 34. The warm air that reaches the lateral ducts 86 and the lateral blowers 88 attached to the fifth battery housing portion 34 is then directed in or more directions by the lateral blowers 88. For example, as shown in FIG. 19, one or more lateral ducts 86 and lateral blowers 88 attached to the fifth battery housing portion 34 direct warm air WA7 in a rearward and/or downward direction and towards the eighth duct 84, which is fluidly connected to an inside of a warm air output passage 114 of the fifth battery housing portion. The warm air directed towards the eighth duct 84 flows through the eighth duct 84 and the warm air output passage 114 of the fifth battery housing portion before flowing into the hot air storage area 106 to return to the first side 68-1 of the sixth evaporator 68, as shown in FIG. 22, for example.

In a preferred embodiments of the present invention discussed above, the first battery housing portion 26 (e.g., a first battery housing portion) and the fourth battery housing portion 32 (e.g., a second battery housing portion) are offset from each other. For example, the first battery housing portion 26 and the fourth battery housing portion 32 can be offset from each other in a front-rear direction such that a portion of the first battery housing portion 26 is rearward of a portion of the fourth battery housing portion 32, and can be offset from each other in an up-down direction such that a portion of the first battery housing portion 26 is below a portion of the fourth battery housing portion 32. The first battery housing portion 26 and the fourth battery housing portion 32 are located on a same side of a centerline CL of the electric vehicle in a left-right direction of the electric vehicle, as shown in FIGS. 3 and 19, for example.

In a preferred embodiment, the hot air storage area 106 (e.g., an air chamber) receives the warm air WA6 (e.g., first air) exhausted from the first battery housing portion 26 and the warm air WA4 (e.g., second air) exhausted from the fourth battery housing portion 32. For example, as discussed above, the hot air storage area 106 receives the warm air WA6 directly from the first battery housing 26 as shown, for example, in FIG. 21, and the hot air storage area 106 receives the warm air WA4 exhausted from the fourth battery housing portion 32 via the sixth duct 80 connected between the fourth battery housing portion 32 and the hot air storage area 106, as shown, for example, in FIG. 19.

Figure 12:
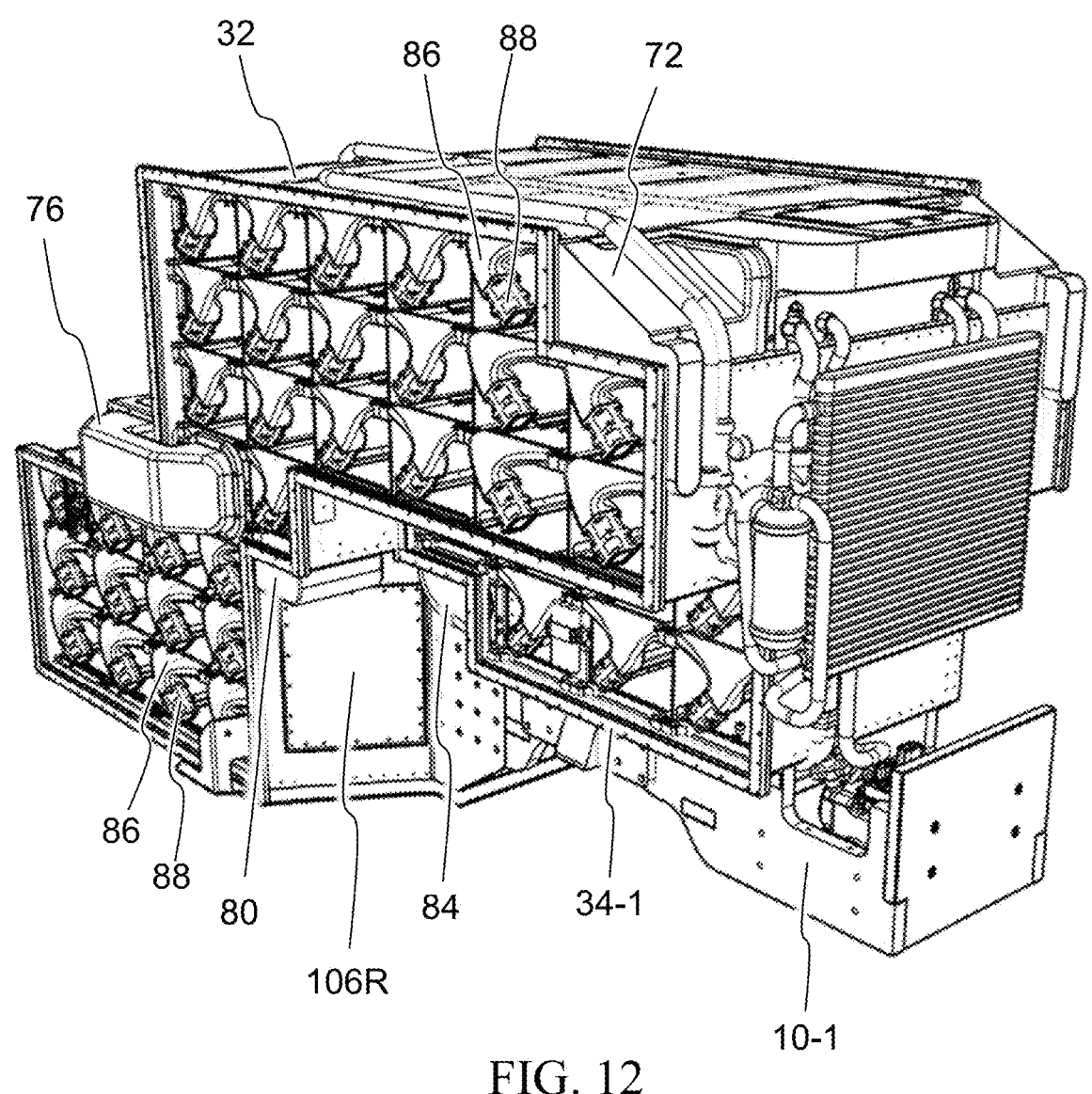
FIG. 12 is a front perspective view that shows components included in an air cooling system included in an electric vehicle according to a preferred embodiment of the present invention.

In a preferred embodiment of the present invention, a plate 104L defines a wall of the hot air storage area 104, and a plate 106R defines a wall of the hot air storage area 106, as shown in FIGS. 11 and 12, for example. The plate 104L and the plate 106R are angled with respect to a centerline CL of the electric vehicle, as shown in FIG. 21, for example. In a preferred embodiment, the plate 104L guides the warm air WA5 towards the centerline CL of the electric vehicle and the plate 106R guides the warm air WA6 towards the centerline CL of the electric vehicle. In a preferred embodiment, the plate 104L and the plate 106R are each be removable. When the plate 104L is removed, the fifth evaporator 64 is exposed, as shown in FIG. 24A. For example, when the plate 104L is removed, the fifth evaporator 64 can be seen in a left side view of the electric vehicle.

When the plate 106R is removed, the sixth evaporator 68 is exposed, as shown in FIG. 24B. For example, when the plate 106R is removed, the sixth evaporator 68 can be seen in a right side view of the electric vehicle. In a preferred embodiment, the plate 104L and the plate 104R are included in the front frame 10. In this way, the front frame 10 houses the fifth evaporator 64 and the sixth evaporator 68.

In a preferred embodiment of the present invention, the hot air storage area 106 receives the warm air WA7 (e.g., fifth air) exhausted from the fifth battery housing portion 34 (e.g., a third battery housing portion). For example, as discussed above, the hot air storage area 106 can receive the warm air WA7 exhausted from the fifth battery housing portion 34 via the warm air output passage 114, as shown in FIG. 22, for example. The hot air storage area 104 can receive the warm air WA5 (e.g., third air) from the second battery housing portion 28 and the warm air WA3 (e.g., fourth air) from the third battery housing portion 30.

In preferred embodiments of the present invention discussed above, in a plan view, at least a portion of each of the first evaporator 48 and the second evaporator 52 (e.g., a first evaporator) is forward of at least a portion of the each of the third evaporator 56, the fourth evaporator 60, the fifth evaporator 64, and the sixth evaporator 68 (e.g., a second evaporator) in a front-rear direction of the electric vehicle, as shown in FIGS. 17, 21, and 23, for example. In a plan view, at least a portion of each of the fifth evaporator 64 and the sixth evaporator 68 (e.g., a first evaporator) is forward of at least a portion of the each of the third evaporator 56 and the fourth evaporator 60, (e.g., a second evaporator) in a front-rear direction of the electric vehicle.

In preferred embodiments of the present invention, in a side view, at least a portion of each of the first evaporator 48 and the second evaporator 52 (e.g., a first evaporator) is higher than at least a portion of each of the third evaporator 56, the fourth evaporator 60, the fifth evaporator 64, and the sixth evaporator 68 in an up-down direction of the electric vehicle, as shown in FIGS. 8 and 9, for example.

In preferred embodiments of the present invention, in a side view, at least a portion of each of the fifth evaporator 64 and the sixth evaporator 68 (e.g., a first evaporator) is lower than at least a portion of each of the third evaporator 56 and the fourth evaporator 60 in an up-down direction of the electric vehicle, as shown in FIGS. 8 and 9, for example.

In a preferred embodiment of the present invention, in a plan view, the first evaporator 48 and the second evaporator 52 are located forward of the front axle 3 in the front-rear direction of the electric vehicle 1. Alternatively, the first evaporator 48 and the second evaporator 52 can be located rearward of the front axle 3 in the front-rear direction of the electric vehicle 1. In a preferred embodiment, in a plan view, each of the third evaporator 56, the fourth evaporator 60, the fifth evaporator 64, and the sixth evaporator 68 (e.g., a second evaporator) are located rearward of the front axle 3 in the front-rear direction of the electric vehicle 1.

Figure 16:
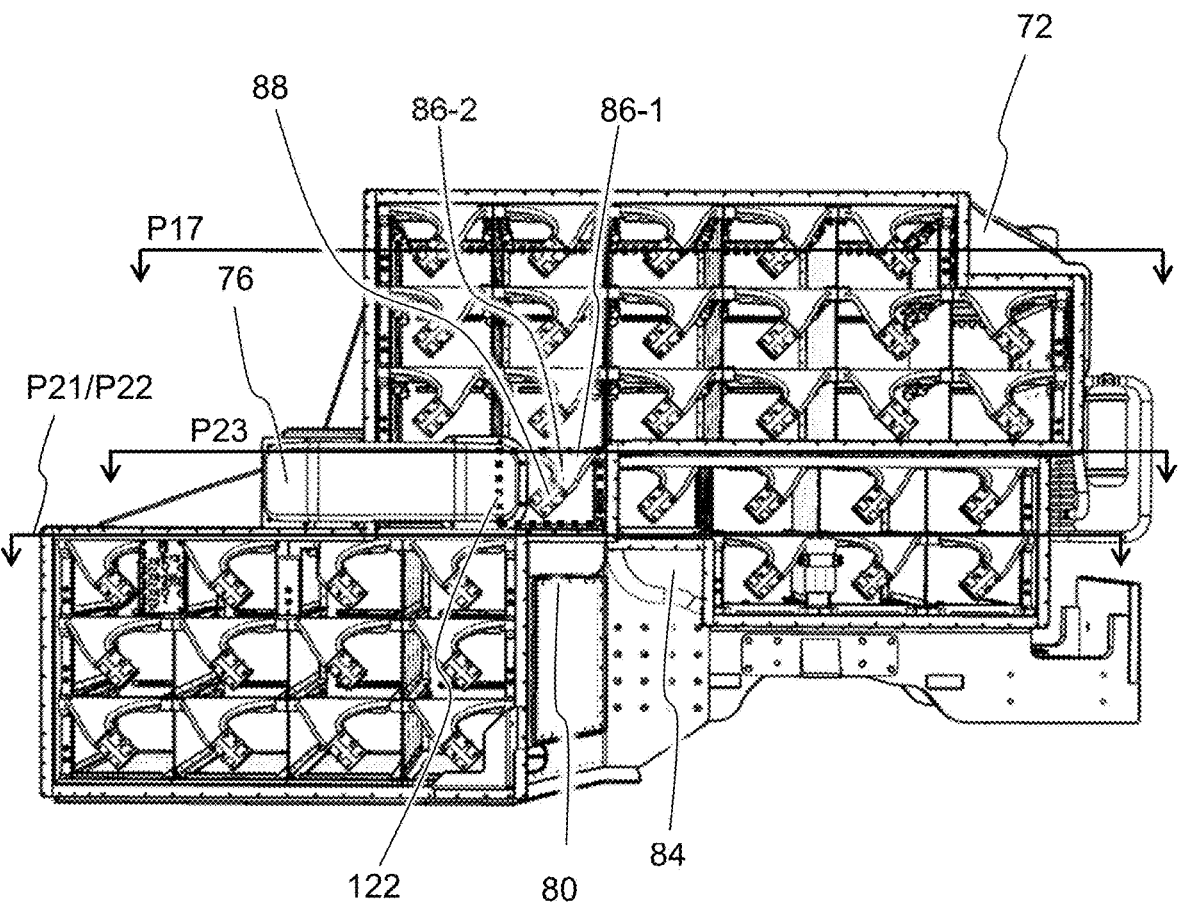
FIG. 16 is a right side view that shows components included in an air cooling system included in an electric vehicle according to a preferred embodiment of the present invention.

In preferred embodiments of the present invention discussed above, respective pairs of the lateral ducts and blower are attached to each of the plurality of battery housing module compartments. For example, as shown in FIG. 12, pairs of lateral ducts 86 and blowers 88 are attached to each of the plurality of battery housing module compartments included in the fourth battery housing portion 32. In a preferred embodiment, a first number of the plurality of lateral duct 86 and blower pairs 88 that direct air towards the second evaporator 52 (e.g., a first evaporator) via the duct 72 is less than a second number of the plurality of lateral duct 86 and blower 88 pairs that direct air towards the fourth evaporator 60 (e.g., a second evaporator) via the fourth duct 76. For example, as shown in FIGS. 16 and 19, for example, a first number of the plurality of duct and blower pairs that direct air forwards and/or downwards towards the second evaporator 52 via the duct 72 is five (5) and a second number of the plurality of duct and blower pairs that direct air rearward and/or downwards towards the fourth evaporator 60 via the fourth duct 76 is fourteen (14). In a preferred embodiment, the second evaporator 52 is smaller than the fourth evaporator 60 and fewer lateral duct 86 and blower 88 pairs direct air towards the second evaporator 52.

In preferred embodiments of the present invention discussed above, the fifth evaporator 64 (e.g., a first evaporator) and the third evaporator 56 (e.g., a second evaporator) receive warm air WA3 from the third chamber defined by the space between the battery housing module compartments of the third battery housing portion 30 and the first side cover 8L. In a preferred embodiment, a first portion WA3-1 of the warm air WA3 flows to the fifth evaporator 64 through a first output hole 116L of the third chamber and the fifth duct 78, and a second portion WA3-2 of the warm air WA3 flows to the third evaporator 56 through a second output hole 118L of the third chamber and the third duct 74, as shown in FIGS. 18 and 25, for example. FIG. 25 shows the first output hole 116L and the second output hole 118L with the fifth duct 78 and the third duct 74 removed for illustrative purposes. The first output hole 116L is located in a bottom surface of the third battery housing portion 30 such that the first portion WA3-1 of the warm air WA3 flows from the third battery housing portion 30 through the first output hole 116L in a downward direction and into the fifth duct 78, which directs the warm air in a downward direction. The second output hole 118L is located in a lateral side surface of the third battery housing portion 30 such that the second portion WA3-2 of the warm air WA3 flows from the third battery housing portion 30 through the second output hole 118L in a lateral direction (e.g., a leftward direction) and into the third duct 74, which directs the warm air in a rearward direction. In a preferred embodiment, the first output hole 116L of the third chamber is smaller than the second output hole 118L of the third chamber, and the fifth evaporator 64 is smaller than the third evaporator 56. In this way, the third evaporator 56, which is larger than the fifth evaporator 64, can receive more warm air than the fifth evaporator 64 because the second output hole 118L of the third chamber is larger than the first output hole 116L of the third chamber.

Similarly, in preferred embodiments of the present invention discussed above, the sixth evaporator 68 and the fourth evaporator 60 receive warm air WA4 from a chamber defined by the space between the battery housing module compartments of the fourth battery housing portion 32 and the second side cover 8R. In a preferred embodiment, a first portion WA4-1 of the warm air WA4 flows to the sixth evaporator 68 through a first output hole 116R of the chamber and the sixth duct 80, and a second portion WA4-2 of the warm air WA4 flows to the fourth evaporator 60 through a second output hole 118R of the chamber and the fourth duct 76, as shown in FIGS. 19 and 26, for example. FIG. 26 shows the first output hole 116R and the second output hole 118R with the sixth duct 80 and the fourth duct 76 removed for illustrative purposes. The first output hole 116R is located in a bottom surface of the fourth battery housing portion 32 such that the first portion WA4-1 of the warm air WA4 flows from the fourth battery housing portion 32 through the first output hole 116R in a downward direction and into the sixth duct 80, which directs the warm air in a downward direction. The second output hole 118R is located in a lateral side surface of the fourth battery housing portion 32 such that the second portion WA4-2 of the warm air WA4 flows from the fourth battery housing portion 32 through the second output hole 118R in a lateral direction (e.g., a rightward direction) and into the fourth duct 76, which directs the warm air in a rearward direction. In a preferred embodiment, the first output hole 116R of the chamber is smaller than the second output hole 118R of the chamber, and the sixth evaporator 68 is smaller than the fourth evaporator 60. In this way, the fourth evaporator 60, which is larger than the sixth evaporator 68, can received more warm air than the sixth evaporator 68 because the second output hole 118R of the chamber is larger than the first output hole 116R of the chamber.

In a preferred embodiment of the present invention, the sixth evaporator 68 and the fourth evaporator 60 are located on a same first side (e.g., a right side) of a centerline of the electric vehicle that extends in the front-rear direction of the electric vehicle, and the fifth evaporator 64 and the third evaporator 56 are located on a same second side (e.g., a left side) of the centerline of the electric vehicle. In a preferred embodiment, a first distance D1 between the fifth evaporator 64 and the sixth evaporator 68 in a left-right direction of the electric vehicle is less than a second distance D2 between the third evaporator 56 and the fourth evaporator 60 in the left-right direction of the electric vehicle, as shown in FIG. 7, for example. In a side view, at least a portion of the fifth evaporator 64 and at least a portion of the sixth evaporator 68 are lower than at least a portion of the third evaporator 56 and at least a portion of the fourth evaporator 60 in an up-down direction of the electric vehicle.

In preferred embodiments of the present invention discussed above, the gap 90 (e.g., a gap) is located between the third battery housing portion 30 and the fourth battery housing portion 32. The gap 90 is fluidly connected to each of the first evaporator 48 and the second evaporator 52 to receive cool air from each of the first evaporator 48 and the second evaporator 52. The first evaporator 48 and the second evaporator 52 are located in front of at least a portion of the third battery housing portion 30 and the fourth battery housing portion 32 in a front-rear direction of the electric vehicle, and the gap 90 is fluidly connected to each of the first evaporator 48 and the second evaporator 52 such that the cool air from each of the first evaporator 48 and the second evaporator 52 flows rearwardly into the gap 90, as shown in FIG. 17, for example. In a preferred embodiment, the first evaporator 48 is located on a first side (e.g., a left side) of a centerline CL of the electric vehicle that extends in a front-rear direction of the electric vehicle, and the second evaporator 52 is located on a second side (e.g., a right side) of the centerline CL opposite to the first side of the centerline CL, as shown in FIG. 17, for example.

In a preferred embodiment of the present invention, the first evaporator 48 and the second evaporator 52 are located at an upper portion of the third battery housing portion 30 and the fourth battery housing portion 32 in an up-down direction of the electric vehicle. For example, the first evaporator 48 and the second evaporator 52 can be located higher than a midpoint of the third battery housing portion 30 and the fourth battery housing portion 32 in an up-down direction of the electric vehicle. The gap 90 is fluidly connected to each of the first evaporator 48 and the second evaporator 52 such that the cool air from each of the first evaporator 48 and the second evaporator 52 flows downwardly into the gap 90.

In a preferred embodiment, the gap 90 is also fluidly connected to each of the fifth evaporator 64 (e.g., a first evaporator) and the sixth evaporator 68 (e.g., a second evaporator) to receive cool air from each of the fifth evaporator 64 and the sixth evaporator 68. The fifth evaporator 64 and the sixth evaporator 68 are located below (e.g., entirely below) the third battery housing portion 30 and the fourth battery housing portion 32 in an up-down direction of the electric vehicle, as shown in FIGS. 24A and 24B, for example. The gap 90 is fluidly connected to each of the fifth evaporator 64 and the sixth evaporator 68 such that the cool air from each of fifth evaporator 64 and the sixth evaporator 68 flows upwardly into the gap 90. In a preferred embodiment, the fifth evaporator 64 is located on a first side (e.g., a left side) of a centerline CL of the electric vehicle that extends in a front-rear direction of the electric vehicle, and the sixth evaporator 68 is located on a second side (e.g., a right side) of the centerline CL opposite to the first side of the centerline CL, as shown in FIG. 21, for example.

In preferred embodiment, the gap 90 is also fluidly connected to each of the third evaporator 56 and the fourth evaporator 60 to receive cool air from each of the third evaporator 56 and the fourth evaporator 60. The third evaporator 56 and the fourth evaporator 60 are located rearward of (e.g., entirely rearward of) the third battery housing portion 30 and the fourth battery housing portion 62 in a front-rear direction of the electric vehicle. The gap 90 is fluidly connected to each of the third evaporator 56 and the fourth evaporator 60 such that the cool air from each of the third evaporator 56 and the fourth evaporator 60 flows forwardly into the gap 90. In a preferred embodiment, the third evaporator 56 is located on a first side (e.g., a left side) of a centerline CL of the electric vehicle that extends in a front-rear direction of the electric vehicle, and the fourth evaporator 60 is located on a second side (e.g., a right side) of the centerline CL opposite to the first side of the centerline CL, as shown in FIG. 17, for example.

In a preferred embodiment, the third evaporator 56 and the fourth evaporator 60 are located at a lower portion of the third battery housing portion 30 and the fourth battery housing portion 62 in an up-down direction of the electric vehicle. For example, the third evaporator 56 and the fourth evaporator 60 are located below a midpoint of the third battery housing portion 30 and the fourth battery housing portion 62 in an up-down direction of the electric vehicle, as shown, for example, in FIG. 20. The gap 90 is fluidly connected to each of the third evaporator 56 and the fourth evaporator 60 such that the cool air from each of the third evaporator 56 and the fourth evaporator 60 flows upwardly into the gap 90.

In preferred embodiments of the present invention discussed above, the gap 98 (e.g., a gap) is located between the first battery housing portion 26 and the second battery housing portion 28, as shown in FIG. 21, for example. The gap 98 is fluidly connected to each of the third evaporator 56 and the fourth evaporator 60 to receive cool air from each of the third evaporator 56 and the fourth evaporator 60. In a preferred embodiment, the third evaporator 56 and the fourth evaporator 60 are located above (e.g., entirely above) the first battery housing portion 26 and the second battery housing portion 28 in an up-down direction of the electric vehicle. The gap 98 is fluidly connected to each of the third evaporator 56 and the fourth evaporator 60 such that the cool air from each of the third evaporator 56 and the fourth evaporator 60 flows rearwardly and/or downwardly into the gap 98, as shown in FIGS. 20 and 21, for example. In a preferred embodiment, the third evaporator 56 is located on a first side (e.g., a left side) of a centerline CL of the electric vehicle that extends in a front-rear direction of the electric vehicle, and the fourth evaporator 60 is located on a second side (e.g., a right side) of the centerline CL opposite to the first side of the centerline CL, as shown in FIG. 17, for example.

In a preferred embodiment of the present invention, the gap 98 is also fluidly connected to each of the fifth evaporator 64 and the sixth evaporator 68 to receive cool air from each of the fifth evaporator 64 and the sixth evaporator 68. In a preferred embodiment, the fifth evaporator 64 and the sixth evaporator 68 are located in front of (e.g., entirely in front of) the first battery housing portion 26 and the second battery housing portion 28 in a front-rear direction of the electric vehicle. The gap 98 is fluidly connected to each of the fifth evaporator 64 and the sixth evaporator 68 such that the cool air from each of the fifth evaporator 64 and the sixth evaporator 68 flows rearwardly into the gap 98, as shown in FIG. 21, for example. In a preferred embodiment, the fifth evaporator 64 is located on a first side (e.g., a left side) of a centerline CL of the electric vehicle that extends in a front-rear direction of the electric vehicle, and the sixth evaporator 68 is located on a second side (e.g., a right side) of the centerline CL opposite to the first side of the centerline CL, as shown in FIG. 21, for example.

In preferred embodiments of the present invention discussed above, a first warm air path including the second duct 72 fluidly connects the fourth battery housing portion 32 to the second evaporator 52 to exhaust warm air from the fourth battery housing portion 32 to the second evaporator 52, and a second warm air path including the fourth duct 76 or the sixth duct 80 fluidly connects the fourth battery housing portion 32 to another evaporator (e.g., one of the fourth evaporator 60 or the sixth evaporator 68) to exhaust warm air from the fourth battery housing portion 32 to the another evaporator. In a preferred embodiment, the second evaporator 52 is located forward of each of the fourth evaporator 60 and the sixth evaporator 68 in a front-rear direction of the electric vehicle, and each of the second evaporator 52, the fourth evaporator 60, and the sixth evaporator 68 are located on a same side (e.g., a right side) of the centerline CL of the electric vehicle that extends in a front-rear direction of the electric vehicle.

In a preferred embodiment, a third warm air path fluidly connects the fourth battery housing portion 32 to an additional evaporator (e.g., the other of the fourth evaporator 60 or the sixth evaporator 68) to exhaust third warm air from the fourth battery housing portion 32 to the additional evaporator. In a preferred embodiment, the sixth evaporator 68 is located between the second evaporator 52 and the fourth evaporator 60 in the front-rear direction of the electric vehicle.

In a preferred embodiment, a fourth warm air path including the hot air storage area 106 connects the first battery housing portion 26 to the sixth evaporator 68 to exhaust warm air from the first battery housing portion 26 to the sixth evaporator 68, as shown in FIG. 21, for example. In a preferred embodiment, a fifth warm air path including the eighth duct 84 fluidly connects the fifth battery housing portion 34 to the sixth evaporator 68 to exhaust warm air from the fifth battery housing portion 34 to the sixth evaporator 68.

In a preferred embodiment, the fourth battery housing portion 32 includes a first opening (e.g., the first hole 120A and/or the second hole 120B) that connects the fourth battery housing portion 32 to the first warm air path that fluidly connects the fourth battery housing portion 32 to the second evaporator 52 to exhaust warm air from the fourth battery housing portion 32 to the second evaporator 52. The fourth battery housing portion 32 can also include a second opening (e.g., the second output hole 118R) that connects the fourth battery housing portion 32 to the second warm air path that fluidly connects the fourth battery housing portion 32 to another evaporator (e.g., the fourth evaporator 60) to exhaust warm air from the fourth battery housing portion 32 to the another evaporator. In a preferred embodiment, the first opening is smaller than the second opening.

In preferred embodiments of the present invention discussed above, the fourth battery housing portion 32 includes a plurality of battery housing module compartments. In a preferred embodiment, a first warm air path can fluidly connect the fourth battery housing portion 32 to the sixth evaporator 68 to exhaust warm air from the fourth battery housing portion 32 to the sixth evaporator 68, and a second warm air path can fluidly connect the fourth battery housing portion 32 to the fourth evaporator 60 to exhaust warm air from the fourth battery housing portion 32 to the fourth evaporator 60.

In a preferred embodiment, the fourth battery housing portion 32 can include the first output hole 116R (e.g., a first opening) that connects the fourth battery housing portion 32 to the first warm air path, and the fourth battery housing portion 32 can include the second output hole 118R (e.g., a second opening) that connects the fourth battery housing portion 32 to the second warm air path. In a preferred embodiment, the first output hole 116R and the second output hole 118R are fluidly connected to a same battery housing module compartment 122, as shown in FIGS. 16 and 19, for example, in which the same battery housing module compartment 122 is shown surrounded by a dashed box. In other words, each of the first output hole 116R and the second output hole 118R are directly connected to/directly fluidly connected to the same battery housing module compartment 122. In a preferred embodiment, the first output hole 116R is smaller than the second output hole 118R, and sixth evaporator 68 is smaller than the fourth evaporator 60.

In a preferred embodiment of the present invention, one of the lateral ducts 86 is attached to the same battery housing module compartment 122 to which the first output hole 116R and the second output hole 118R are fluidly connected, as shown in FIG. 16, for example. The lateral duct 86 includes the first end 86-1 attached to the same battery housing module compartment 122 and the second end 86-2 opposite to the first end 86-1. In a preferred embodiment, the second end 86-2 of the lateral duct faces a rearward direction and/or a downward direction. As shown in FIG. 16, a lateral blower 88 can be attached to the second end 86-2 of the lateral duct 86.

In preferred embodiments of the present invention discussed above, the fourth battery housing portion 32 includes the recess/step 9C (e.g., a second stepped portion) located forward of the front axle 3 and between the first front portion of the fourth battery housing portion 32 covered by the first front surface 9A and the second front portion of the fourth battery housing portion 32 covered by the second front surface 9B. The fourth battery housing portion 32 also includes the recess/step 9E (e.g., a first stepped portion) located between the first front portion of the fourth battery housing portion 32 covered by the first front surface 9A and the third front portion of the fourth battery housing portion 32 covered by the third front surface 9D. In a preferred embodiment, at least a portion of the fifth battery housing portion 34 is located within the recess/step 9E, as shown in FIG. 5A, for example. In a preferred embodiment, at least a portion of a warm air path including the second duct 72 to exhaust warm air from the fourth battery housing portion 32 is located within the recess/step 9C. In a preferred embodiment, the recess/step 9C is located higher than the recess/step 9E in an up-down direction of the electric vehicle.

In a preferred embodiment, the fifth battery housing portion 34 is located below the fourth battery housing portion 32 in the up-down direction of the electric vehicle. Additionally, as shown in FIG. 4, for example, a front surface of the fifth battery housing portion 34 can be located at a same or substantially same location as a front surface of the fourth battery housing portion 32 in a front-rear direction of the electric vehicle, and a portion of the fourth battery housing portion 32 is farther rearward than the fifth battery housing portion 34 in the front-rear direction of the electric vehicle, as shown in FIG. 12, for example.

In a preferred embodiment, the fifth battery housing portion 34 includes the recess/step 34C (e.g., a third stepped portion) located between the first rear surface 34A and the second rear surface 34B, as shown in FIG. 5A, for example. In a preferred embodiment, at least a portion of a warm air path including the eighth duct 84 to exhaust warm air from the fifth battery housing portion 34 is located within the recess/step 34C. In a preferred embodiment, the recess/step 34C is located lower than the recess/step 9E in the up-down direction of the electric vehicle and rearward of the front axle 3 in the front-rear direction of the electric vehicle. The recess/step 34C is also located lower than the recess/step 9C in the up-down direction of the electric vehicle and rearward of the recess/step 9C in the front-rear direction of the electric vehicle.

In a preferred embodiment, the front frame 10 is mounted between the fifth battery housing portion 34 and the front axle 3 in an up-down direction of the electric vehicle. In a preferred embodiment, at least a portion of a warm air path including the eighth duct 84 to exhaust warm air from the fifth battery housing portion 34 is located between an outside surface 34-1 of the fifth battery housing portion 34 and an outside surface 10-1 of the front frame 10 in a width direction of the electric vehicle, as shown in FIGS. 12 and 21, for example. In a preferred embodiment, the front frame 10 extends farther rearward than the fifth battery housing portion 34 in the front-rear direction of the electric vehicle, and a rearmost portion of the front frame 10 is forward of a rear surface of the fourth battery housing portion 32 in the front-rear direction of the electric vehicle, as shown in FIGS. 4, 5A, and 5B, for example.

Figure 27:
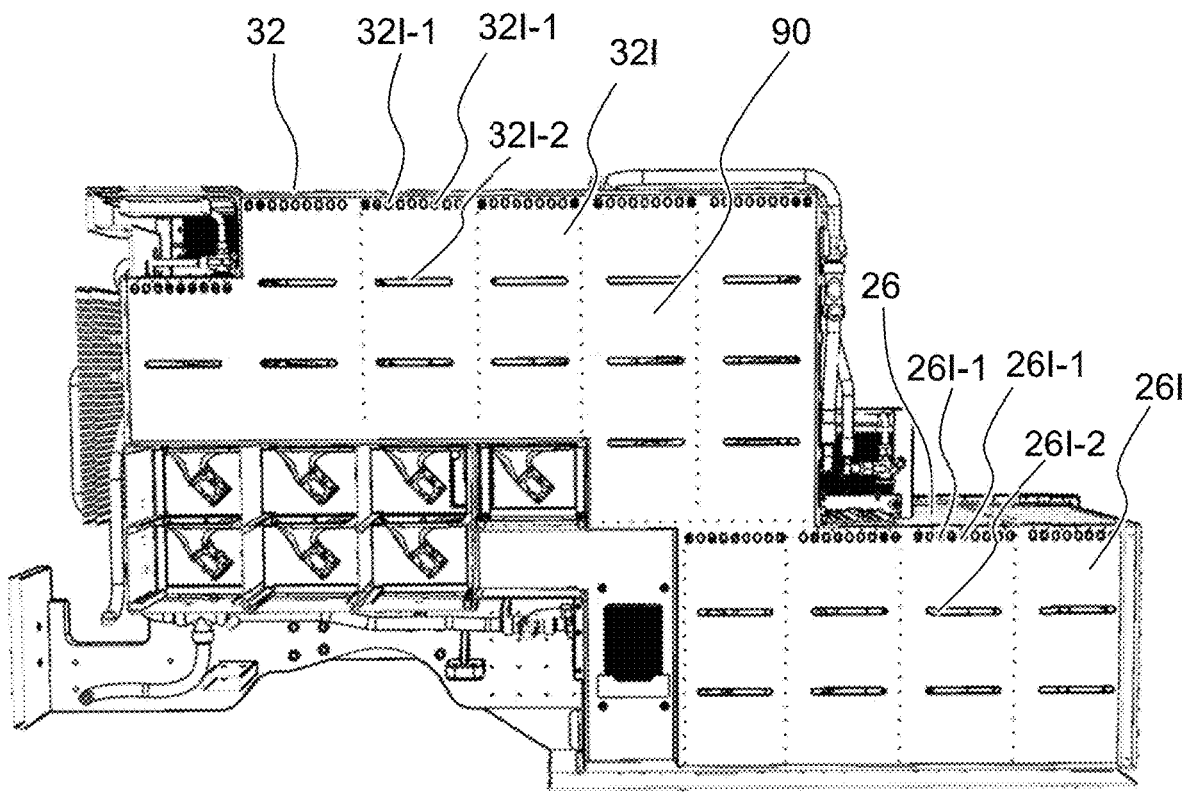
FIG. 27 is a sectional side view of an electric vehicle according to a preferred embodiment of the present invention.

In a preferred embodiment of the present invention, as shown in FIG. 27, for example, the fourth battery housing portion 32 can include an inner wall 321 located between the battery housing module compartments of the fourth battery housing portion 32 and the gap 90 located between the fourth battery housing portion 32 and the third battery housing portion 30. FIG. 27 is a cross sectional side view along the center line CL of the electric vehicle. In a preferred embodiment, the inner wall 321 can include a first opening 32I-1 connected to one of the plurality of battery housing module compartments included in a certain row (e.g., a top row) of the fourth battery housing portion 32 that is smaller than a second opening 32I-2 connected to one of the plurality of battery housing module compartments including in another row (e.g., a lower row) of the fourth battery housing portion 32. For example, as shown in FIG. 27, the first opening 32I-1 connected to one of the plurality of battery housing module compartments included in the top row of the fourth battery housing portion 32 is smaller than the second opening 32I-2 connected to one of the plurality of battery housing module compartments including in a lower row of the fourth battery housing portion 32 that is below the top row in an up-down direction of the electric vehicle. In a preferred embodiment, the first opening 32I-1 can include a plurality of openings and the second opening 32I-2 can include a single opening. The first opening 32I-1 can have a circular shape and the second opening 32I-2 can have an elongated slit shape.

Figure 28:
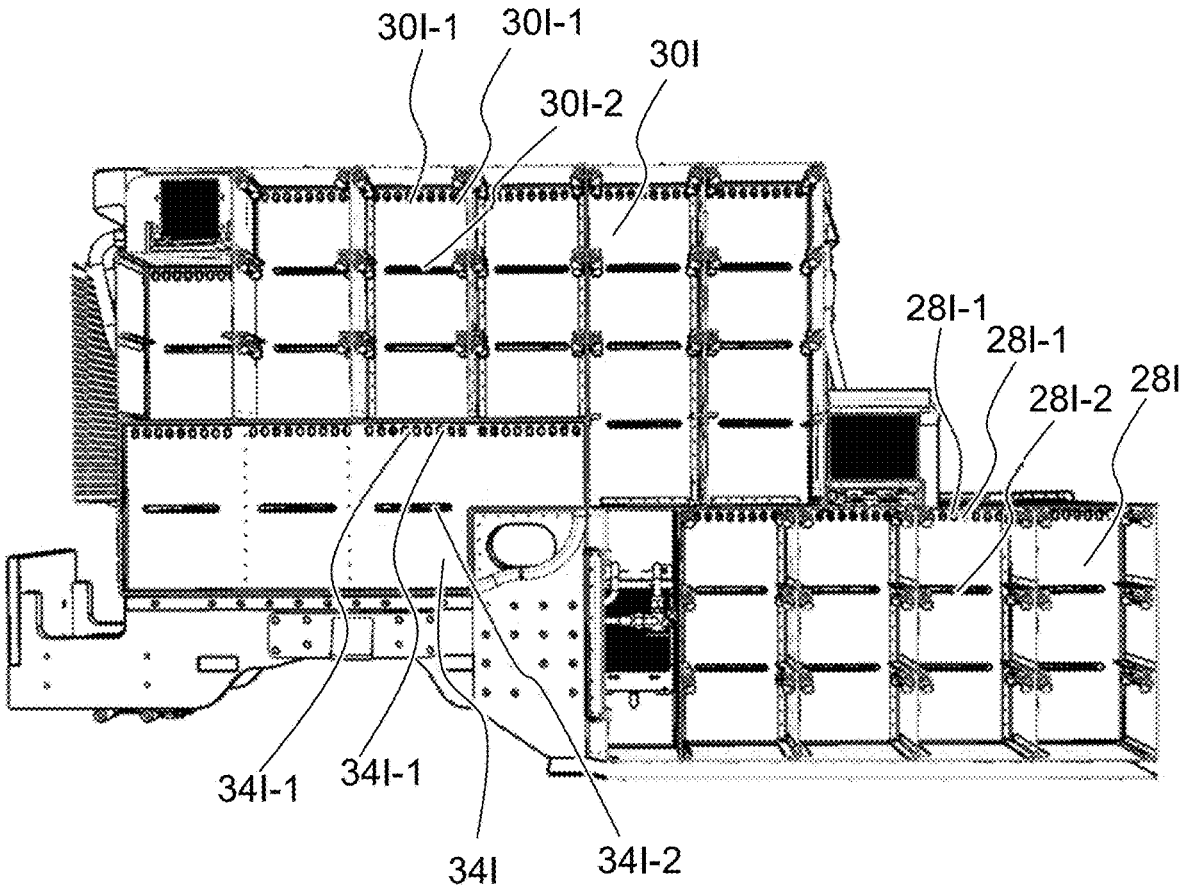
FIG. 28 is a sectional side view along plane P28 in FIG. 21 of an electric vehicle according to a preferred embodiment of the present invention.

In a preferred embodiment of the present invention, as shown in FIG. 28, for example, the third battery housing portion 30 can include an inner wall 30I located between the battery housing module compartments of the third battery housing portion 30 and the gap 90 located between the fourth battery housing portion 32 and the third battery housing portion 30. In a preferred embodiment, the inner wall 30I can include a first opening 30I-1 connected to one of the plurality of battery housing module compartments included in a certain row (e.g., a top row) of the third battery housing portion 30 that is smaller than a second opening 30I-2 connected to one of the plurality of battery housing module compartments included in another row (e.g., a lower row) of the third battery housing portion 30. For example, as shown in FIG. 28, the first opening 30I-1 connected to one of the plurality of battery housing module compartments included in the top row of the third battery housing portion 30 is smaller than the second opening 30I-2 connected to one of the plurality of battery housing module compartments included in a lower row of the third battery housing portion 30 that is below the top row in an up-down direction of the electric vehicle. In a preferred embodiment, the first opening 30I-1 can include a plurality of openings and the second opening 30I-2 can include a single opening. The first opening 30I-1 can have a circular shape and the second opening 302I-2 can have an elongated slit shape.

In a preferred embodiment of the present invention, as shown in FIG. 27, for example, the first battery housing portion 26 can include an inner wall 26I located between the battery housing module compartments of the first battery housing portion 26 and the gap 98 located between the first battery housing portion 26 and the second battery housing portion 28. In a preferred embodiment, inner wall 26I can include a first opening 26I-1 connected to one of the plurality of battery housing module compartments included in a certain row (e.g., a top row) of the first battery housing portion 26 that is smaller than a second opening 26I-2 connected to one of the plurality of battery housing module compartments including in another row (e.g., a lower row) of the first battery housing portion 26. For example, as shown in FIG. 27, the first opening 26I-1 connected to one of the plurality of battery housing module compartments included in the top row of the first battery housing portion 26 is smaller than the second opening 26I-2 connected to one of the plurality of battery housing module compartments including in a lower row of the first battery housing portion 26 that is below the top row in an up-down direction of the electric vehicle. In a preferred embodiment, the first opening 26I-1 can include a plurality of openings and the second opening 26I-2 can include a single opening. The first opening 26I-1 can have a circular shape and the second opening 26I-2 can have an elongated slit shape.

In a preferred embodiment of the present invention, as shown in FIG. 28, for example, the second battery housing portion 28 can include an inner wall 28I located between the battery housing module compartments of the second battery housing portion 28 and the gap 98 located between the first battery housing portion 26 and the second battery housing portion 28. In a preferred embodiment, the inner wall 28I can include a first opening 28I-1 connected to one of the plurality of battery housing module compartments included in a certain row (e.g., a top row) of the second battery housing portion 28 that is smaller than a second opening 28I-2 connected to one of the plurality of battery housing module compartments including in another row (e.g., a lower row) of the second battery housing portion 28. For example, as shown in FIG. 28, the first opening 28I-1 connected to one of the plurality of battery housing module compartments included in the top row of the second battery housing portion 28 is smaller than the second opening 28I-2 connected to one of the plurality of battery housing module compartments including in a lower row of the second battery housing portion 26 that is below the top row in an up-down direction of the electric vehicle. In a preferred embodiment, the first opening 28I-1 can include a plurality of openings and the second opening 28I-2 can include a single opening. The first opening 28I-1 can have a circular shape and the second opening 28I-2 can have an elongated slit shape.

In a preferred embodiment of the present invention, as shown in FIG. 28, for example, the fifth battery housing portion 34 can include a wall 34I located between the battery housing module compartments of the fifth battery housing portion 34 and the third side cover 8FL which covers the first side of the fifth battery housing portion 34. The location of the wall 34I is also shown schematically in FIG. 22. In a preferred embodiment, the wall 34I can include a first opening 34I-1 connected to one of the plurality of battery housing module compartments included in a certain row (e.g., a top row) of the fifth battery housing portion 34 that is smaller than a second opening 34I-2 connected to one of the plurality of battery housing module compartments including in another row (e.g., a lower row) of the fifth battery housing portion 34. For example, as shown in FIG. 28, the first opening 34I-1 connected to one of the plurality of battery housing module compartments included in the top row of the fifth battery housing portion 34 is smaller than the second opening 34I-2 connected to one of the plurality of battery housing module compartments including in a lower row of the fifth battery housing portion 34 that is below the top row in an up-down direction of the electric vehicle. In a preferred embodiment, the first opening 34I-1 can include a plurality of openings and the second opening 34I-2 can include a single opening. The first opening 34I-1 can have a circular shape and the second opening 34I-2 can have an elongated slit shape. In a preferred embodiment of the present invention, the first opening 34I-1 of the wall 34I of the fifth battery housing portion 34 is located below each of the first opening 30I-1, the second opening 30I-2, the first opening 32I-1, and the second opening 32I-2 in an up-down direction of the electric vehicle.

Figure 30:
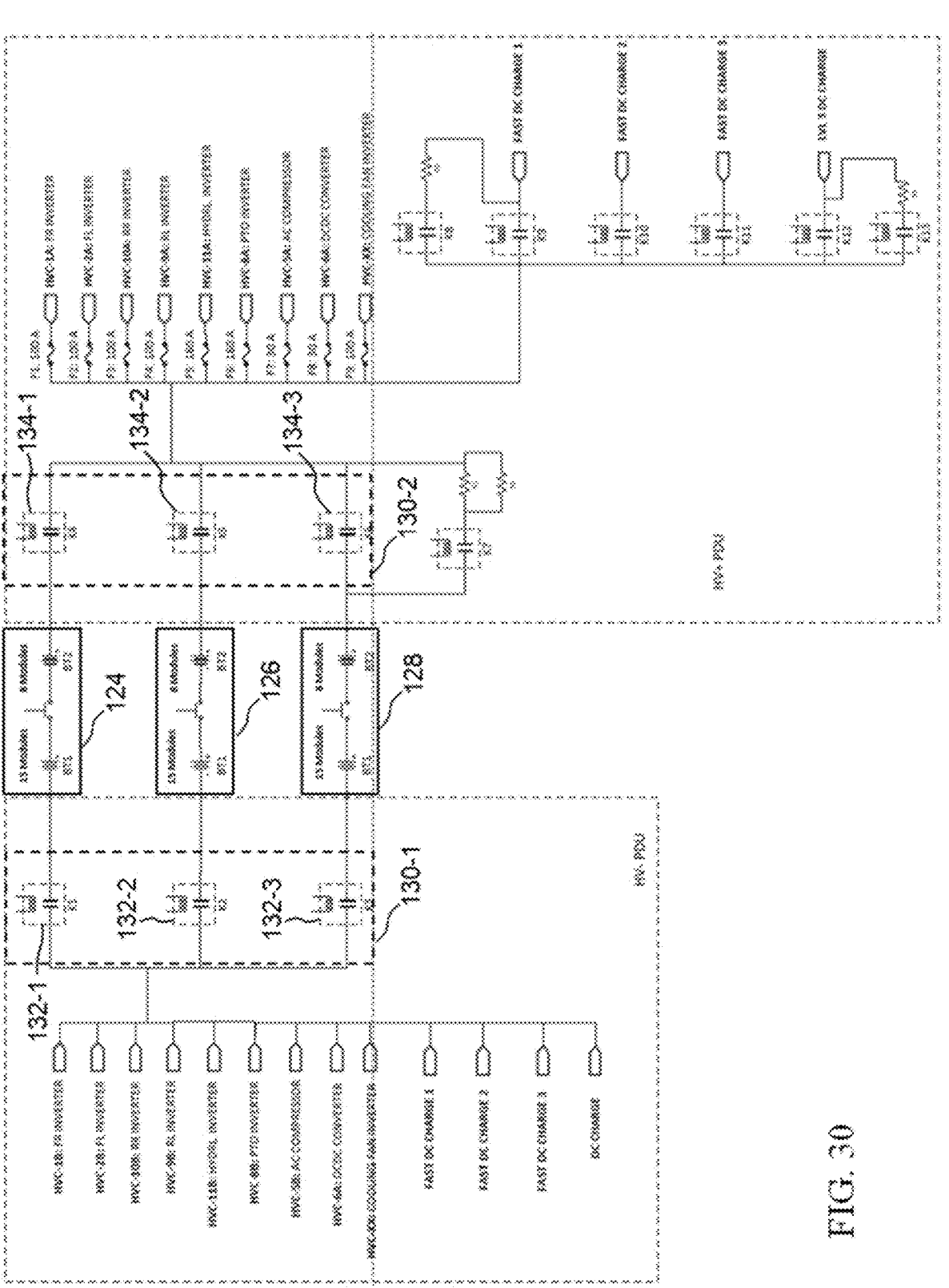
FIG. 30 is a schematic diagram including a plurality of battery strings included in an electric vehicle according to a preferred embodiment of the present invention.

In a preferred embodiment of the present invention, the first battery modules 261, the second battery modules 281, the third battery modules 301, the fourth battery modules 321, and the fifth battery modules 341 can be included in a plurality of battery strings. A battery string can include a plurality of the battery modules/battery cells which are connected/wired in series to produce a battery/battery string with a desired usable voltage/potential, for example. For example, FIGS. 29A, 29B, and 30 shows an example in which the first battery modules 261, the second battery modules 281, the third battery modules 301, the fourth battery modules 321, and the fifth battery modules 341 are included in a plurality of battery strings (e.g., parallel battery strings) that each include a plurality of battery modules connected in series. More specifically, FIGS. 29A, 29B, and 30 shows an example in which the first battery modules 261, the second battery modules 281, the third battery modules 301, the fourth battery modules 321, and the fifth battery modules 341 are included in a first battery string 124, a second battery string 126, and a third battery string 128. In the example shown in FIGS. 29A, 29B, and 30 each of the first battery string 124, the second battery string 126, and the third battery string 128 includes twenty three (23) battery modules, as discussed in more detail below.

In a preferred embodiment, the first battery string 124 includes battery modules A1 through A23, which are connected in series from A1 to A23 in ascending order. The battery modules A1 through A4 (e.g., a first portion of the first battery string 124) correspond to first battery modules 261 housed in the first battery housing portion 26, the battery modules A5 through A8 (e.g., a second portion of the first battery string 124) correspond to second battery modules 281 housed in the second battery housing portion 28, the battery modules A9 through A14 (e.g., a third portion of the first battery string 124) correspond to third battery modules 301 housed in the third battery housing portion 30, and the battery modules A15 through A23 (e.g., a fourth portion of the first battery string 124) correspond to fourth battery modules 321 housed in the fourth battery housing portion 32. Each of the first portion, the second portion, the third portion, and the fourth portion of the first battery string 124 are spaced apart from each other.

Figure 31:
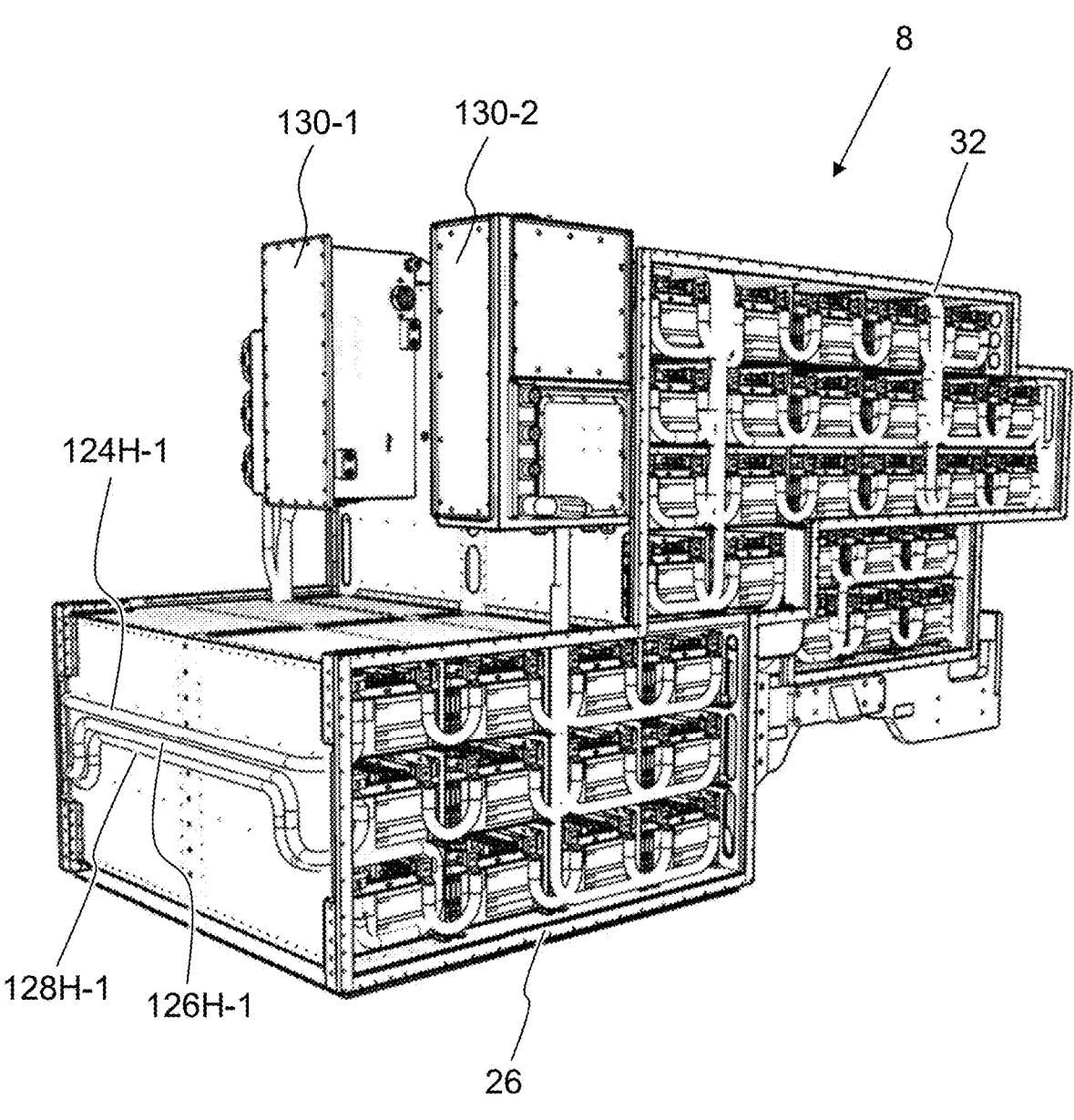
FIG. 31 is a right rear perspective view of an electric vehicle according to a preferred embodiment of the present invention.
Figure 32:
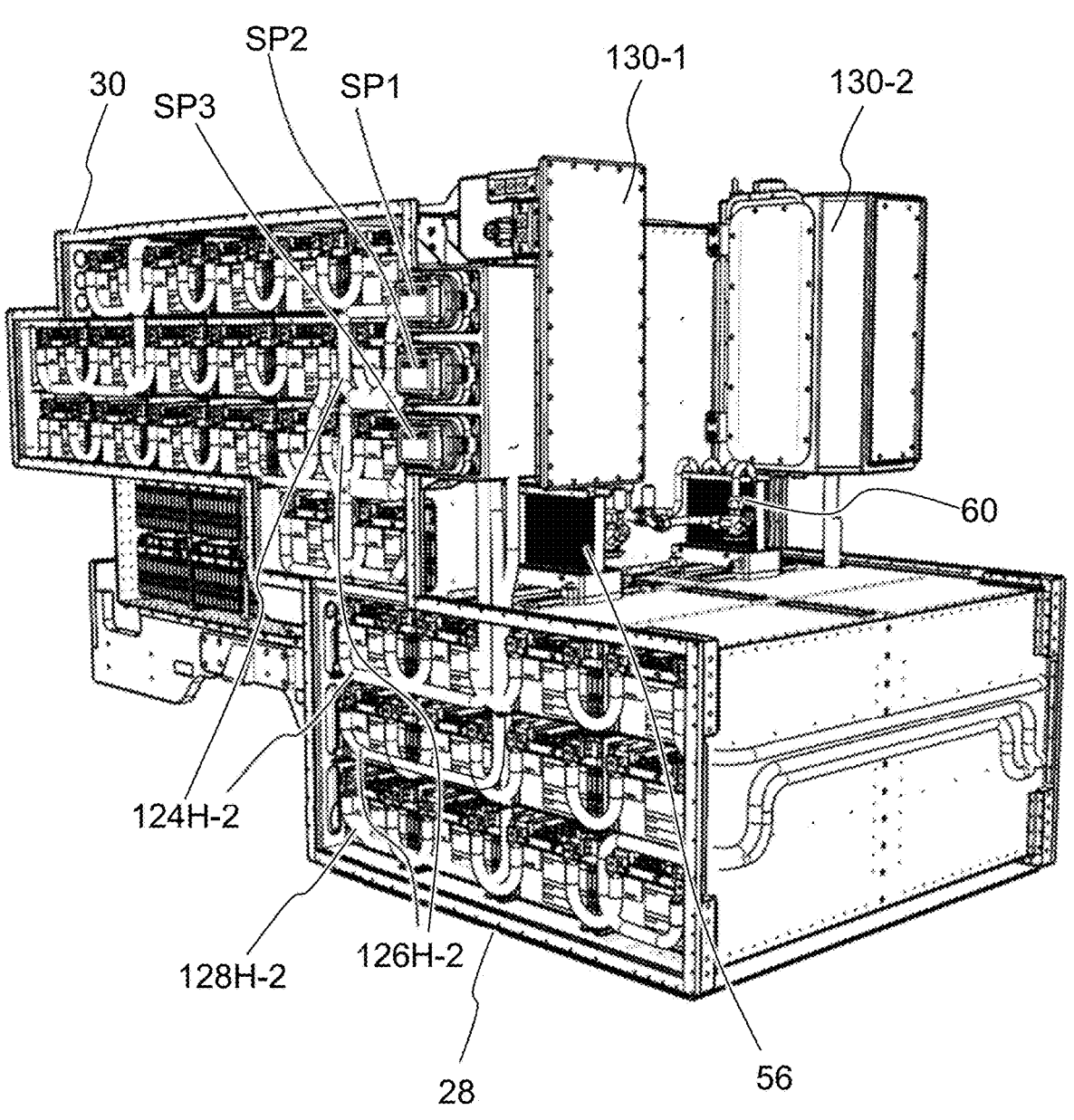
FIG. 32 is a left rear perspective view of an electric vehicle according to a preferred embodiment of the present invention.
Figure 33A:
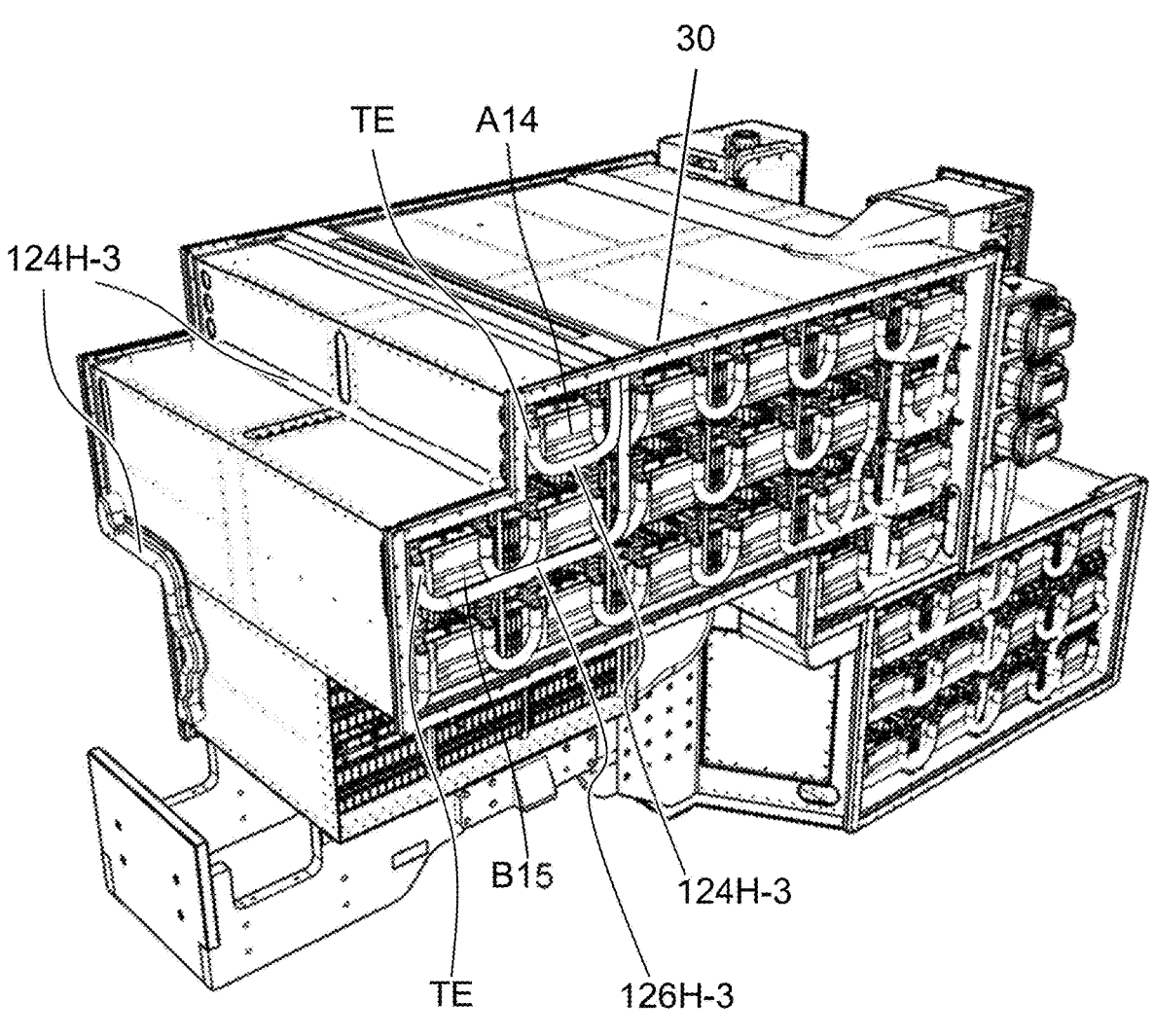
FIG. 33A is a left front perspective view of an electric vehicle according to a preferred embodiment of the present invention.
Figure 34A:
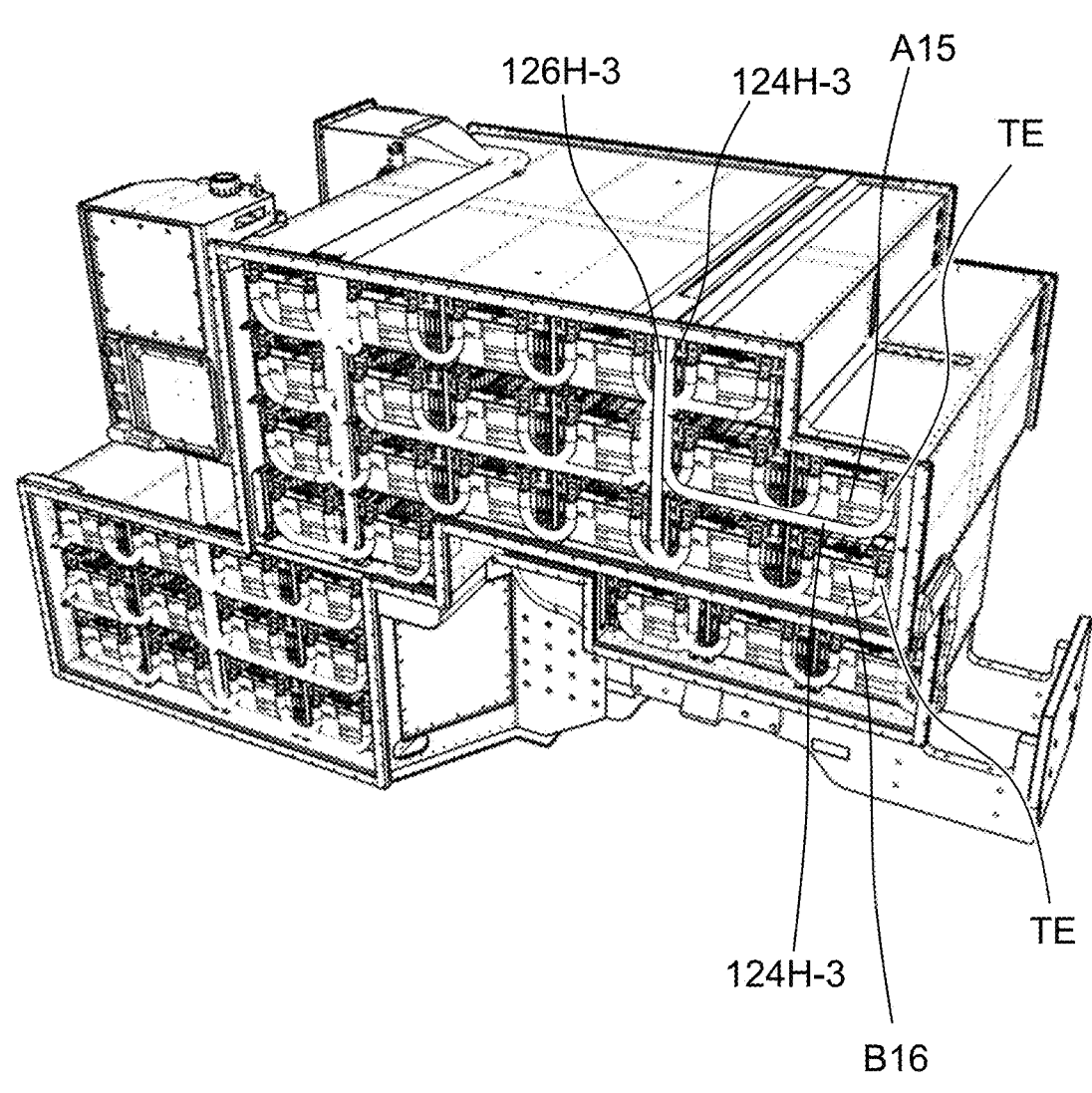
FIG. 34A is a right front perspective view of an electric vehicle according to a preferred embodiment of the present invention.
Figure 34B:
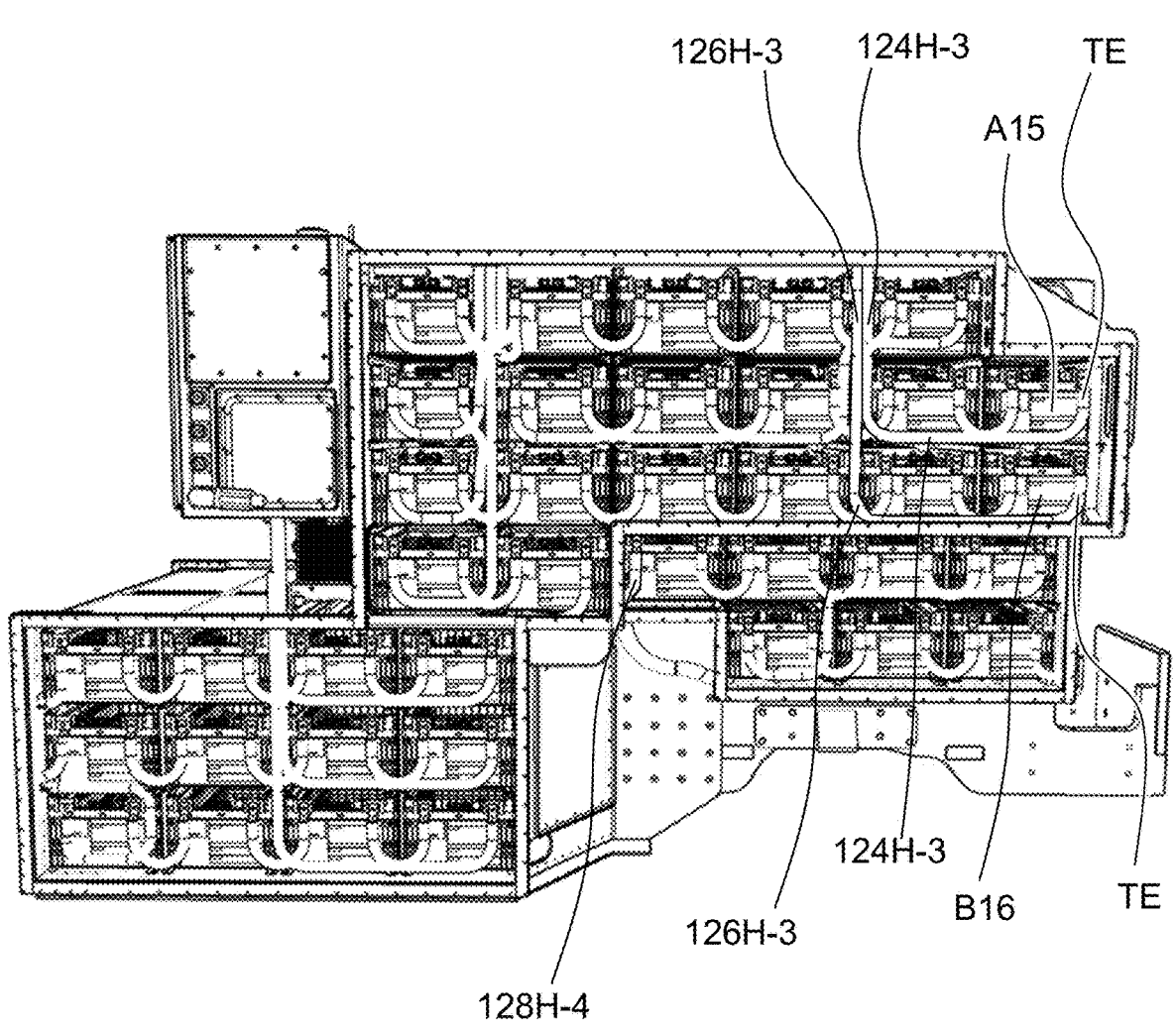
FIG. 34B is a right side view of an electric vehicle according to a preferred embodiment of the present invention.

In a preferred embodiment, the battery modules A1 through A4 are connected in series in a rearward direction, the battery modules A5 through A8 are connected in series in a forward direction, the battery modules A9 through A14 are connected in series in an upward and forward direction, and the battery modules A15 through A23 are connected in series in an upward and rearward direction, as shown in FIGS. 29A and 29B, for example. A first electrical connection between the battery modules A1 through A4 (e.g., a first portion of the first battery string 124) and the battery modules A5 through A8 (e.g., a second portion of the first battery string 124) extends in a left-right direction of the electric vehicle between battery module A4 and battery module A5, and the first electrical connection can cross the centerline CL of the electric vehicle. In a preferred embodiment, the first electrical connection can include a connection harness 124H-1 including one or more electrical cables, as shown in FIG. 31, for example. A second electrical connection between the battery modules A5 through A8 (e.g., a second portion of the first battery string 124) and the battery modules A9 through A14 (e.g., a third portion of the first battery string 124) extends in an up-down direction of the electrical vehicle between battery module A8 and battery module A9. In a preferred embodiment, the second electrical connection can include a connection harness 124H-2 including one or more electrical cables, as shown in FIG. 32, for example. A third electrical connection between the battery modules A9 through A14 (e.g., a third portion of the first battery string 124) and the battery modules A15 through A23 (e.g., a fourth portion of the first battery string 124) extends in a left-right direction of the electrical vehicle between battery module A14 and battery module A15, and the third electrical connection can cross the centerline CL of the electric vehicle. In a preferred embodiment, the third electrical connection can include a connection harness 124H-3 including one or more electrical cables, as shown in FIGS. 33A and 34A, for example.

In a preferred embodiment of the present invention, the connection harness 124H-3 included in the third electrical connection connects the battery module A14 and the battery module A15. In a preferred embodiment, the terminals (terminal end) of the battery module A14 face a first outside direction of the electric vehicle (e.g., a left direction) and the terminals (terminal end) of the battery module A15 faces a second outside direction of the electric vehicle (e.g., a right direction) opposite to the first direction, as shown in FIGS. 33A and 34A, for example. The connection harness 124H-3 included in the third electrical connection that connects the battery module A14 and the battery module A15 extends from the battery modules A9-A14 to the battery modules A15-A23 to connect the terminal of the battery module A14 to the terminal of the battery module A15.

Figure 33B:
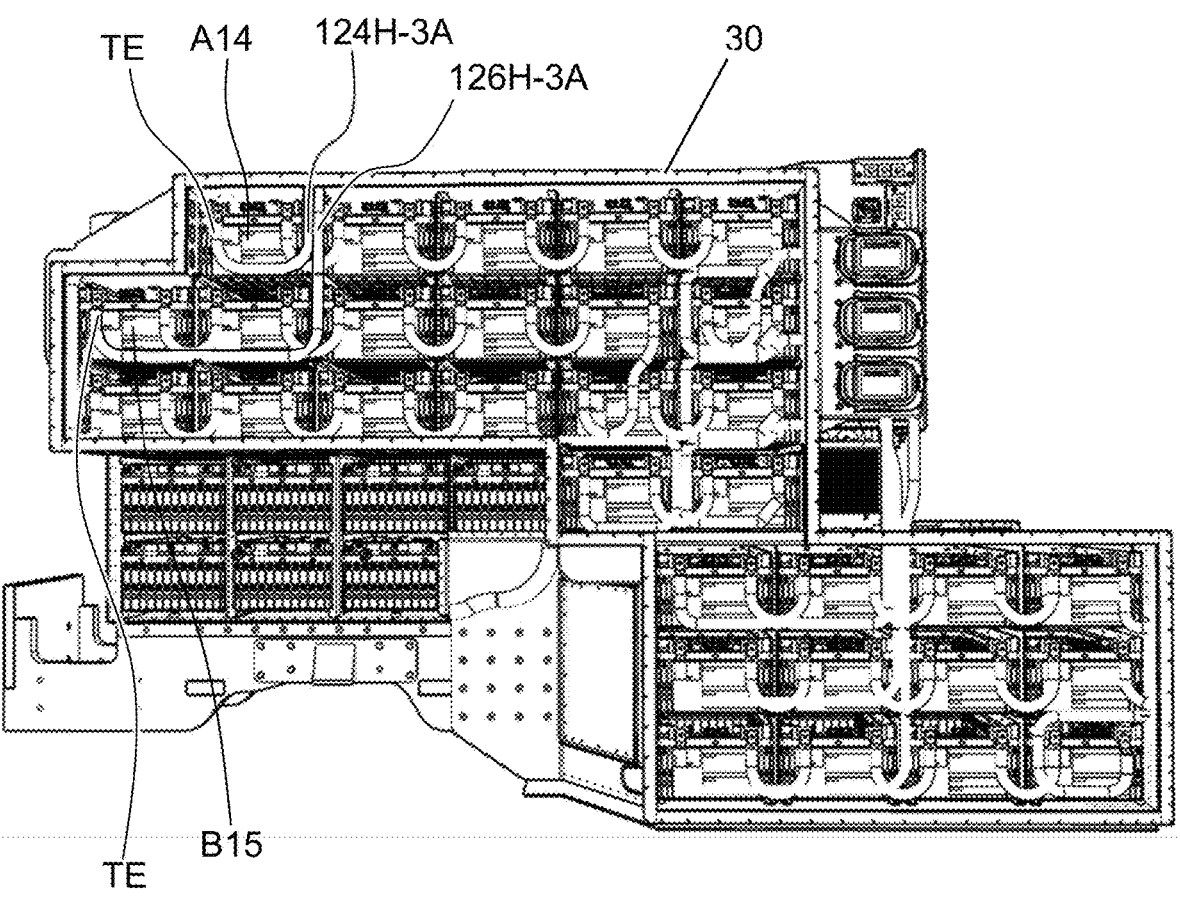
FIG. 33B is a left side view of an electric vehicle according to a preferred embodiment of the present invention.

In a preferred embodiment of the present invention, at least a portion 124H-3A of the connection harness 124H-3 that connects the battery module A14 and the battery module A15 can be attached to the top row of the battery housing module compartments of the third battery housing portion 30, as shown in FIG. 33B, for example. In a preferred embodiment, at least a portion 124H-3A of the connection harness that connects the battery module A14 and the battery module A15 can be attached to the top row of the battery housing module compartments of the third battery housing portion 30, can be located between two adjacent battery housing module compartments included in the first row of battery housing module compartments (e.g., the battery housing module compartments to which the lateral ducts 86F and 86R are attached), and located adjacent to the lateral duct 86A attached to the top row of the battery housing module compartments of the third battery housing portion 30. In a preferred embodiment, at least a portion 124H-3A of the connection harness that connects the battery module A14 and the battery module A15 can be attached to the top row of the battery housing module compartments of the third battery housing portion 30 and located between the lateral duct 86F and the lateral duct 86R, which are attached to the top row of the battery housing module compartments of the third battery housing portion 30 and face opposite directions, as shown in FIG. 15, for example.

In a preferred embodiment of the present invention, the controller 89-3 can be attached to the top row of the battery housing module compartments of the third battery housing portion 30 and located adjacent to the lateral duct 86R, as shown in FIG. 24A, for example. In a preferred embodiment, the second end 86-2 of the lateral duct 86R can face the controller 89-3, and the controller 89-3 can be located adjacent to lateral duct 86R on the side of the second end 86-2, as shown in FIGS. 15 and 24A, for example.

In a preferred embodiment, within each of the first portion, the second portion, the third portion, and the fourth portion of the first battery string 124, each of the battery modules is adjacent (e.g., directly adjacent) to at least one other battery module within the respective portion. For example, within the fourth portion of the first battery string 124, each of the battery modules A15 through A23 is adjacent to another one of the battery modules A15 through A23. More specifically, each of the battery modules A15 through A23 is adjacent to (e.g., directly above or below, directly to the left or right of, or directly diagonally adjacent to) another one of the battery modules A15 through A23.

In a preferred embodiment, the third portion of the first battery string 124 can include at least one battery module that is higher than another battery module included in the third portion of the first battery string 124 in an up-down direction of the electric vehicle. For example, the third portion of the first battery string 124 can include the battery module A10 that is higher than the battery module A9 in the up-down direction of the electric vehicle, and the battery module A9 is directly connected in series to the battery module A10. Similarly, the fourth portion of the first battery string 124 can include at least one battery module that is higher than another battery module included in the fourth portion of the first battery string 124 in an up-down direction of the electric vehicle. For example, the fourth portion of the first battery string 124 can include the battery module A20 that is higher than the battery module A19 in the up-down direction of the electric vehicle, and the battery module A20 is directly connected in series to the battery module A19.

In a preferred embodiment, the second battery string 126 includes battery modules B1 through B23, which are connected in series from B1 to B23 in ascending order. The battery modules B1 through B4 (e.g., a first portion of the second battery string 126) correspond to first battery modules 261 housed in the first battery housing portion 26, the battery modules B5 through B8 (e.g., a second portion of the second battery string 126) correspond to second battery modules 281 housed in the second battery housing portion 28, the battery modules B9 through B15 (e.g., a third portion of the second battery string 126) correspond to third battery modules 301 housed in the third battery housing portion 30, and the battery modules B16 through B23 (e.g., a fourth portion of the second battery string 126) correspond to fourth battery modules 321 housed in the fourth battery housing portion 32. Each of the first portion, the second portion, the third portion, and the fourth portion of the second battery string 126 are spaced apart from each other.

In a preferred embodiment, the battery modules B1 through B4 are connected in series in a rearward direction, the battery modules B5 through B8 are connected in series in a forward direction, the battery modules B9 through B15 are connected in series in an upward and forward direction, and the battery modules B16 through B23 are connected in series in upward and rearward direction, as shown in FIGS. 29A and 29B, for example. A first electrical connection between the battery modules B1 through B4 (e.g., a first portion of the second battery string 126) and the battery modules B5 through B8 (e.g., a second portion of the second battery string 126) extends in a left-right direction of the electrical vehicle between battery module B4 and battery module B5, and the first electrical connection can cross the centerline CL of the electric vehicle. In a preferred embodiment, the first electrical connection can include a connection harness 126H-1 including one or more electrical cables, as shown in FIG. 31, for example. A second electrical connection between the battery modules B5 through B8 (e.g., a second portion of the second battery string 126) and the battery modules B9 through B15 (e.g., a third portion of the second battery string 126) extends in an up-down direction of the electrical vehicle between battery module B8 and battery module B9. In a preferred embodiment, the second electrical connection can include a connection harness 126H-2 including one or more electrical cables, as shown in FIG. 32, for example. A third electrical connection between the battery modules B9 through B15 (e.g., a third portion of the second battery string 126) and the battery modules B16 through B23 (e.g., a fourth portion of the second battery string 126) extends in a left-right direction of the electrical vehicle between battery module B15 and battery module B16, and the third electrical connection can cross the centerline CL of the electric vehicle. In a preferred embodiment, the third electrical connection can include a connection harness 126H-3 including one or more electrical cables, for example.

In a preferred embodiment of the present invention, the connection harness 126H-3 included in the third electrical connection connects the battery module B15 and the battery module B16. In a preferred embodiment, the terminals (terminal end) of the battery module B15 faces a first outside direction of the electric vehicle (e.g., a left direction) and the terminals (terminal end) of the battery module B16 faces a second outside direction of the electric vehicle (e.g., a right direction) opposite to the first direction, as shown in FIGS. 33A and 34A, for example. The connection harness 126H-3 included in the third electrical connection that connects the battery module B15 and the battery module B16 extends from the battery modules B9-B15 to the battery modules B16-A23 to connect the terminal of the battery module B15 to the terminal of the battery module B16.

In a preferred embodiment of the present invention, at least a portion 126H-3A of the connection harness 126H-3 that connects the battery module B15 and the battery module B16 can be attached to the top row of the battery housing module compartments of the third battery housing portion 30, as shown in FIG. 33B, for example. In a preferred embodiment, at least a portion 126H-3A of the connection harness that connects the battery module B15 and the battery module B16 can be attached to the top row of the battery housing module compartments of the third battery housing portion 30, can be located between two adjacent battery housing module compartments included in the first row of battery housing module compartments (e.g., the battery housing module compartments to which the lateral ducts 86F and 86R are attached), and located adjacent to the lateral duct 86A attached to the top row of the battery housing module compartments of the third battery housing portion 30. In a preferred embodiment, at least a portion 126H-3A of the connection harness that connects the battery module B15 and the battery module B16 can be attached to the top row of the battery housing module compartments of the third battery housing portion 30 and located between the lateral duct 86F and the lateral duct 86R, which are attached to the top row of the battery housing module compartments of the third battery housing portion 30 and face opposite directions, as shown in FIG. 15, for example.

In a preferred embodiment, within each of the first portion, the second portion, the third portion, and the fourth portion of the second battery string 126, each of the battery modules is adjacent (e.g., directly adjacent) to at least one other battery module within the respective portion. For example, within the third portion of the second battery string 126, each of the battery modules B9 through B15 is adjacent to another one of the battery modules B9 through B15. More specifically, each of the battery modules B9 through B15 is adjacent to (e.g., directly above or below, directly to the left or right of, or directly diagonally adjacent to) another one of the battery modules B9 through B15.

In a preferred embodiment, the third portion of the second battery string 126 can include at least one battery module that is higher than another battery module included in the third portion of the second battery string 126 in an up-down direction of the electric vehicle. For example, the third portion of the second battery string 126 can include the battery module B11 that is higher than the battery module B10 in the up-down direction of the electric vehicle, and the battery module B10 is directly connected in series to the battery module B11. Similarly, the fourth portion of the second battery string 126 can include at least one battery module that is higher than another battery module included in the fourth portion of the second battery string 126 in an up-down direction of the electric vehicle. For example, the fourth portion of the second battery string 126 can include the battery module B22 that is higher than the battery module B21 in the up-down direction of the electric vehicle, and the battery module B21 is directly connected in series to the battery module B22.

In a preferred embodiment, the third battery string 128 includes battery modules C1 through C23, which are connected in series from C1 to C23 in ascending order. The battery modules C1 through C4 (e.g., a first portion of the third battery string 128) correspond to first battery modules 261 housed in the first battery housing portion 26, the battery modules C5 through C8 (e.g., a second portion of the third battery string 128) correspond to second battery modules 281 housed in the second battery housing portion 28, the battery modules C9 through C14 (e.g., a third portion of the third battery string 128) correspond to third battery modules 301 housed in the third battery housing portion 30, the battery modules C15 through C21 (e.g., a fourth portion of the third battery string 128) correspond to fifth battery modules 341 housed in the fifth battery housing portion 34, and the battery modules C22 and C23 (e.g., a fifth portion of the third battery string 128) correspond to fourth battery modules 321 housed in the fourth battery housing portion 32. Each of the first portion, the second portion, the third portion, the fourth portion, and the fifth portion of the third battery string 128 are spaced apart from each other.

In a preferred embodiment, the battery modules C1 through C4 are connected in series in a rearward direction, the battery modules C5 through C8 are connected in series in a forward direction, the battery modules C9 through C14 are connected in series in an upward and forward direction, the battery modules C15 through C21 are connected in series in upward and rearward direction, and the battery modules C22 and C23 are connected in series in a rearward direction, as shown in FIGS. 29A and 29B, for example. A first electrical connection between the battery modules C1 through C4 (e.g., a first portion of the third battery string 128) and the battery modules C5 through C8 (e.g., a second portion of the third battery string 128) extends in a left-right direction of the electrical vehicle between battery module C4 and battery module C5, and the first electrical connection can cross the centerline CL of the electric vehicle. In a preferred embodiment, the first electrical connection can include a connection harness 128H-1 including one or more electrical cables, as shown in FIG. 31, for example. A second electrical connection between the battery modules C5 through C8 (e.g., a second portion of the third battery string 128) and the battery modules C9 through C14 (e.g., a third portion of the third battery string 128) extends in an up-down direction of the electrical vehicle between battery module C8 and battery module C9. In a preferred embodiment, the second electrical connection can include a connection harness 128H-2 including one or more electrical cables, as shown in FIG. 32, for example. A third electrical connection between the battery modules C9 through C14 (e.g., a third portion of the third battery string 128) and the battery modules C15 through C21 (e.g., a fourth portion of the third battery string 128) extends in a left-right direction of the electrical vehicle between battery module C14 and battery module C15, and the third electrical connection can cross the centerline CL of the electric vehicle. In a preferred embodiment, the third electrical connection can include a connection harness 128H-3 including one or more electrical cables, as shown in FIG. 33A, for example. A fourth electrical connection between the battery modules C15 through C21 (e.g., a fourth portion of the third battery string 128) and the battery modules C22 and C23 (e.g., a fourth portion of the third battery string 128) extends in a rearward direction of the electrical vehicle between battery module C21 and battery module C22. In a preferred embodiment, the fourth electrical connection can include a connection harness 128H-4 including one or more electrical cables, for example.

In a preferred embodiment, within each of the first portion, the second portion, the third portion, the fourth portion, and the fifth portion of the third battery string 128, each of the battery modules is adjacent (e.g., directly adjacent) to at least one other battery module within the respective portion. For example, within the first portion of the of the third battery string 128, each of the battery modules C1 through C4 is adjacent to another one of the battery modules C1 through C4. More specifically, each of the battery modules C1 through C4 is adjacent to (e.g., directly above or below, directly to the left or right of, or directly diagonally adjacent to) another one of the battery modules C1 through C4.

In a preferred embodiment, the third portion of the third battery string 128 can include at least one battery module that is higher than another battery module included in the third portion of the third battery string 128 in an up-down direction of the electric vehicle. For example, the third portion of the third battery string 128 can include the battery module C11 that is higher than the battery module C10 in the up-down direction of the electric vehicle, and the battery module C10 is directly connected in series to the battery module C11.

In a preferred embodiment of the present invention, the first battery string 124, the second battery string 126, and the third battery string 128 can be layered in an up-down direction of the electric vehicle. For example, in the first battery housing portion 26, the battery modules A1 through A4 are located higher than the battery modules B1 through B4 in an up-down direction of the electric vehicle, and the battery modules B1 through B4 are located higher than the battery modules C1 through C4 in an up-down direction of the electric vehicle. In the second battery housing portion 28, the battery modules A5 through A8 are located higher than the battery modules B5 through B8 in the up-down direction of the electric vehicle, and the battery modules B5 through B8 are located higher than the battery modules C5 through C8 in the up-down direction of the electric vehicle.

In a preferred embodiment, at least one of the first portion (e.g., A1-A4) of the first battery string 124, the second portion (A5-A8) of the first battery string 124, the third portion (A9-A14) of the first battery string 124, and the fourth portion (A15-23) of the first battery string 124 includes a same number of battery modules as one of the first portion (B1-B4) of the second battery string 126, the second portion (B5-B8) of the second battery string 126, the third portion (B9-B15) of the second battery string 126, and the fourth portion (B16-B23) of the second battery string 126. For example, the first portion of the first battery string 124 can have a same number of battery modules as the first portion of the second battery string 126, and the second portion of the first battery string 124 can have a same number of battery modules as the second portion of the second battery string 126. The third portion of the first battery string 124 can have a different number of battery modules than the third portion of the second battery string 126, and the fourth portion of the first battery string 124 can have a different number of battery modules than the fourth portion of the second battery string 126.

In a preferred embodiment of the present invention, the first battery string 124, the second battery string 126, and the third battery string 128 can each include a service plug. For example, as shown in FIGS. 1, 29A, 29B, and 32 the first battery string 124 can include a first service plug SP1, the second battery string 126 can include a second service plug SP2, and the third battery string 128 can include a third service plug SP3. The first service plug SP1 can be used to disconnect the flow of electricity through the first battery string 124, and can be located in series between the battery module A8 and the battery module A9. The second service plug SP2 can be used to disconnect the flow of electricity through the second battery string 126, and can be located in series between the battery module B8 and the battery module B9. The third service plug SP3 can be used to disconnect the flow of electricity through the third battery string 128, and can be located in series between the battery module C8 and the battery module C9.

In a preferred embodiment, the first service plug SP1, the second service plug SP2, and the third service plug SP3 are spaced apart from each in an up-down direction of the electric vehicle, as shown in FIG. 32, for example. In a preferred embodiment, the first service plug SP1, the second service plug SP2, and the third service plug SP3 include openings which face a width/left-right direction of the electric vehicle which is a same direction that the terminal ends TE of each of the plurality of second battery modules 281 and the plurality of third battery modules 301 face.

In a preferred embodiment of the present invention, the first battery string 124, the second battery string 126, and the third battery string 128 are each connected to a power distribution unit (PDU) 130, as shown in FIG. 30, for example. In a preferred embodiment, the PDU 130 is a high voltage PDU which is connected to the battery strings (e.g., connected in series with the battery modules), an external charge port, and one or more electric components connected to the battery strings such as one or more inverters connected to the electric motors, a DCDC converter, and a coolant pump, for example.

In a preferred embodiment, the PDU 130 includes a negative PDU portion (e.g., a negative PDU rail) 130-1 and a positive PDU portion (e.g., a positive PDU rail) 130-2, as shown in FIGS. 30-32, for example. As shown in FIGS. 31-34B, for example, the negative PDU portion 130-1 and the positive PDU portion 130-2 can include separate housings that are spaced away from each other in a left-right direction of the electric vehicle. For example, the housing of the negative PDU portion 130-1 can be located on a first side (e.g., a left side) of the centerline CL of the electric vehicle and the housing of the positive PDU portion 130-2 can be located on a second side (e.g., a right side) of the centerline CL of the electric vehicle. The housing of the negative PDU portion 130-1 can be located on a first side (e.g., a left side) of a steering column 129 of the electric vehicle and the housing of the positive PDU portion 130-2 can be located on a second side (e.g., a right side) of the steering column 129 of the electric vehicle, as shown in FIGS. 1C and 31-34B, for example. In a preferred embodiment, at least one the evaporators are located between the housing of the negative PDU portion 130-1 and the housing of the positive PDU portion 130-2. For example, as shown in FIG. 32, the third evaporator 56 and the fourth evaporator 60 can be located between the housing of the negative PDU portion 130-1 and the housing of the positive PDU portion 130-2. In a preferred embodiment, each of the housing of the negative PDU portion 130-1 and the housing of the positive PDU portion 130-2 are separate from and spaced away from the battery housing 8, as shown in FIG. 31, for example. In a preferred embodiment, the first service plug SP1, the second service plug SP2, and the third service plug SP3 are located adjacent to the housing of the negative PDU portion 130-1 as shown in FIG. 32, for example.

In a preferred embodiment, the negative PDU portion 130-1 can include a plurality of contactors 132 including a first contactor 132-1, a second contactor 132-2, and a third contactor 132-3. In a preferred embodiment, the first battery string 124 is connected to the first contactor 132-1 of the negative PDU portion 130-1. For example, the battery module A23 of the first battery string 124 can be connected to the first contactor 132-1 of the negative PDU portion 130-1. In a preferred embodiment, the second battery string 126 is connected to the second contactor 132-2 of the negative PDU portion 130-1. For example, the battery module B23 of the second battery string 126 can be connected to the second contactor 132-2 of the negative PDU portion 130-1. In a preferred embodiment, the third battery string 128 is connected to the third contactor 132-3 of the negative PDU portion 130-1. For example, battery module C23 of the third battery string 128 can be connected to the third contactor 132-3 of the negative PDU portion 130-1. In a preferred embodiment, the negative PDU portion 130-1 includes a same number of contactors 132 as battery strings included in the electric vehicle. For example, in the example shown in FIG. 30, the negative PDU portion 130-1 includes three (3) contactors 132 and the electric vehicle includes three battery strings (the first battery string 124, the second battery string 126, and the third battery string 128).

In a preferred embodiment, the positive PDU portion 130-2 can include a plurality of contactors 134 including a first contactor 134-1, a second contactor 134-2, and a third contactor 134-3. In a preferred embodiment, the first battery string 124 is connected to the first contactor 134-1 of the positive PDU portion 130-2. For example, battery module A1 of the first battery string 124 can be connected to the first contactor 134-1 of the positive PDU portion 130-2. In a preferred embodiment, the second battery string 126 is connected to the second contactor 134-2 of the positive PDU portion 130-2. For example, battery module B1 of the second battery string 126 can be connected to the second contactor 134-2 of the positive PDU portion 130-2. In a preferred embodiment, the third battery string 128 is connected to the third contactor 134-3 of the positive PDU portion 130-2. For example, battery module C1 of the third battery string 128 can be connected to the third contactor 134-3 of the positive PDU portion 130-2. In a preferred embodiment, the positive PDU portion 130-2 includes a same number of contactors 134 as battery strings included in the electric vehicle. For example, in the example shown in FIG. 30, the positive PDU portion 130-2 includes three (3) contactors 134 and the electric vehicle includes three battery strings (the first battery string 124, the second battery string 126, and the third battery string 128).

In a preferred embodiment of the present invention, the housing of the negative PDU portion 130-1 can be located rearward of at least a portion of the battery housing 8 in the front-rear direction of the electric vehicle. For example, the housing of the negative PDU portion 130-1 can be located rearward of the third battery housing portion 30 in the front-rear direction of the electric vehicle, as shown in FIG. 32, for example. In this way, the housing of the negative PDU portion 130-1 and the plurality of contactors 132 included therein can be protected from a front side of the electric vehicle. Similarly, the housing of the positive PDU portion 130-2 can be located rearward of at least a portion of the battery housing in the front-rear direction of the electric vehicle. For example, the housing of the positive PDU portion 130-2 can be located rearward of the fourth battery housing portion 32 in the front-rear direction of the electric vehicle, as shown in FIG. 31, for example. In this way, the housing of the positive PDU portion 130-2 and the plurality of contactors 134 included therein can be protected from a front side of the electric vehicle.

In a preferred embodiment of the present invention, the housing of the negative PDU portion 130-1 can be located above of at least a portion of the battery housing 8 in an up-down direction of the electric vehicle. For example, the housing of the negative PDU portion 130-1 can be located above the second battery housing portion 28 in the up-down direction of the electric vehicle, as shown in FIG. 32, for example. In this way, the housing of the negative PDU portion 130-1 and the plurality of contactors 132 included therein can be protected from a bottom side of the electric vehicle. Similarly, the housing of the positive PDU portion 130-2 can be located above of at least a portion of the battery housing in the up-down direction of the electric vehicle. For example, the housing of the positive PDU portion 130-2 can be located above the first battery housing portion 26 in the up-down direction of the electric vehicle, as shown in FIG. 31, for example. In this way, the housing of the positive PDU portion 130-2 and the plurality of contactors 134 included therein can be protected from a bottom side of the electric vehicle.

Figure 36:
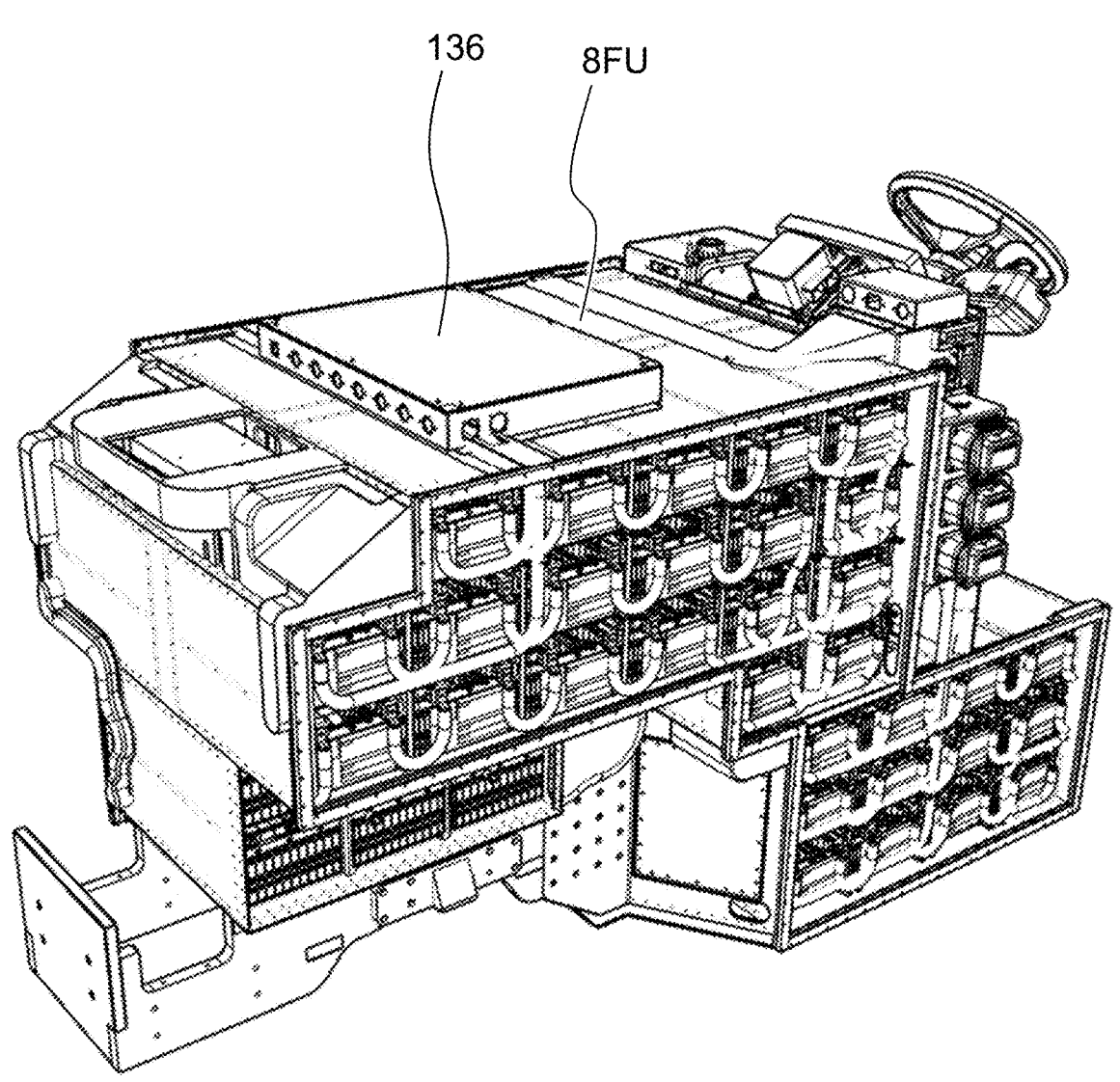
FIG. 36 is a left front perspective view of an electric vehicle according to a preferred embodiment of the present invention.

In a preferred embodiment of the present invention, the first battery modules 261, the second battery modules 281, the third battery modules 301, the fourth battery modules 321, and the fifth battery modules 341 are connected to a battery management unit (BMU) 136. The battery management unit 136 can be attached to the battery housing 8. For example, the battery management unit 136 can be attached to the front-upper cover 8FU, as shown in FIG. 36, for example.

Figure 35:
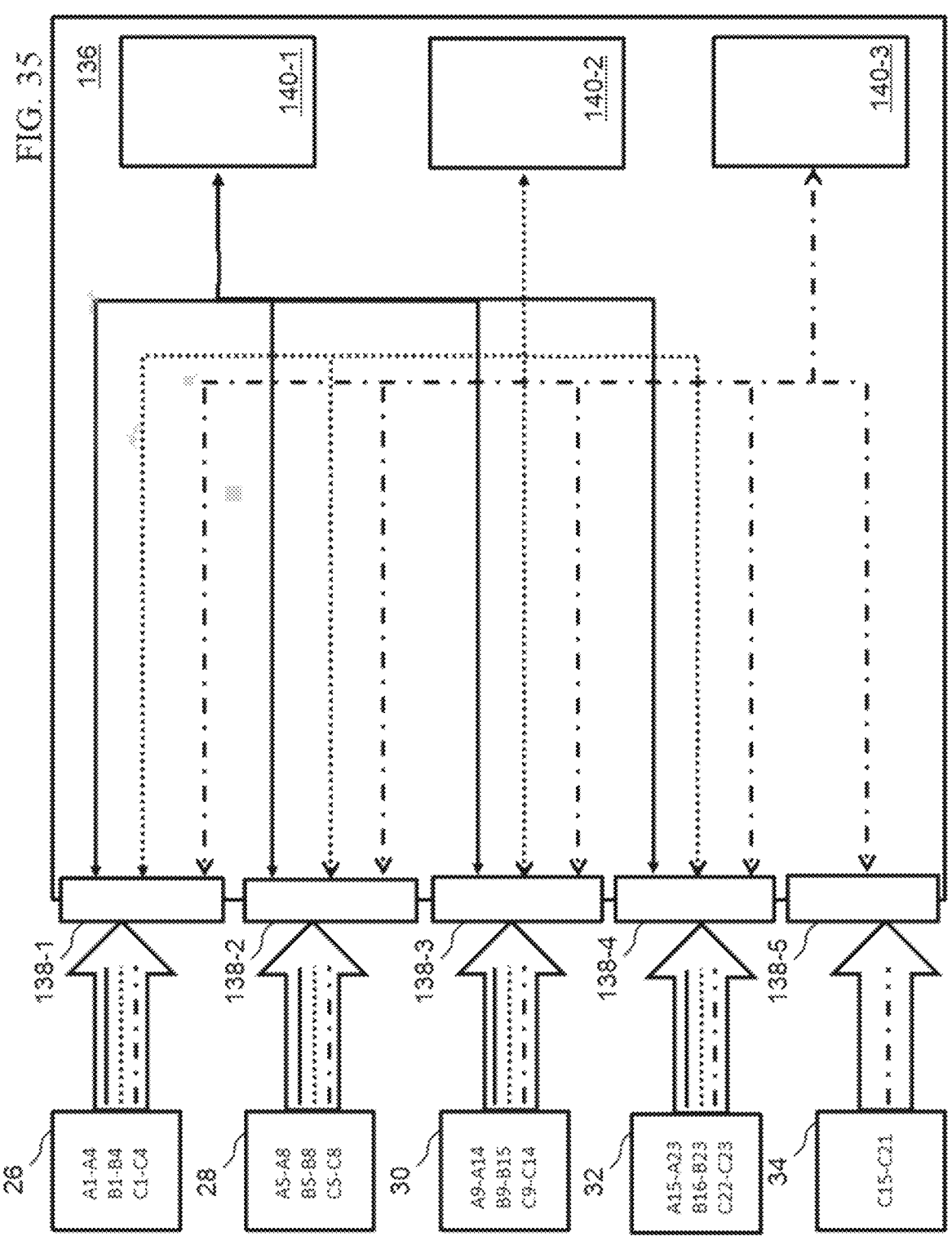
FIG. 35 is a schematic diagram including signal lines included in an electric vehicle according to a preferred embodiment of the present invention.

In a preferred embodiment, the battery management unit 136 can include one or more controllers that are configured or programmed to manage the first battery modules 261, the second battery modules 281, the third battery modules 301, the fourth battery modules 321, and the fifth battery modules 341. The battery management unit 136 is able to send to, and receive information from, each of the individual battery modules included in the first battery modules 261, the second battery modules 281, the third battery modules 301, the fourth battery modules 321, and the fifth battery modules 341. In a preferred embodiment, the battery management unit 136 includes a plurality of input ports 138. For example, the battery management unit 136 can include a separate input port 138 that corresponds to each of the respective battery housing portions. For example, the battery management unit 136 can include a first input port 138-1 that corresponds to the first battery housing portion 26, a second input port 138-2 that corresponds to the second battery housing portion 28, a third input port 138-3 that corresponds to the third battery housing portion 30, a fourth input port 138-4 that corresponds to the fourth battery housing portion 32, and a fifth input port 138-5 that corresponds to the fifth battery housing portion 34, as shown in FIG. 35, for example.

In a preferred embodiment, the first input port 138-1 that corresponds to the first battery housing portion 26 receives one or more signal lines (e.g., signal cables) from the battery modules A1 through A4, the battery modules B1 through B4, and the battery modules C1 through C4 housed in the first battery housing portion 26. In the example, shown in FIG. 35, the one or more signal lines between the battery modules A1 through A4 and the first input port 138-1 is shown by a solid line, the one or more signal lines between the battery modules B1 through B4 and the first input port 138-1 is shown by a dotted line, and the one or more signal lines between the battery modules C1 through C4 and the first input port 138-1 is shown by a dashed-dotted line.

In a preferred embodiment, the second input port 138-2 that corresponds to the second battery housing portion 28 receives one or more signal lines (e.g., signal cables) from the battery modules A5 through A8, the battery modules B5 through B8, and the battery modules C5 through C8 housed in the second battery housing portion 28. In the example, shown in FIG. 35, the one or more signal lines between the battery modules A5 through A8 and the second input port 138-2 is shown by a solid line, the one or more signal lines between the battery modules B5 through B8 and the second input port 138-2 is shown by a dotted line, and the one or more signal lines between the battery modules C5 through C8 and the second input port 138-2 is shown by a dashed-dotted line.

In a preferred embodiment, the third input port 138-3 that corresponds to the third battery housing portion 30 receives one or more signal lines (e.g., signal cables) from the battery modules A9 through A14, the battery modules B9 through B15, and the battery modules C9 through C14 housed in the third battery housing portion 30. In the example, shown in FIG. 35, the one or more signal lines between the battery modules A9 through A14 and the third input port 138-3 is shown by a solid line, the one or more signal lines between the battery modules B9 through B15 and the third input port 138-3 is shown by a dotted line, and the one or more signal lines between the battery modules C9 through C14 and the third input port 138-3 is shown by a dashed-dotted line.

In a preferred embodiment, the fourth input port 138-4 that corresponds to the fourth battery housing portion 32 receives one or more signal lines (e.g., signal cables) from the battery modules A15 through A23, the battery modules B16 through B23, and the battery modules C22 and C23 C8 housed in the fourth battery housing portion 32. In the example, shown in FIG. 35, the one or more signal lines between the battery modules A15 through A23 and the fourth input port 138-4 is shown by a solid line, the one or more signal lines between the battery modules B16 through B23 and the fourth input port 138-4 is shown by a dotted line, and the one or more signal lines between the battery modules C22 and C23 and the fourth input port 138-4 is shown by a dashed-dotted line.

In a preferred embodiment, the fifth input port 138-5 that corresponds to the fifth battery housing portion 34 receives one or more signal lines (e.g., signal cables) from the battery modules C15 through C21 housed in the fifth battery housing portion 34. In the example, shown in FIG. 35, the one or more signal lines between the battery modules C15 through C21 and the fifth input port 138-5 is shown by a dashed-dotted line.

In a preferred embodiment of the present invention, the battery management unit 136 can include a plurality of battery management unit portions 140 (e.g., a plurality of controllers). For example, the battery management unit 136 can include a separate battery management unit portion 140 for each of the respective battery strings included in the electric vehicle. For example, the battery management unit 136 can include a first battery management unit portion 140-1 that corresponds to the first battery string 124, a second battery management unit portion 140-2 that corresponds to the second battery string 126, and a third battery management unit portion 140-3 that corresponds to the third battery string 128, as shown in FIG. 35, for example. Each of the battery management unit portions 140 can include a controller configured or programmed to manage a respective battery string.

In a preferred embodiment, the first battery management unit portion 140-1 is connected to the input ports 138 to receive information from the input ports 138 regarding the battery modules A1-A23 included in the first battery string 124. For example, the first battery management unit portion 140-1 is connected to the first input port 138-1 to receive information regarding the battery modules A1 through A4, is connected to the second input port 138-2 to receive information regarding the battery modules A5 through A8, is connected to the third input port 138-3 to receive information regarding the battery modules A9 through A14, and is connected to the fourth input port 138-4 to receive information regarding the battery modules A15 through A23. The connections (e.g., the signal lines) between the first battery management unit portion 140-1 and the input ports 138 are shown in FIG. 35 using a solid line.

In a preferred embodiment, the second battery management unit portion 140-2 is connected to the input ports 138 to receive information from the input ports 138 regarding the battery modules B1-B23 included in the second battery string 126. For example, the second battery management unit portion 140-2 is connected to the first input port 138-1 to receive information regarding the battery modules B1 through B4, is connected to the second input port 138-2 to receive information regarding the battery modules B5 through B8, is connected to the third input port 138-3 to receive information regarding the battery modules B9 through B15, and is connected to the fourth input port 138-4 to receive information regarding the battery modules B16 through B23. The connections (e.g., the signal lines) between the second battery management unit portion 140-2 and the input ports 138 are shown in FIG. 35 using a dotted line.

In a preferred embodiment, the third battery management unit portion 140-3 is connected to the input ports 138 to receive information from the input ports 138 regarding the battery modules C1-C23 included in the third battery string 128. For example, the first battery management unit portion 140-3 is connected to the first input port 138-1 to receive information regarding the battery modules C1 through C4, is connected to the second input port 138-2 to receive information regarding the battery modules C5 through C8, is connected to the third input port 138-3 to receive information regarding the battery modules C9 through C14, is connected to the fourth input port 138-4 to receive information regarding the battery modules C22 and C23, and is connected to the fifth input port 138-5 to receive information regarding the battery modules C15 through C21. The connections (e.g., the signal lines) between the third battery management unit portion 140-4 and the input ports 138 are shown in FIG. 35 using a dashed-dotted line.

In preferred embodiments of the present invention, as discussed above, the battery modules are connected to the input ports 138 based on which battery housing portion in which the respective battery module is housed, and the battery modules are connected to the battery management unit portions 140 (via the input ports 138) based on which battery string in which the respective battery module is included.

In a preferred embodiment of the present invention, a portion or an entirety of each of the controllers 89-1 through 89-5, and the one or more controllers included in the plurality of battery management unit portions 140, as described herein with respect to the various preferred embodiments of the present invention can be implemented in one or more circuits or circuitry, such as an integrated circuit(s) or as an LSI (large scale integration). Additionally, the method of forming a circuit or circuitry defining each of the controllers is not limited to LSI, and an integrated circuit may be implemented by a dedicated circuit or a general-purpose processor or controller that is specifically programed to define a special-purpose processor or controller. Further, if technology of forming an integrated circuit, which replaces LSI, arises as a result of advances in semiconductor technology, an integrated circuit formed by that technology may be used.

Furthermore, a program which is operated in each of the controllers and/or other elements of various preferred embodiments of the present invention, is a program (program causing a computer to perform a function or functions) controlling a controller, in order to realize functions of the various preferred embodiments according to the present invention, including each of the various circuits or circuitry described herein. Therefore, information which is handled by the controller is temporarily accumulated in a RAM at the time of the processing. Thereafter, the information is stored in various types of circuitry in the form of ROMs and HDDs, and is read out by circuitry within, or included in combination with, the controller as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in preferred embodiments of the present invention.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "controller", "circuit", or "circuitry" is in no way limited to an implementation that is hardware only, and as persons of ordinary skill in the relevant art would know and understand, such descriptions and recitations of "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
a frame; and
a battery housing supported by the frame; wherein
the battery housing includes a plurality of battery housing sections;
the plurality of battery housing sections include a first battery housing section, a second battery housing section, and a third battery housing section;
the first battery housing section includes a first battery housing portion and a second battery housing portion;
the second battery housing section includes a third battery housing portion and a fourth battery housing portion;
the third battery housing section includes a fifth battery housing portion;
the first battery housing portion and the second battery housing portion are adjacent to each other in a left-right direction of the electric work vehicle;
the third battery housing portion and the fourth battery housing portion are adjacent to each other in the left-right direction of the electric work vehicle;
a width of the first battery housing section in the left-right direction of the electric work vehicle is equal to a width of the second battery housing section in the left-right direction of the electric work vehicle; and
the second battery housing section includes a gap located between the third battery housing portion and the fourth battery housing portion in the left-right direction of the electric work vehicle.

2. The electric work vehicle according to claim 1, wherein each of the third battery housing portion and the fourth battery housing portion includes more battery housing module compartments than each of the first battery housing portion and the second battery housing portion.

3. The electric work vehicle according to claim 1, wherein a rear surface of the second battery housing section intersects a middle portion of the first battery housing section in a front-rear direction of the electric work vehicle.

4. The electric work vehicle according to claim 1, wherein the gap overlaps the third battery housing section in a plan view.

5. The electric work vehicle according to claim 1, wherein the gap overlaps the first battery housing section in a plan view.

6. The electric work vehicle according to claim 1, wherein the gap is located along a centerline of the electric work vehicle that extends in a front-rear direction of the electric work vehicle.

7. The electric work vehicle according to claim 1, further comprising
an air cooling system including a first evaporator and a second evaporator; wherein
the gap is fluidly connected to the first evaporator and the second evaporator to receive cool air from each of the first evaporator and the second evaporator.

8. The electric work vehicle according to claim 7, wherein the first evaporator and the second evaporator are located in front of at least a portion of the third battery housing portion and at least a portion of the fourth battery housing portion in a front-rear direction of the electric work vehicle; and
the gap is fluidly connected to each of the first evaporator and the second evaporator such that the cool air from each of the first evaporator and the second evaporator flows rearwardly into the gap.

9. The electric work vehicle according to claim 8, wherein the first evaporator is located on a first side of a centerline of the electric work vehicle that extends in the front-rear direction of the electric work vehicle; and
the second evaporator is located on a second side of the centerline opposite to the first side of the centerline.

10. The electric work vehicle according to claim 1, wherein
the second battery housing section includes a first inner wall located between the gap and the third battery housing portion in the left-right direction of the electric work vehicle;
the second battery housing section includes a second inner wall located between the gap and the fourth battery housing portion in the left-right direction of the electric work vehicle.

11. The electric work vehicle according to claim 10, wherein
the third battery housing portion includes a plurality of battery housing module compartments to house a plurality of battery modules;
the plurality of battery housing module compartments are arranged in a plurality of rows that extend in a front-rear direction of the electric work vehicle;
the plurality of rows include a first row and a second row located below the first row in an up-down direction of the electric work vehicle;
the first inner wall includes a first opening connected to one of the plurality of battery housing module compartments included in the first row;
the first inner wall includes a second opening connected to one of the plurality of battery housing module compartments including in the second row; and
the first opening is smaller than the second opening.

12. The electric work vehicle according to claim 1, wherein
a rear surface of the third battery housing section is spaced away from a front surface of the first battery housing section in a front-rear direction of the electric work vehicle.

13. The electric work vehicle according to claim 1, wherein
the second battery housing section includes a first stepped portion that defines a first space; and
at least a portion of the third battery housing section is located within the first space.

14. The electric work vehicle according to claim 13, wherein
the third battery housing section is located below the second battery housing section in an up-down direction of the electric work vehicle.

15. The electric work vehicle according to claim 13, wherein
a front surface of the third battery housing section is located at a same location as a front surface of the second battery housing section in a front-rear direction of the electric work vehicle.

16. The electric work vehicle according to claim 15, wherein
a portion of the second battery housing section is farther rearward than the third battery housing section in the front-rear direction of the electric work vehicle.

17. The electric work vehicle according to claim 1, wherein the frame includes a front frame that supports the third battery housing section and a front axle of the electric work vehicle; and the front frame is mounted between the third battery housing section and the front axle in an up-down direction of the electric work vehicle.

18. The electric work vehicle according to claim 1, further comprising a plurality of ducts; and a plurality of blowers; wherein each of the plurality of blowers is attached to a respective one of the plurality of ducts;

each of the battery housing sections includes a plurality of battery housing module compartments to house a plurality of battery modules;

each of the plurality of ducts is attached to a respective one of the plurality of battery housing module compartments;

the battery housing includes the gap located at a central portion of the battery housing; and the plurality of blowers direct air from the gap in a lateral direction and across the plurality of battery housing module compartments.

\*    \*    \*    \*    \*